United States Patent
Brown et al.

(10) Patent No.: US 12,529,053 B2
(45) Date of Patent: Jan. 20, 2026

(54) DOUBLE-STRANDED NUCLEIC ACID INHIBITOR MOLECULES WITH SHORTENED SENSE STRANDS

(71) Applicant: Dicerna Pharmaceuticals, Inc., Lexington, MA (US)

(72) Inventors: Bob Dale Brown, Littleton, MA (US); Weimin Wang, Waltham, MA (US); Naim Nazef, Bedford, MA (US)

(73) Assignee: NOVO NORDISK A/S, Bagsvaerd (DK)

( * ) Notice: Subject to any disclaimer, the term of this patent is extended or adjusted under 35 U.S.C. 154(b) by 1126 days.

(21) Appl. No.: 17/605,908

(22) PCT Filed: Apr. 29, 2020

(86) PCT No.: PCT/US2020/030398
§ 371 (c)(1),
(2) Date: Oct. 22, 2021

(87) PCT Pub. No.: WO2020/226960
PCT Pub. Date: Nov. 12, 2020

(65) Prior Publication Data
US 2022/0177880 A1   Jun. 9, 2022

Related U.S. Application Data

(60) Provisional application No. 62/842,908, filed on May 3, 2019.

(51) Int. Cl.
*C12N 15/11* (2006.01)
*C12N 15/113* (2010.01)

(52) U.S. Cl.
CPC .......... *C12N 15/111* (2013.01); *C12N 15/113* (2013.01); *C12N 2310/14* (2013.01); *C12N 2310/3231* (2013.01); *C12N 2310/351* (2013.01); *C12N 2310/531* (2013.01); *C12N 2310/533* (2013.01); *C12N 2320/52* (2013.01)

(58) Field of Classification Search
CPC .......................... C12N 15/113; C12N 2310/14
See application file for complete search history.

(56) References Cited

U.S. PATENT DOCUMENTS

| | | | |
|---|---|---|---|
| 7,667,020 B2 | 2/2010 | O'Toole et al. | |
| 8,372,968 B2 | 2/2013 | Tuschl et al. | |
| 8,513,207 B2 | 8/2013 | Brown | |
| 8,563,709 B2 | 10/2013 | Iba et al. | |
| 8,883,996 B2 | 11/2014 | Rossi et al. | |
| 8,927,705 B2 | 1/2015 | Brown | |
| 9,884,899 B2 | 2/2018 | Lupher et al. | |
| 10,266,821 B2 | 4/2019 | Li et al. | |
| 2011/0152357 A1 | 6/2011 | Croce | |
| 2020/0237789 A1 | 7/2020 | Blackburn et al. | |

FOREIGN PATENT DOCUMENTS

| | | | |
|---|---|---|---|
| CN | 101835789 A | 9/2010 | |
| CN | 102264898 A | 11/2011 | |
| EP | 2 562 257 A1 | 2/2013 | |
| EP | 2 774 989 A1 | 9/2014 | |
| JP | 2006516191 A | 6/2006 | |
| JP | 2010532872 A | 10/2010 | |
| JP | 2012500389 A | 1/2012 | |
| JP | 2020536970 A | 12/2020 | |
| WO | 2010/033225 A2 | 3/2010 | |
| WO | 2016/100401 A1 | 6/2016 | |
| WO | WO-2017160983 A1 * | 9/2017 | ........... A61K 31/519 |
| WO | 2018/045317 A1 | 3/2018 | |
| WO | 2019/143621 A1 | 7/2019 | |
| WO | 2019/168687 A1 | 9/2019 | |
| WO | 2019/200124 A1 | 10/2019 | |
| WO | 2019/204021 A1 | 10/2019 | |
| WO | 2020/123083 A1 | 6/2020 | |

OTHER PUBLICATIONS

Bucka, Alexander (Authorized officer), International Search Report and Written Opinion dated Jul. 30, 2020 for International Application No. PCT/US2020/030398, 12 pages.

Herrera-Carrillo et al. "Dicer-independent processing of small RNA duplexes: mechanistic insights and applications", Nucleic Acids Research, 2017, vol. 45, No. 18, pp. 10369-10379.

Elmen et al., "Locked nucleic acid (LNA) mediated improvements in siRNA stability and functionality", Nucleic Acids Research, 2005, vol. 33, No. 1, pp. 439-447.

* cited by examiner

*Primary Examiner* — Ekaterina Poliakova-Georgantas
(74) *Attorney, Agent, or Firm* — MH2 Technology Law Group, LLP

(57) ABSTRACT

Provided herein are double-stranded nucleic acid inhibitor molecules having a shortened sense strand with a stem loop structure and an antisense strand. Also provided are methods and compositions for reducing target gene expression and methods and compositions for treating a disease of interest.

20 Claims, 16 Drawing Sheets

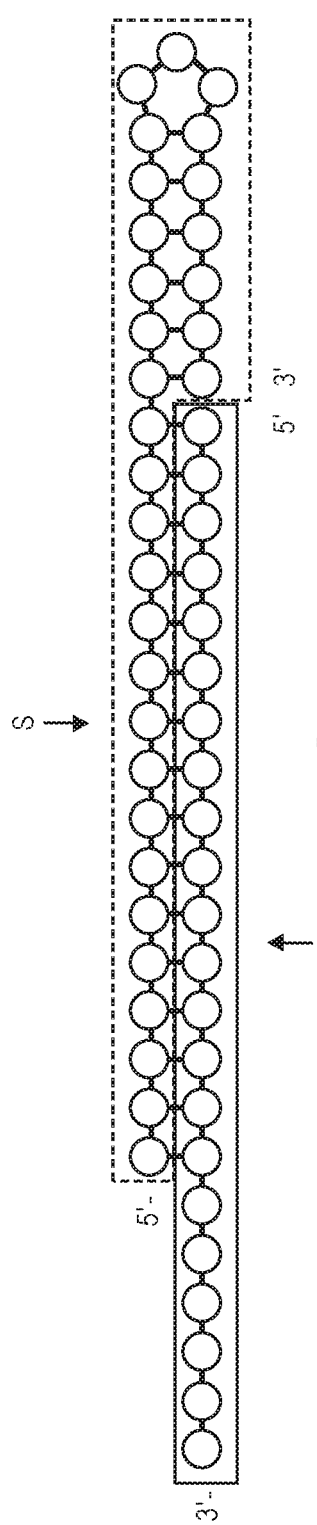 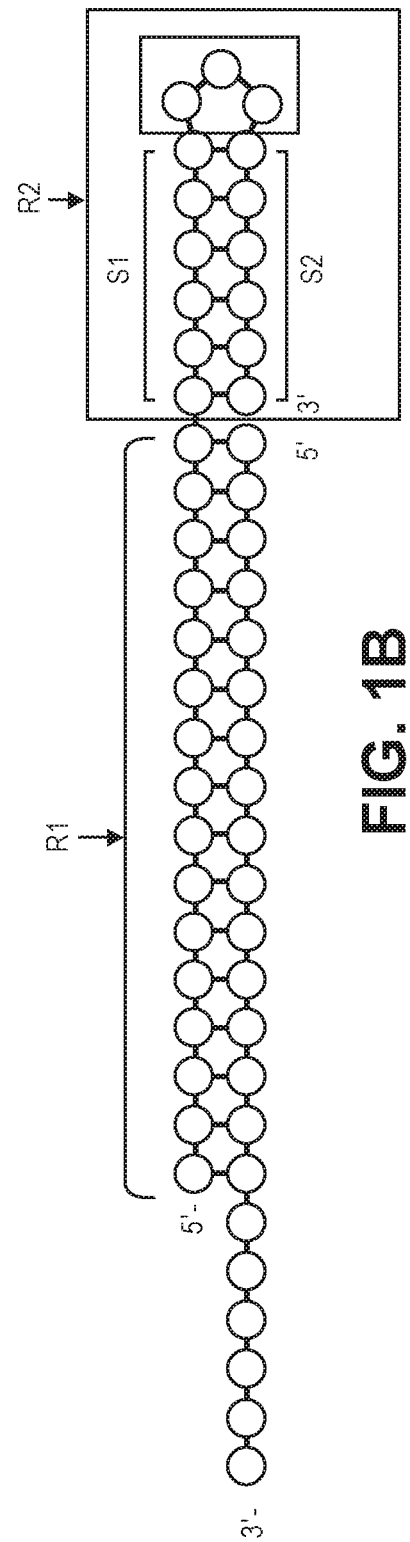

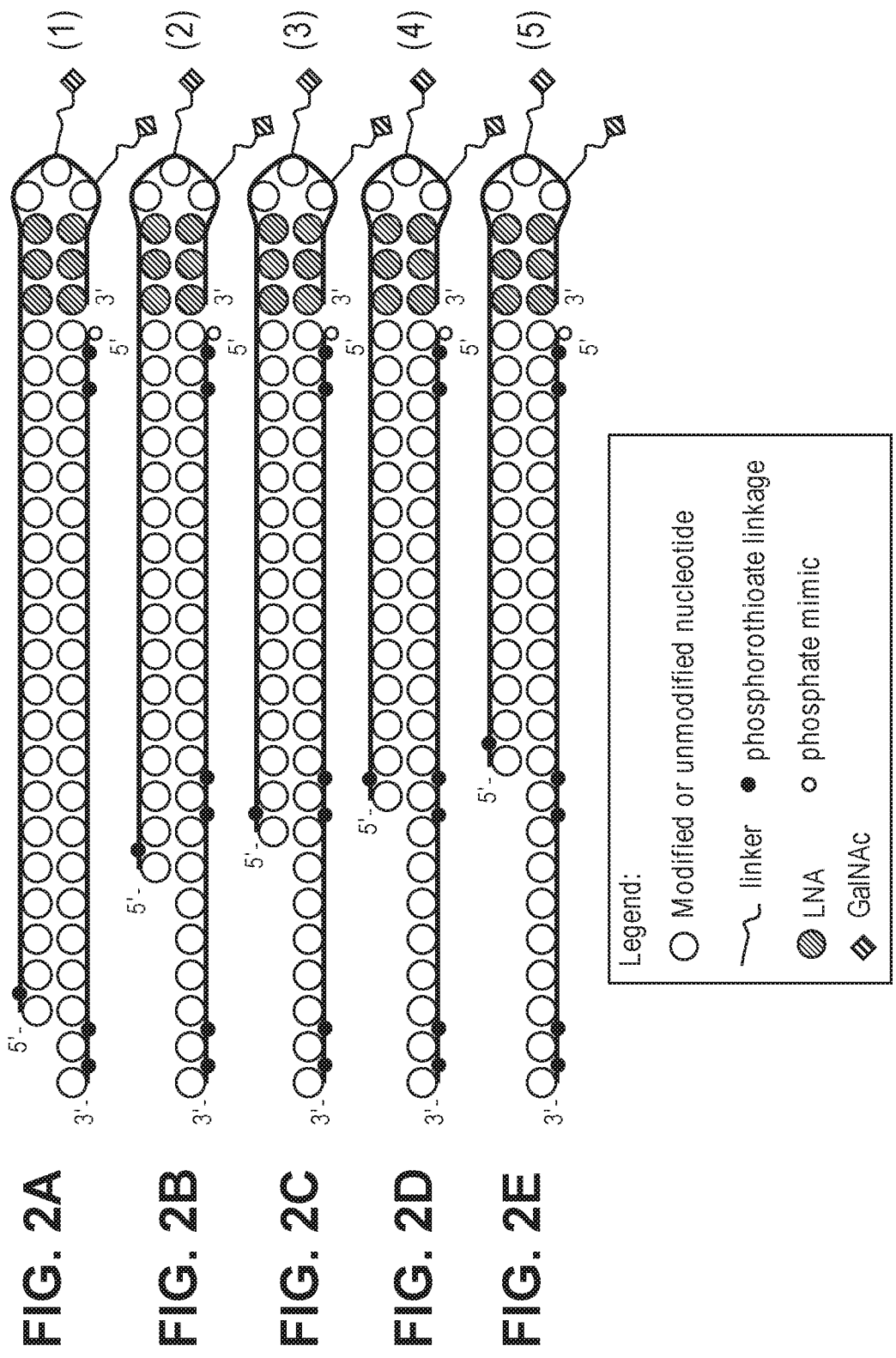

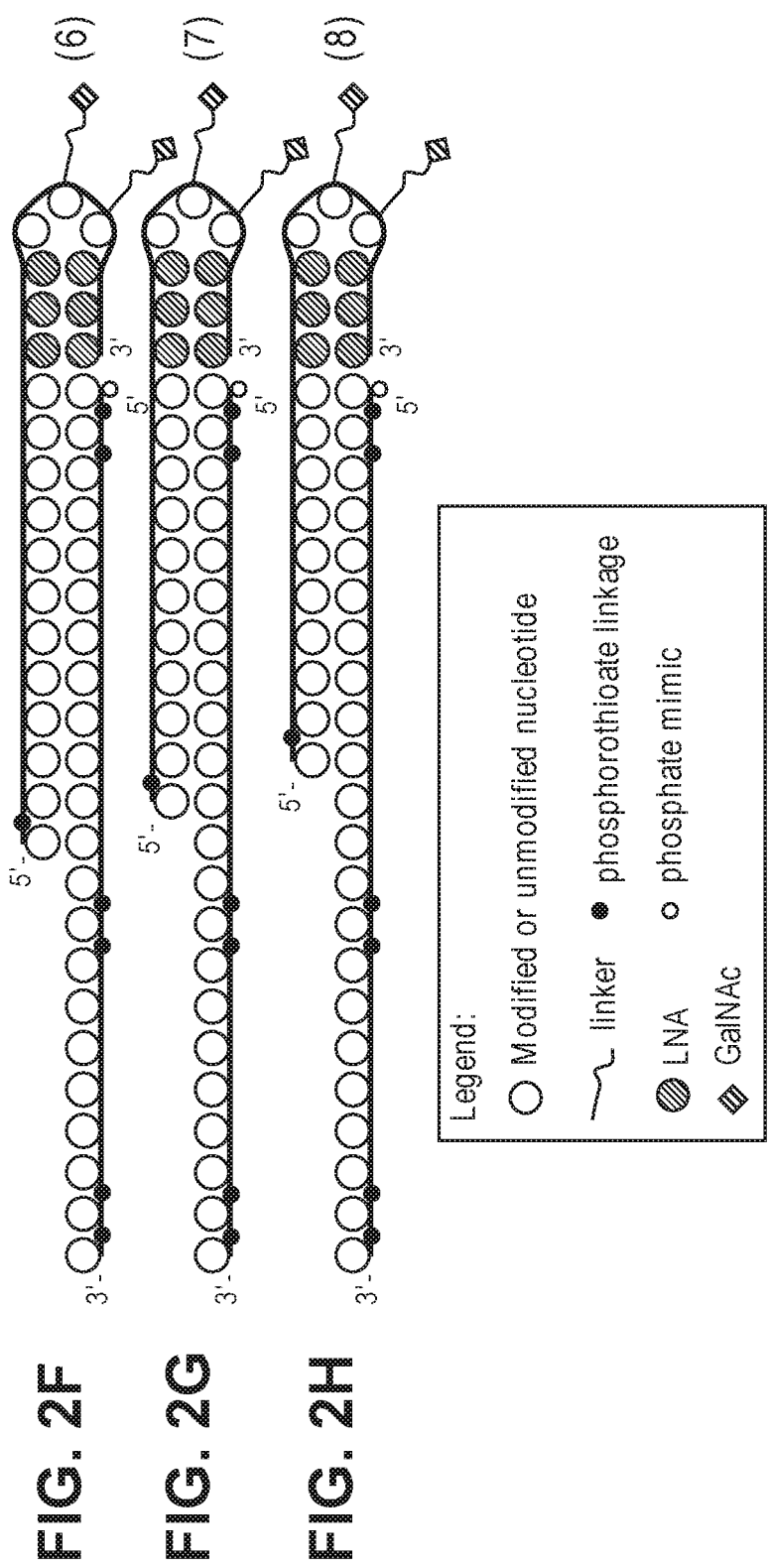

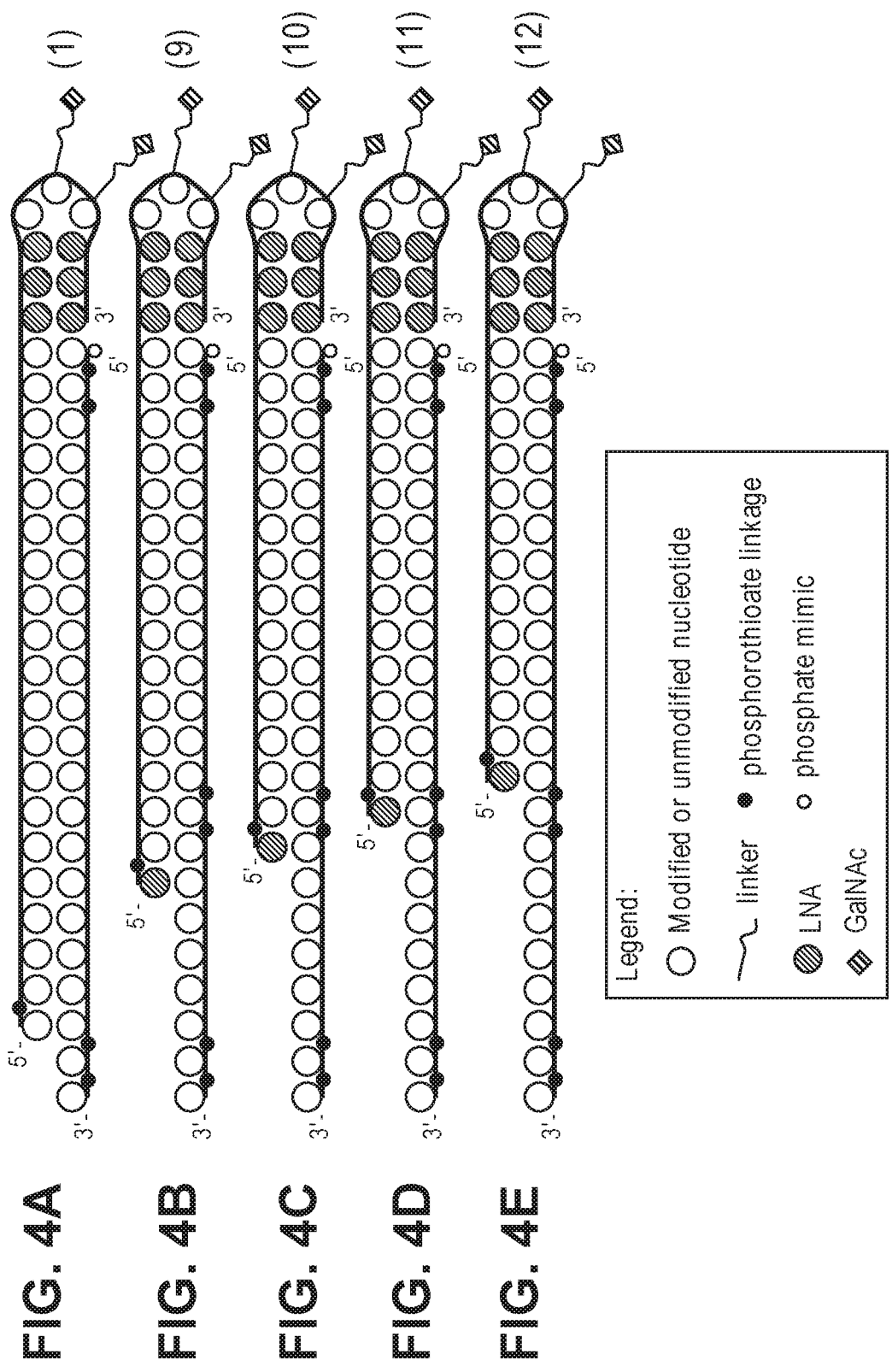

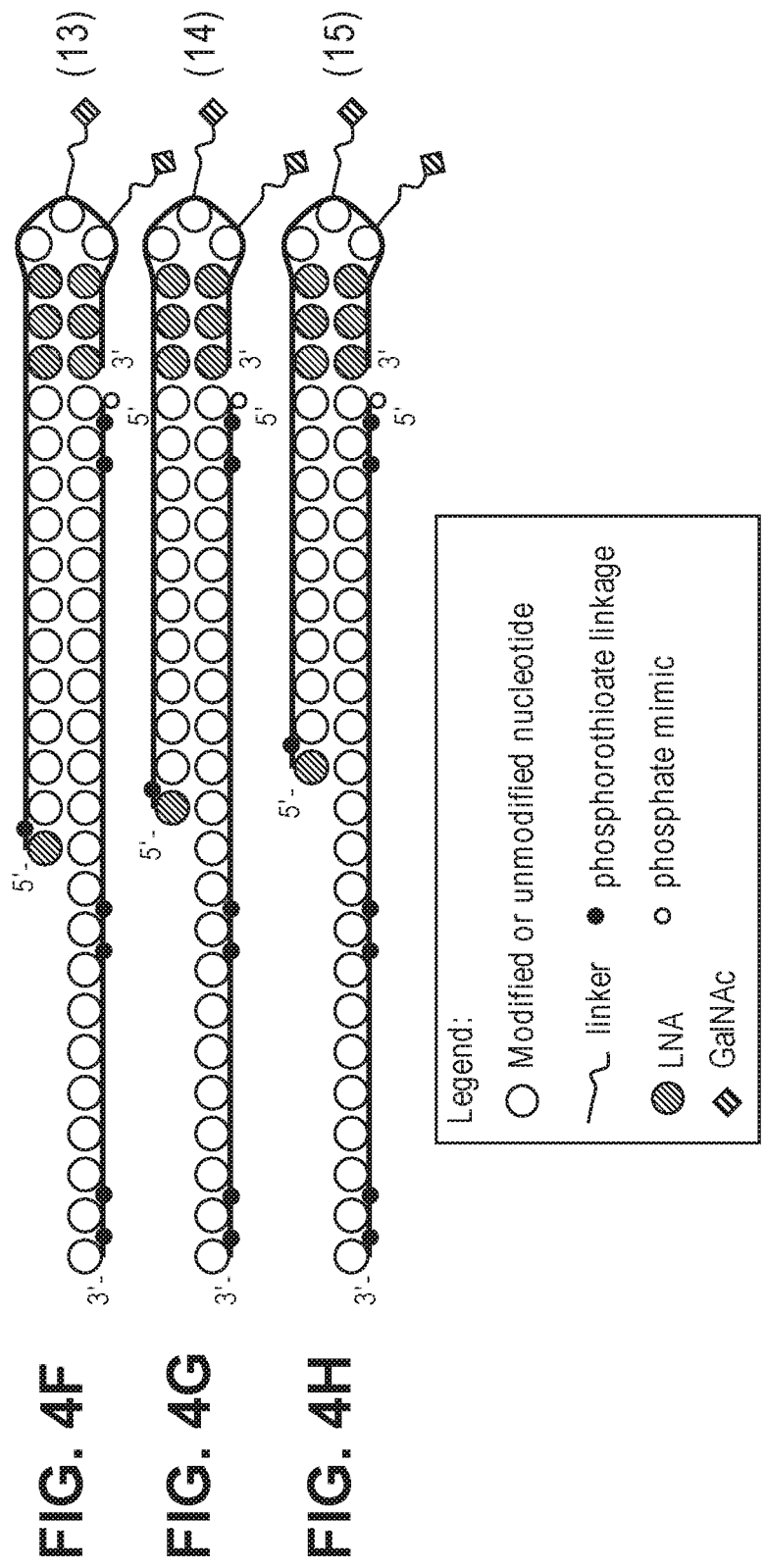

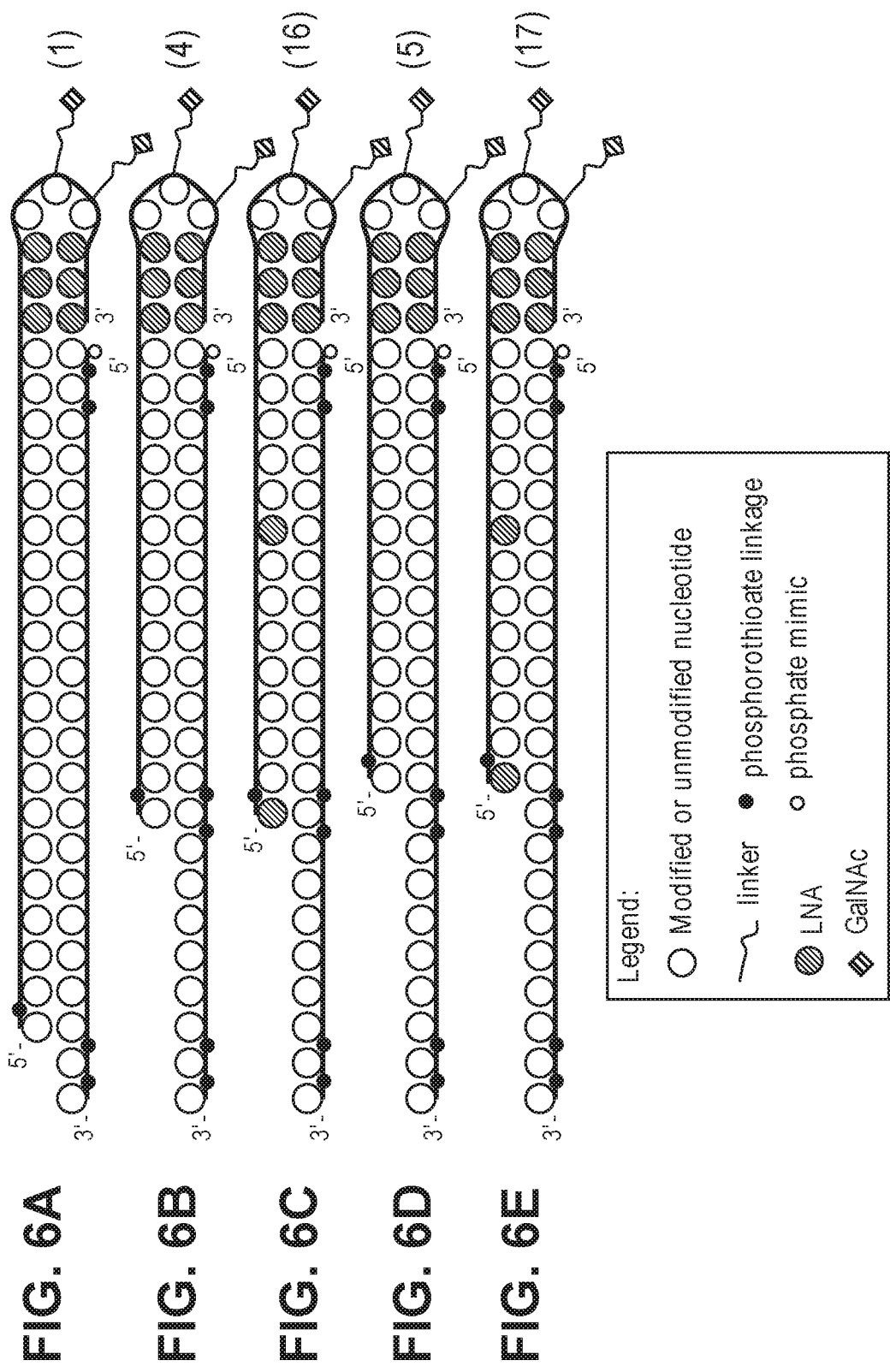

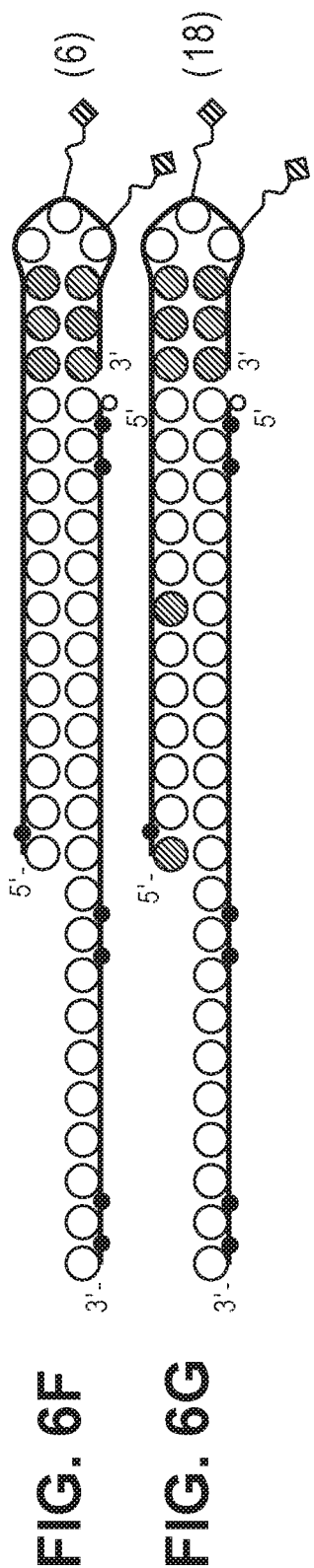

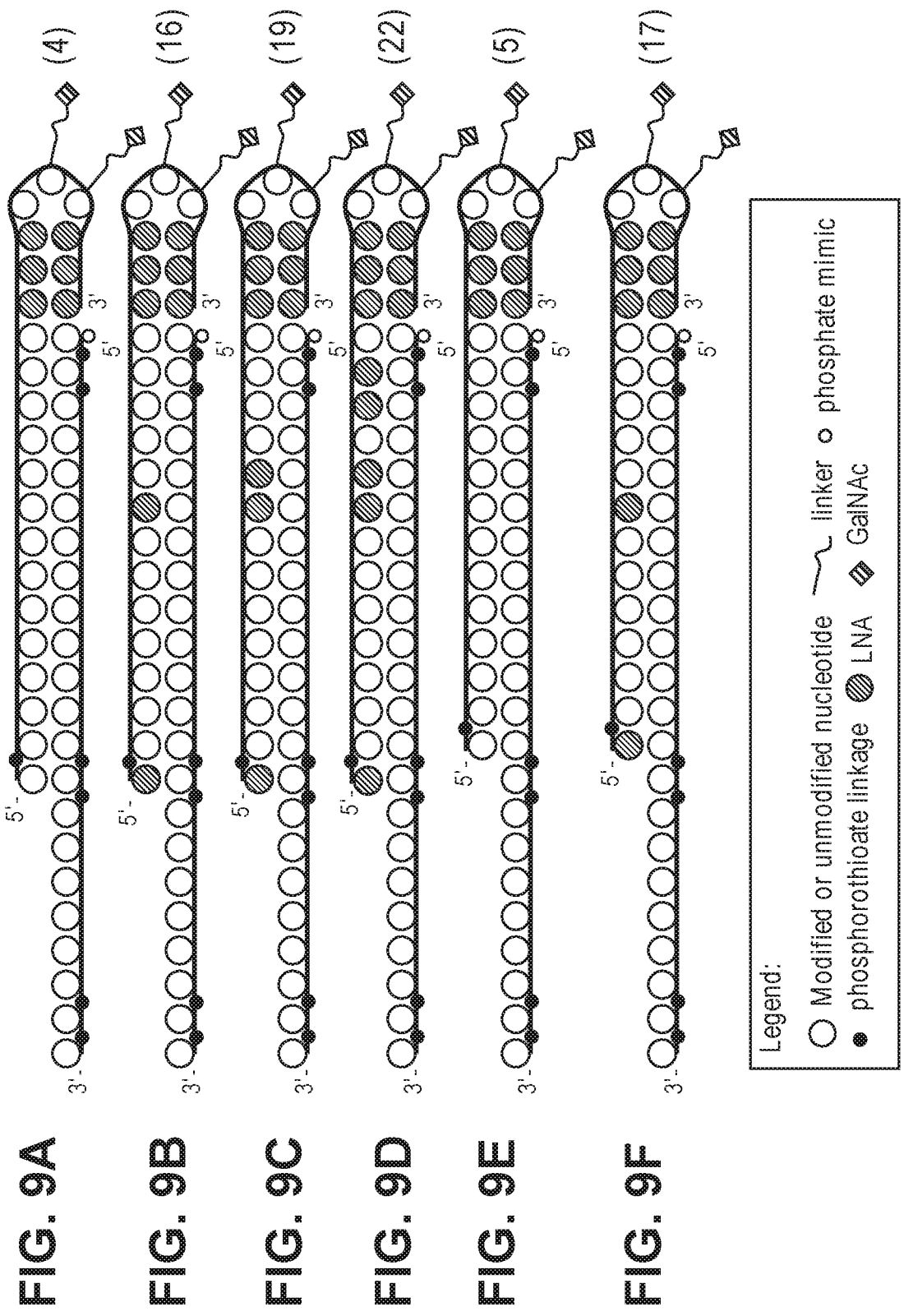

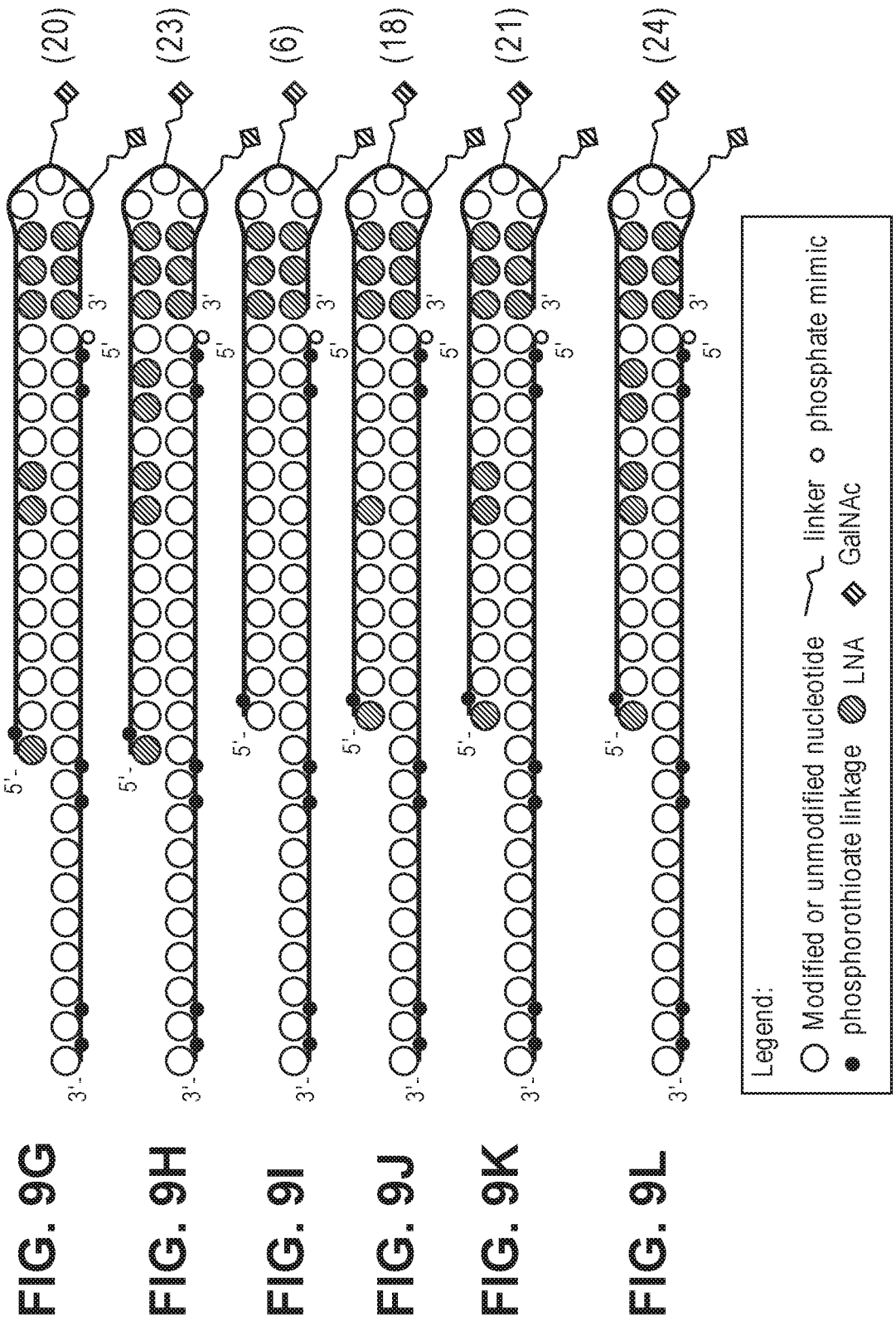

DOUBLE-STRANDED NUCLEIC ACID INHIBITOR MOLECULES WITH SHORTENED SENSE STRANDS

CROSS REFERENCE TO RELATED APPLICATIONS

This application is a U.S. National Stage application of PCT/US2020/030398, filed on 29 Apr. 2020, which claims the benefit of, and relies on the filing date of, U.S. provisional patent application No. 62/842,908, filed 3 May 2019. The entire contents of each related application referenced in this paragraph is incorporated herein by reference in its entirety.

BACKGROUND

Oligonucleotides are polymeric sequences of nucleotides (RNA, DNA and their analogs). Nucleic acid inhibitor molecules are oligonucleotides that modulate intracellular RNA levels and have demonstrated early promise in the treatment of cancers, viral infections and genetic disorders. Nucleic acid inhibitor molecules can modulate RNA expression through a diverse set of mechanisms, including RNA interference (RNAi).

RNAi is a conserved pathway found in most eukaryotes where double-stranded RNA molecules (dsRNA) inhibit the expression of target genes having sequences complementary to the dsRNA. In the typical RNAi pathway, longer dsRNA are cleaved by the Dicer enzyme into shorter RNA duplexes called small interfering RNA ("siRNA"). The siRNA has been shown to associate with Dicer, trans-activating response RNA-binding protein (TRBP), and Argonaute 2 ("Ago2") to form a complex, sometimes referred to as the RNA-induced silencing complex ("RISC"). Ago2 is an endonuclease that cleaves target mRNA using the antisense strand (also called the guide strand) of the siRNA to direct the sequence specificity of the target mRNA cleavage.

A variety of double-stranded RNAi inhibitor molecule structures have been developed over the years. For example, early work on RNAi inhibitor molecules focused on double-stranded nucleic acid molecules that mimic natural siRNAs, with each strand having sizes of 19-25 nucleotides with at least one 3'-overhang of 1 to 5 nucleotides (see, e.g., U.S. Pat. No. 8,372,968). Subsequently, longer double-stranded RNAi inhibitor molecules that get processed in vivo by the Dicer enzyme to active RNAi inhibitor molecules were developed (see, e.g., U.S. Pat. No. 8,883,996). Later work developed extended double-stranded nucleic acid inhibitor molecules where at least one end of at least one strand is extended beyond the double-stranded targeting region of the molecule, including structures where one of the strands includes a thermodynamically-stabilizing tetraloop structure (see, e.g., U.S. Pat. Nos. 8,513,207, 8,927,705, WO 2010/033225, and WO 2016/100401, each of which is hereby incorporated by reference in its entirety).

In certain instances, chemically modified nucleotides have been introduced into nucleic acid inhibitor molecules to introduce properties that may be desired under specific conditions, such as conditions experienced following in vivo administration. Such chemically modified nucleotides include those designed, for example, to stabilize against nucleases or other enzymes that degrade or interfere with the structure or activity of the oligonucleotide, to increase cellular uptake of the oligonucleotide, or to improve the pharmacokinetic properties of the oligonucleotide.

However, the desire to develop new double-stranded nucleic acid inhibitor molecule structures and/or incorporate chemically modified nucleotides to impart desired properties to such nucleic acid inhibitor molecules must be balanced with the competing desire to minimize any negative impact that the structure and/or chemically modified nucleotides might have on the nucleic acid inhibitor molecule's activity (e.g., minimizing any reduction in the potency or duration of target gene knockdown).

SUMMARY

This application is directed to double-stranded nucleic acid inhibitor molecules having a sense strand with a stem loop structure and a separate antisense strand, where the sense strand has a reduced length at its 5'-end, resulting in a longer single-stranded overhang at the 3'-end of the antisense strand. The double-stranded nucleic acid inhibitor molecule contains 1) a first duplex (D1) between a first region (R1) of the sense strand (S) and the antisense strand (AS); 2) a second duplex (D2) in a second region (R2) of the sense strand that corresponds to the stem of the stem loop structure; and 3) a loop connecting the first subregion (S1) and second subregion (S2) of R2. See FIGS. 1A-D. In addition, the stem loop structure typically contains a tetraloop or triloop and is located at the 5'- or 3'-end of the sense strand. Surprisingly, it was found that the 5'-end of the sense strand could be substantially shortened without reducing potency of the double-stranded nucleic acid inhibitor molecule. See e.g. Examples 1-4.

Additionally, as previously demonstrated in U.S. Provisional Application Nos. 62/657,428 and 62/778,759, incorporating $T_m$-increasing nucleotides (e.g., bicyclic nucleotides) into the stem duplex (D2) of double-stranded nucleic acid inhibitor molecules containing a tetraloop or a triloop may impart increased stability to the double-stranded nucleic acid inhibitor molecules, as evidenced, in part, by enhanced duration of in vivo target mRNA knock down. It is further disclosed herein that incorporating additional $T_m$-increasing nucleotides into the first region (R1) of the shortened sense strand of the double-stranded nucleic acid inhibitor molecules disclosed herein, for example at one or more of nucleotides 1, 7, 8, 9, or 10, may impart increased stability to the shortened sense strand nucleic acid inhibitor molecules. See, e.g., Examples 2 and 3.

One aspect is directed to a double-stranded nucleic acid inhibitor molecule, comprising:
   a sense strand comprising 15-43 nucleotides and having a first region (R1) and a second region (R2);
   an antisense strand comprising 18-35 nucleotides and a 5'- and 3'-end, wherein the antisense strand has a single-stranded overhang of 6-10 nucleotides at the 3'-end and wherein the sense strand and antisense strand are separate strands;
   a first duplex (D1) formed by the first region of the sense strand and the antisense strand, wherein the first duplex has a length of 8-29 base pairs;
   wherein the second region of the sense strand comprises a first subregion (S1), a second subregion (S2) and a single-stranded loop that joins the first and second subregions, wherein the first and second subregions form a second duplex (D2); and
   wherein the second duplex has a length of 6 base pairs and does not contain a $T_m$-increasing nucleotide or has a length of 1-5 base pairs and comprises at least one $T_m$-increasing nucleotide.

In certain embodiments of the double-stranded nucleic acid inhibitor molecule, the sense strand has 15-30 nucleotides; the antisense strand has 20 nucleotides, including a single-stranded overhang of 6-10 nucleotides at the 3'-end; and the first duplex has a length of 10-14 base pairs.

In certain embodiments of the double-stranded nucleic acid inhibitor molecule, the sense strand has 16-31 nucleotides; the antisense strand has 21 nucleotides, including a single-stranded overhang of 6-10 nucleotides at the 3'-end; and the first duplex has a length of 11-15 base pairs.

In certain embodiments of the double-stranded nucleic acid inhibitor molecule, the sense strand has 17-32 nucleotides; the antisense strand has 22 nucleotides, including a single-stranded overhang of 6-10 nucleotides at the 3'-end; and the first duplex has a length of 12-16 base pairs.

In certain embodiments of the double-stranded nucleic acid inhibitor molecule, the sense strand has 18-33 nucleotides; the antisense strand has 23 nucleotides, including a single-stranded overhang of 6-10 nucleotides at the 3'-end; and the first duplex has a length of 13-17 base pairs.

In certain embodiments of the double-stranded nucleic acid inhibitor molecule, the sense strand has 19-34 nucleotides; the antisense strand has 24 nucleotides, including a single-stranded overhang of 6-10 nucleotides at the 3'-end; and the first duplex has a length of 14-18 base pairs.

In certain embodiments of the double-stranded nucleic acid inhibitor molecule, the sense strand has 20-35 nucleotides; the antisense strand has 25 nucleotides, including a single-stranded overhang of 6-10 nucleotides at the 3'-end; and the first duplex has a length of 15-19 base pairs.

In certain embodiments of the double-stranded nucleic acid inhibitor molecule, the sense strand has 21-36 nucleotides; the antisense strand has 26 nucleotides, including a single-stranded overhang of 6-10 nucleotides at the 3'-end; and the first duplex has a length of 16-20 base pairs.

In certain embodiments of the double-stranded nucleic acid inhibitor molecule, the sense strand has 22-37 nucleotides; the antisense strand has 27 nucleotides, including a single-stranded overhang of 6-10 nucleotides at the 3'-end; and the first duplex has a length of 17-21 base pairs.

In certain embodiments of the double-stranded nucleic acid inhibitor molecule, the sense strand has 23-38 nucleotides; the antisense strand has 28 nucleotides, including a single-stranded overhang of 6-10 nucleotides at the 3'-end; and the first duplex has a length of 18-22 base pairs.

In certain embodiments of the double-stranded nucleic acid inhibitor molecule, the sense strand has 24-39 nucleotides; the antisense strand has 29 nucleotides, including a single-stranded overhang of 6-10 nucleotides at the 3'-end; and the first duplex has a length of 19-23 base pairs.

In certain embodiments of the double-stranded nucleic acid inhibitor molecule, the sense strand has 25-40 nucleotides; the antisense strand has 30 nucleotides, including a single-stranded overhang of 6-10 nucleotides at the 3'-end; and the first duplex has a length of 20-24 base pairs.

In certain embodiments of the double-stranded nucleic acid inhibitor molecule, the sense strand has 26-41 nucleotides; the antisense strand has 31 nucleotides, including a single-stranded overhang of 6-10 nucleotides at the 3'-end; and the first duplex has a length of 21-25 base pairs.

In certain embodiments of the double-stranded nucleic acid inhibitor molecule, the sense strand has 27-42 nucleotides; the antisense strand has 32 nucleotides, including a single-stranded overhang of 6-10 nucleotides at the 3'-end; and the first duplex has a length of 22-26 base pairs.

In certain embodiments of the double-stranded nucleic acid inhibitor molecule, the sense strand has 28-43 nucleotides; the antisense strand has 33 nucleotides, including a single-stranded overhang of 6-10 nucleotides at the 3'-end; and the first duplex has a length of 23-27 base pairs.

In certain embodiments, the antisense strand has 20-24, 21-23, or 22 nucleotides. In certain embodiments, the antisense strand has a single-stranded overhang of 7-9 nucleotides at its 3'-end.

In certain embodiments, the first duplex (D1) has a length of 12-16 base pairs.

In certain embodiments, the loop is a tetraloop or a triloop.

In certain embodiments, the double-stranded nucleic acid inhibitor molecule, comprises:
  a sense strand comprising 21-32 nucleotides and having a first region (R1) and a second region (R2);
  an antisense strand comprising 22 nucleotides and a 5'- and 3'-end, wherein the antisense strand has a single-stranded overhang of 6-10 nucleotides at the 3'-end and wherein the sense strand and antisense strand are separate strands;
  a first duplex (D1) formed by the first region of the sense strand and the antisense strand, wherein the first duplex has a length of 12-16 base pairs;
  wherein the second region of the sense strand comprises a first subregion (S1), a second subregion (S2) and a single-stranded triloop or tetraloop that joins the first and second subregions, wherein the first and second subregions form a second duplex (D2); and
  wherein the second duplex has a length of 6 base pairs and does not contain a $T_m$-increasing nucleotide or has a length of 3-5 base pairs and comprises at least one $T_m$-increasing nucleotide.

In certain embodiments, at least one nucleotide in the antisense strand is modified with a 2'-F and flanked on both sides by a phosphorous-containing internucleotide linkage other than a phosphodiester linkage. In certain embodiments, the antisense strand contains at least two nucleotides modified with a 2'-F that are flanked by a phosphorous-containing internucleotide linkage other than a phosphodiester linkage. In certain embodiments, nucleotide 14 of the antisense strand is modified with a 2'-F and is linked to nucleotides 13 and 15 of the antisense strand by a phosphorous-containing internucleotide linkage other than a phosphodiester linkage. In certain embodiments, nucleotide 2 of the antisense strand is modified with a 2'-F and is linked to nucleotides 1 and 3 of the antisense strand by a phosphorous-containing internucleotide linkage other than a phosphodiester linkage. In certain embodiments, nucleotides 2 and 14 of the antisense strand are modified with a 2'-F and nucleotide 14 and flanked on both sides by a phosphorous-containing internucleotide linkage other than a phosphodiester linkage. In certain embodiments, the phosphorous-containing internucleotide linkage is a phosphorothioate linkage.

In certain embodiments, region 1 of the sense strand contains at least one $T_m$-increasing nucleotide. In certain embodiments, nucleotide 1 of the sense strand is a bicyclic nucleotide. In certain embodiments, region 1 of the sense strand contains up to three $T_m$-increasing nucleotides.

In certain embodiments, a nucleotide in region 1 of the sense strand that base pairs with nucleotide 6 of the antisense strand is a $T_m$-increasing nucleotide and/or a nucleotide in region 1 of the sense strand that base pairs with nucleotide 5 of the antisense strand is a $T_m$-increasing nucleotide. In certain embodiments, none of the nucleotides in region 1 of the sense strand that base pair with nucleotides 1~4 of the antisense strand is a $T_m$-increasing nucleotide.

In certain embodiments, the second duplex has a length of 1-3 base pairs and contains at least one $T_m$-increasing nucleotide. In certain embodiments, the second duplex contains 2-10 $T_m$-increasing nucleotides and has a length of 1-5 base pairs or the second duplex contains 2-6 $T_m$-increasing nucleotides and has a length of 1-3 base pairs.

In certain embodiments of the double-stranded nucleic acid inhibitor molecule, the sense strand is between 16-33 nucleotides in length, the antisense strand is between 21-23 nucleotides in length, the first duplex has a length of 12-17 base pairs, and the second duplex has a length of 1-3 base pairs and contains at least one $T_m$-increasing nucleotide.

In certain embodiments of the double-stranded nucleic acid inhibitor molecule, the first region of the sense strand is 12-16 nucleotides in length and the second region of the sense strand is 5-10 nucleotides in length and contains a triloop or tetraloop;
  wherein the first duplex formed by the first region of the sense strand and the antisense strand has a length of 12-16 base pairs;
  wherein the second duplex formed by the first and second nucleic acids of the second region of the sense strand has a length of 3 base pairs, 2 base pairs, or 1 base pair and contains at least one $T_m$-increasing nucleotide; and
  wherein the antisense strand is 22 nucleotides in length, including a single-stranded overhang of 6-10 nucleotides at the 3'-end.

In certain embodiments, the second region of the sense strand is five or six nucleotides in length and the second duplex (D2) has a length of 1 base pair and contains at least one $T_m$-increasing nucleotide. In certain embodiments, the second duplex (D2) comprises at least two $T_m$-increasing nucleotides.

In certain embodiments, the loop is a tetraloop, and the tetraloop is an RNA tetraloop selected from UNCG, GNRA, CUUG, A/UGNN, GGUG, RNYA, AGNN or a DNA tetraloop selected from d(GNAB), d(CNNG), or d(TNCG). In certain embodiments, the tetraloop has the sequence GAAA.

In certain embodiments, the loop is a triloop. In certain embodiments, the triloop has the sequence GAA.

In certain embodiments of the double-stranded nucleic acid inhibitor molecules described herein, the $T_m$-increasing nucleotide is selected from the group consisting of a bicyclic nucleotide, a tricyclic nucleotide, a G-clamp and analogues thereof, a hexitol nucleotide, and a modified nucleotide, wherein the modified nucleotide is not modified at the 2'-carbon of the sugar moiety with a 2'-F or a 2'-OMe. In certain embodiments the modified nucleotide is a 5-bromo-uracil, a 5-iodo-uracil, 5-propynyl-modified pyrimidine, a 2-amino adenine, a 2-thio uridine, 5 Me-thio uridine, or a pseudo uridine.

In certain embodiments, the at least one bicyclic nucleotide comprises a first ring, wherein the first ring is a furanosyl, and a bridge that connects the 2'-carbon and the 4'-carbon of the furanosyl to form a second ring.

In certain embodiments, the bridge that connects the 2'-carbon and the 4'-carbon of the furanosyl is selected from the group consisting of:
  a) 4'-CH$_2$—O—N(R)-2' and 4'-CH$_2$—N(R)—O-2', wherein R is H, C$_1$-C$_{12}$ alkyl, or a protecting group, including, for example, 4'-CH$_2$—NH—O-2' (also known as BNA$^{NC}$) or 4'-CH$_2$—N(CH$_3$)—O-2' (also known as BNA$^{NC}$[NMe]);
  b) 4'-CH$_2$-2'; 4'-(CH$_2$)$_2$-2'; 4'-(CH$_2$)$_3$-2'; 4'-(CH$_2$)—O-2' (also known as LNA); 4'-(CH$_2$)—S-2; 4'-(CH$_2$)$_2$—O-2' (also known as ENA); 4'-CH(CH$_3$)—O-2' (also known as cEt); and 4'-CH(CH$_2$OCH$_3$)—O-2' (also known as cMOE), and analogs thereof;
  c) 4'-C(CH$_3$)(CH$_3$)—O-2' and analogs thereof;
  d) 4'-CH$_2$—N(OCH$_3$)-2' and analogs thereof;
  e) 4'-CH$_2$—O—N(CH$_3$)-2' and analogs thereof,
  f) 4'-CH$_2$—C(H)(CH$_3$)-2' and analogs thereof, and
  g) 4'-CH$_2$—C(=CH$_2$)-2' and analogs thereof.

In certain embodiments, the tetraloop or triloop comprises at least one ligand conjugated nucleotide. In certain embodiments, the tetraloop comprises two, three, or four ligand conjugated nucleotides or the triloop comprises two or three conjugated nucleotides. In certain embodiments, the ligand is a GalNAc. In certain embodiments, the GalNAc is conjugated to the nucleotide at the 2'-position of the sugar moiety.

In certain embodiments, the double-stranded nucleic acid inhibitor further comprises a 5'-phosphate mimic at the 5'-terminus of the sense strand and/or the antisense strand.

In certain embodiments, the double-stranded nucleic acid inhibitor molecule is formulated with a lipid nanoparticle. In certain embodiments, the lipid nanoparticle comprises core lipids and envelope lipids, wherein the core lipids comprise a first cationic lipid and a first pegylated lipid and wherein the envelope lipids comprise a second cationic lipid, a neutral lipid, a sterol, and a second pegylated lipid. In certain embodiments, the first cationic lipid is DL-048, the first pegylated lipid is DSG-mPEG, the second cationic lipid is DL-103, the neutral lipid is DSPC, the sterol is cholesterol, and the second pegylated lipid is DSPE-mPEG.

Another aspect is directed to a composition comprising a therapeutically effective amount of a shortened sense strand double-stranded nucleic acid inhibitor molecule as described herein and an excipient. In certain embodiments, the composition is a pharmaceutical composition and the excipient is a pharmaceutically-acceptable excipient.

Another aspect is directed to a method for reducing expression of a target gene in a subject comprising administering the double-stranded nucleic acid inhibitor molecule or pharmaceutical composition to a subject in need thereof in an amount sufficient to reduce expression of the target gene. In certain embodiments, the target gene is a structural gene, a housekeeping gene, a gene that encodes a transcription factor, a gene that encodes a motility factor, a gene that encodes a cell cycle factor, a gene that encodes a cell cycle inhibitor, a gene that encodes an enzyme, a gene that encodes a growth factor, a gene that encodes a cytokine, or a gene that encodes a tumor suppressor. In certain embodiments, the administering step comprises intravenous, intramuscular, or subcutaneous administration. In certain embodiments, the subject is a human.

BRIEF DESCRIPTION OF THE DRAWINGS

The accompanying drawings, which are incorporated in and constitute a part of this specification, illustrate certain embodiments, and together with the written description, serve to explain certain principles of the compositions and methods disclosed herein.

FIG. 1A shows a schematic of an exemplary double-stranded nucleic acid inhibitor molecule with an antisense strand ("AS") and a sense strand ("S"), where the sense strand contains a stem loop structure and where the loop is a triloop. The AS and S strands are separate strands, each having a 5'-end and a 3'-end, as shown.

FIG. 1B shows the same exemplary schematic as in FIG. 1A. In FIG. 1B, the sense strand is further divided into a first region (R1) that forms a duplex with the antisense strand (AS) and a second region (R2) that includes a loop (L) that joins a first subregion (S1) with a second subregion (S2), where S1 and S2 are sufficiently complementary to each other to form a duplex, also referred to herein as a "stem" or "stem duplex."

FIG. 2A schematically shows the structure of an exemplary, control double-stranded nucleic acid inhibitor molecule ("Construct 1") that targets a gene sequence of interest, as discussed in Example 1 and does not contain a shortened sense strand. The sense strand of Construct 1 includes 29 nucleotides. The 3'-end of the antisense strand of Construct 1 contains an overhang of two nucleotides.

FIG. 2B schematically shows the structure of an exemplary double-stranded nucleic acid inhibitor molecule ("Construct 2") that targets a gene sequence of interest, as discussed in Example 1. The sense strand of Construct 2 includes 25 nucleotides. The 3'-end of the antisense strand of Construct 2 contains an overhang of 6 nucleotides.

FIG. 2C schematically shows the structure of an exemplary double-stranded nucleic acid inhibitor molecule ("Construct 3") that targets a gene sequence of interest, as discussed in Example 1. The sense strand of Construct 3 includes 24 nucleotides. The 3'-end of the antisense strand of Construct 3 contains an overhang of 7 nucleotides.

FIG. 2D schematically shows the structure of an exemplary double-stranded nucleic acid inhibitor molecule ("Construct 4") that targets a gene sequence of interest, as discussed in Example 1. The sense strand of Construct 4 includes 23 nucleotides. The 3'-end of the antisense strand of Construct 4 contains an overhang of 8 nucleotides.

FIG. 2E schematically shows the structure of an exemplary double-stranded nucleic acid inhibitor molecule ("Construct 5") that targets a gene sequence of interest, as discussed in Example 1. The sense strand of Construct 5 includes 22 nucleotides. The 3'-end of the antisense strand of Construct 5 contains an overhang of 9 nucleotides.

FIG. 2F schematically shows the structure of an exemplary double-stranded nucleic acid inhibitor molecule ("Construct 6") that targets a gene sequence of interest, as discussed in Example 1. The sense strand of Construct 6 includes 21 nucleotides. The 3'-end of the antisense strand of Construct 6 contains an overhang of 10 nucleotides.

FIG. 2G schematically shows the structure of an exemplary double-stranded nucleic acid inhibitor molecule ("Construct 7") that targets a gene sequence of interest, as discussed in Example 1. The sense strand of Construct 7 includes 20 nucleotides. The 3'-end of the antisense strand of Construct 7 contains an overhang of 11 nucleotides.

FIG. 2H schematically shows the structure of an exemplary double-stranded nucleic acid inhibitor molecule ("Construct 8") that targets a gene sequence of interest, as discussed in Example 1. The sense strand of Construct 8 includes 19 nucleotides. The 3'-end of the antisense strand of Construct 8 contains an overhang of 12 nucleotides.

FIG. 4A schematically shows the structure of an exemplary, control double-stranded nucleic acid inhibitor molecule ("Construct 1") that targets a gene sequence of interest, as discussed in Example 2, and does not contain a shortened sense strand. The sense strand of Construct 1 includes 29 nucleotides. The 3'-end of the antisense strand of Construct 1 contains an overhang of 2 nucleotides.

FIG. 4B schematically shows the structure of an exemplary double-stranded nucleic acid inhibitor molecule ("Construct 9") that targets a gene sequence of interest, as discussed in Example 2. The sense strand of Construct 9 includes 25 nucleotides, including an LNA at nucleotide 1. The 3'-end of the antisense strand of Construct 9 contains an overhang of 6 nucleotides.

FIG. 4C schematically shows the structure of an exemplary double-stranded nucleic acid inhibitor molecule ("Construct 10") that targets a gene sequence of interest, as discussed in Example 2. The sense strand of Construct 10 includes 24 nucleotides, including an LNA at nucleotide 1. The 3'-end of the antisense strand of Construct 10 contains an overhang of 7 nucleotides.

FIG. 4D schematically shows the structure of an exemplary double-stranded nucleic acid inhibitor molecule ("Construct 11") that targets a gene sequence of interest, as discussed in Example 2. The sense strand of Construct 11 includes 23 nucleotides, including an LNA at nucleotide 1. The 3'-end of the antisense strand of Construct 11 contains an overhang of 8 nucleotides.

FIG. 4E schematically shows the structure of an exemplary double-stranded nucleic acid inhibitor molecule ("Construct 12") that targets a gene sequence of interest, as discussed in Example 2. The sense strand of Construct 12 includes 22 nucleotides, including an LNA at nucleotide 1. The 3'-end of the antisense strand of Construct 12 contains an overhang of 9 nucleotides.

FIG. 4F schematically shows the structure of an exemplary double-stranded nucleic acid inhibitor molecule ("Construct 13") that targets a gene sequence of interest, as discussed in Example 2. The sense strand of Construct 13 includes 21 nucleotides, including an LNA at nucleotide 1. The 3'-end of the antisense strand of Construct 13 contains an overhang of 10 nucleotides.

FIG. 4G schematically shows the structure of an exemplary double-stranded nucleic acid inhibitor molecule ("Construct 14") that targets a gene sequence of interest, as discussed in Example 2. The sense strand of Construct 14 includes 20 nucleotides, including an LNA at nucleotide 1. The 3'-end of the antisense strand of Construct 14 contains an overhang of 11 nucleotides.

FIG. 4H schematically shows the structure of an exemplary double-stranded nucleic acid inhibitor molecule ("Construct 15") that targets a gene sequence of interest, as discussed in Example 2. The sense strand of Construct 15 includes 19 nucleotides, including an LNA at nucleotide 1. The 3'-end of the antisense strand of Construct 15 contains an overhang of 12 nucleotides.

Figure 5:
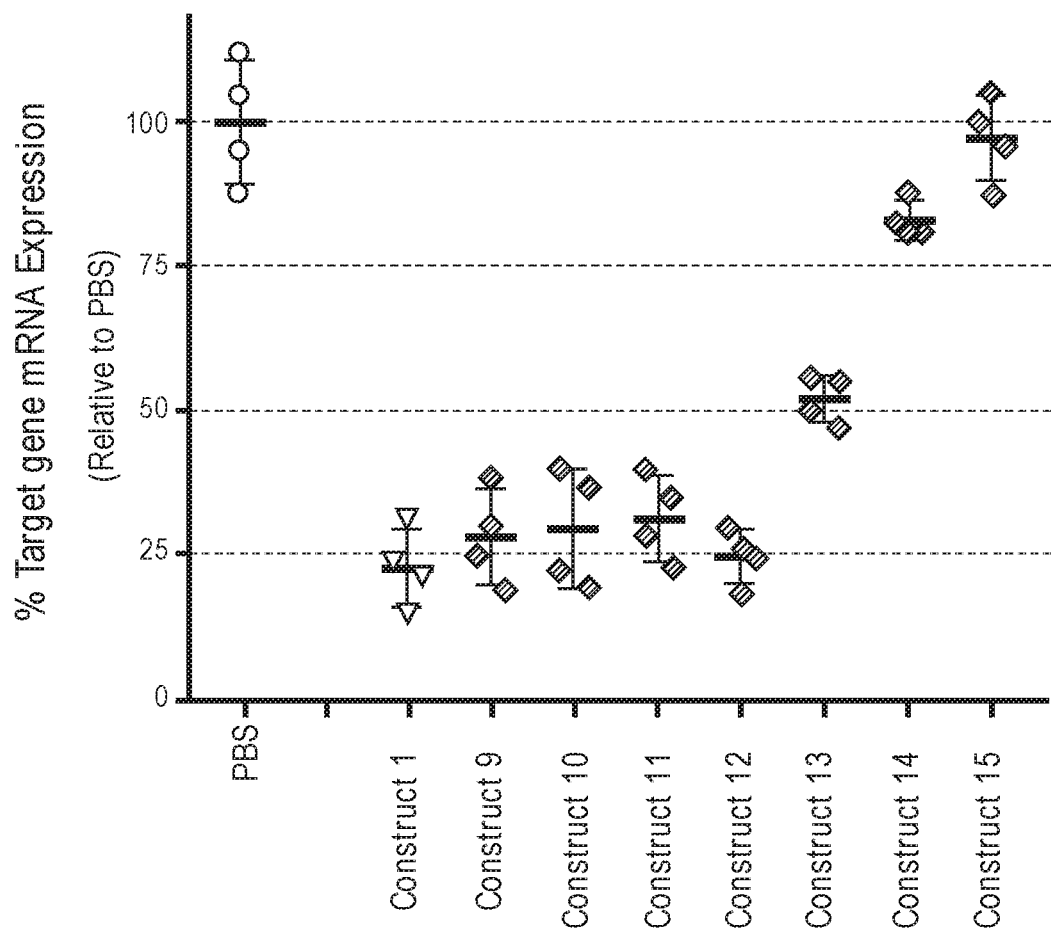

FIG. 5 shows the percent of target gene mRNA remaining 4 days after administering Construct 1 (see FIG. 4A) and Constructs 9-15 (see FIGS. 4B-H) to CD-1 mice, as described in Example 2. Constructs 9-12, having an LNA on the 5'-end of the sense strand and a 3'-end overhang in the antisense strand of 6-9 nucleotides, respectively, maintained potency of gene knockdown as compared to Construct 1. Construct 13, having an LNA on the 5'-end of the sense strand and a 3'-end overhang in the antisense strand of 10 nucleotides, reduced target mRNA expression as compared to the control PBS. Constructs 14 and 15, containing an LNA on the 5'-end of the sense strand and a 3'-end overhang in the antisense strand of 11 and 12 nucleotides, respectively, did not significantly reduce target mRNA expression.

FIG. 6A schematically shows the structure of an exemplary, control double-stranded nucleic acid inhibitor molecule ("Construct 1") that targets a gene sequence of interest, as discussed in Example 3, and does not contain a shortened sense strand. The sense strand of Construct 1 includes 29 nucleotides. The 3'-end of the antisense strand of Construct 1 contains an overhang of 2 nucleotides.

FIG. 6B schematically shows the structure of an exemplary double-stranded nucleic acid inhibitor molecule ("Construct 4") that targets a gene sequence of interest, as discussed in Example 3. The sense strand of Construct 4 includes 23 nucleotides. The 3'-end of the antisense strand of Construct 4 contains an overhang of 8 nucleotides.

FIG. 6C schematically shows the structure of an exemplary double-stranded nucleic acid inhibitor molecule ("Construct 16") that targets a gene sequence of interest, as discussed in Example 3. The sense strand of Construct 16 contains 23 nucleotides, including an LNA at nucleotides 1 and 9. The 3'-end of the antisense strand of Construct 16 contains an overhang of 8 nucleotides.

FIG. 6D schematically shows the structure of an exemplary double-stranded nucleic acid inhibitor molecule ("Construct 5") that targets a gene sequence of interest, as discussed in Example 3. The sense strand of Construct 5 includes 22 nucleotides. The 3'-end of the antisense strand of Construct 5 contains an overhang of 9 nucleotides.

FIG. 6E schematically shows the structure of an exemplary double-stranded nucleic acid inhibitor molecule ("Construct 17") that targets a gene sequence of interest, as discussed in Example 3. The sense strand of Construct 17 contains 22 nucleotides, including an LNA at nucleotides 1 and 8. The 3'-end of the antisense strand of Construct 17 contains an overhang of 9 nucleotides.

FIG. 6F schematically shows the structure of an exemplary double-stranded nucleic acid inhibitor molecule ("Construct 6") that targets a gene sequence of interest, as discussed in Example 3. The sense strand of Construct 6 includes 21 nucleotides. The 3'-end of the antisense strand of Construct 6 contains an overhang of 10 nucleotides.

FIG. 6G schematically shows the structure of an exemplary double-stranded nucleic acid inhibitor molecule ("Construct 18") that targets a gene sequence of interest, as discussed in Example 3. The sense strand of Construct 18 contains 21 nucleotides, including an LNA at nucleotides 1 and 7. The 3'-end of the antisense strand of Construct 18 contains an overhang of 10 nucleotides.

Figure 7:
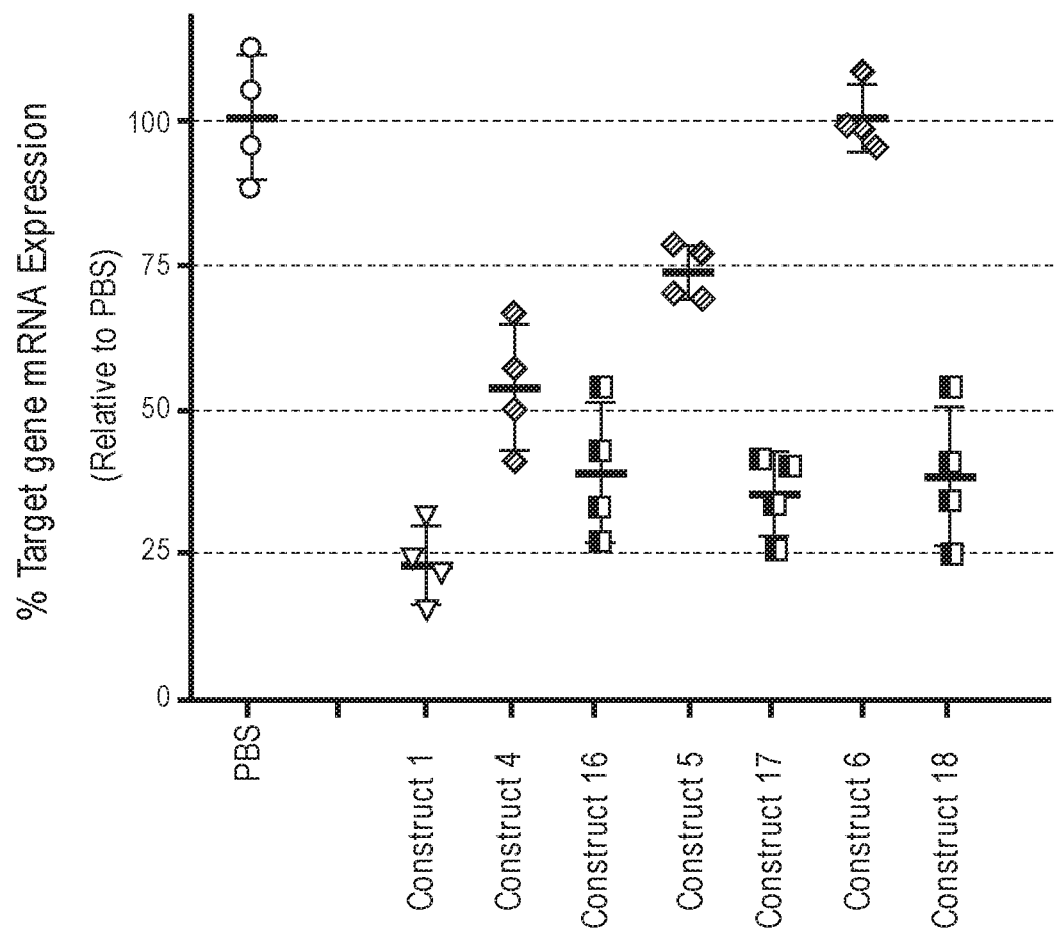

FIG. 7 shows the percent of target gene mRNA remaining 4 days after administering Construct 1 (see FIG. 6A) and Constructs 4-6 and 16-18 (see FIGS. 6B-G) to CD-1 mice, as described in Example 3. Constructs 16, 17, and 18, having an LNA at nucleotide 1 and at nucleotides 9, 8, and 7 of the sense strand, respectively, as well as a 3'-end overhang in the antisense strand of 8, 9, and 10 nucleotides, respectively, reduced target gene expression by over 50%. Potency of gene knockdown for Constructs 16-18 was reduced as compared to Constructs 4-6, having no LNAs in the first region of the sense strand.

Figure 8:
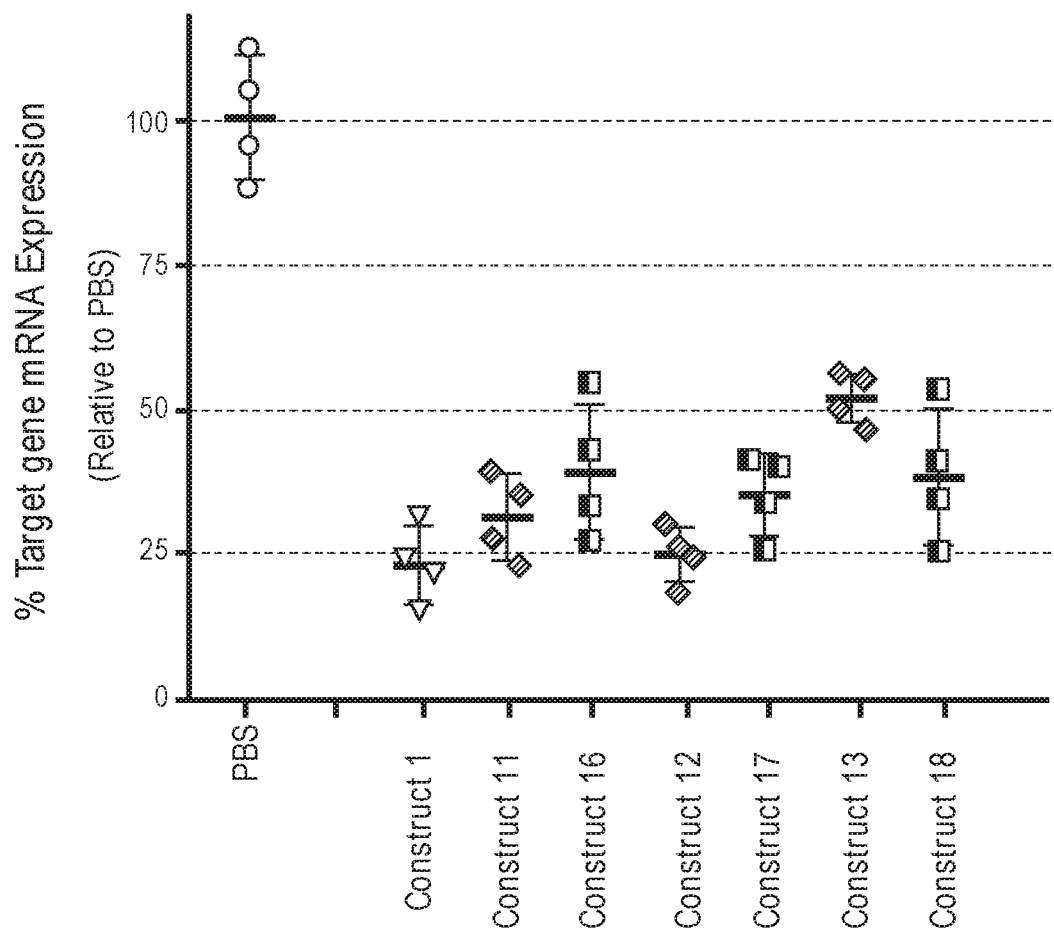

FIG. 8 shows the percent of target gene mRNA remaining 4 days after administering Construct 1 (see FIG. 2A) and Constructs 11-13 (see FIGS. 4D-F) and 16-18 (see FIGS. 6C, 6E, and 6G) to CD-1 mice, as described in Examples 2 and 3. Constructs 16, 17, and 18, having an LNA at nucleotide 1 and at nucleotides 9, 8, and 7 of the sense strand, respectively, as well as an overhang at the 3'-end of the antisense strand of 8, 9, and 10 nucleotides, respectively, maintained potency of gene knockdown as compared to Constructs 11-13, which have a single LNA at nucleotide 1 of the sense strand. Construct 18 (overhang of 10 nucleotides at 3'-end of the antisense strand), which is identical to Construct 13 except for an extra LNA at nucleotide 7 of the sense strand, reduced target gene expression as compared to Construct 13.

FIG. 9A schematically shows the structure of an exemplary double-stranded nucleic acid inhibitor molecule ("Construct 4") that targets a gene sequence of interest, as discussed in Example 4. The sense strand of Construct 4 includes 23 nucleotides, wherein there are no LNAs in the first region of the sense strand. The 3'-end of the antisense strand of Construct 4 contains an overhang of 8 nucleotides.

FIG. 9B schematically shows the structure of an exemplary double-stranded nucleic acid inhibitor molecule ("Construct 16") that targets a gene sequence of interest, as discussed in Example 4. The sense strand of Construct 16 contains 23 nucleotides, including an LNA at nucleotides 1 and 9. The 3'-end of the antisense strand of Construct 16 contains an overhang of 8 nucleotides.

FIG. 9C schematically shows the structure of an exemplary double-stranded nucleic acid inhibitor molecule ("Construct 19") that targets a gene sequence of interest, as discussed in Example 4. The sense strand of Construct 19 contains 23 nucleotides, including an LNA at nucleotides 1, 9, and 10. The 3'-end of the antisense strand of Construct 16 contains an overhang of 8 nucleotides.

FIG. 9D schematically shows the structure of an exemplary double-stranded nucleic acid inhibitor molecule ("Construct 22") that targets a gene sequence of interest, as discussed in Example 4. The sense strand of Construct 22 contains 23 nucleotides, including an LNA at nucleotides 1, 9, 10, 12, and 13. The 3'-end of the antisense strand of Construct 16 contains an overhang of 8 nucleotides.

FIG. 9E schematically shows the structure of an exemplary double-stranded nucleic acid inhibitor molecule ("Construct 5") that targets a gene sequence of interest, as discussed in Example 4. The sense strand of Construct 5 includes 22 nucleotides and does not include any LNA in the first region of the sense strand. The 3'-end of the antisense strand of Construct 5 contains an overhang of 9 nucleotides.

FIG. 9F schematically shows the structure of an exemplary double-stranded nucleic acid inhibitor molecule ("Construct 17") that targets a gene sequence of interest, as discussed in Example 4. The sense strand of Construct 17 contains 22 nucleotides, including an LNA at nucleotides 1 and 8. The 3'-end of the antisense strand of Construct 17 contains an overhang of 9 nucleotides.

FIG. 9G schematically shows the structure of an exemplary double-stranded nucleic acid inhibitor molecule ("Construct 20") that targets a gene sequence of interest, as discussed in Example 4. The sense strand of Construct 20 contains 22 nucleotides, including an LNA at nucleotides 1, 8, and 9. The 3'-end of the antisense strand of Construct 20 contains an overhang of 9 nucleotides.

FIG. 9H schematically shows the structure of an exemplary double-stranded nucleic acid inhibitor molecule ("Construct 23") that targets a gene sequence of interest, as discussed in Example 4. The sense strand of Construct 23 contains 22 nucleotides, including an LNA at nucleotides 1, 8, 9, 11, and 12. The 3'-end of the antisense strand of Construct 23 contains an overhang of 9 nucleotides.

FIG. 9I schematically shows the structure of an exemplary double-stranded nucleic acid inhibitor molecule ("Construct 6") that targets a gene sequence of interest, as discussed in Example 4. The sense strand of Construct 6 includes 21 nucleotides. The 3'-end of the antisense strand of Construct 6 contains an overhang of 10 nucleotides.

FIG. 9J schematically shows the structure of an exemplary double-stranded nucleic acid inhibitor molecule ("Construct 18") that targets a gene sequence of interest, as discussed in Example 4. The sense strand of Construct 18 contains 21 nucleotides, including an LNA at nucleotides 1 and 7. The 3'-end of the antisense strand of Construct 18 contains an overhang on of 10 nucleotides.

FIG. 9K schematically shows the structure of an exemplary double-stranded nucleic acid inhibitor molecule ("Construct 21") that targets a gene sequence of interest, as discussed in Example 4. The sense strand of Construct 21 contains 21 nucleotides, including an LNA at nucleotides 1, 7, and 8. The 3'-end of the antisense strand of Construct 21 contains an overhang of 10 nucleotides.

FIG. 9L schematically shows the structure of an exemplary double-stranded nucleic acid inhibitor molecule ("Construct 24") that targets a gene sequence of interest, as discussed in Example 4. The sense strand of Construct 24 contains 21 nucleotides, including an LNA at nucleotides 1, 7, 8, 10, and 11. The 3'-end of the antisense strand of Construct 24 contains an overhang of 10 nucleotides.

Figure 10:
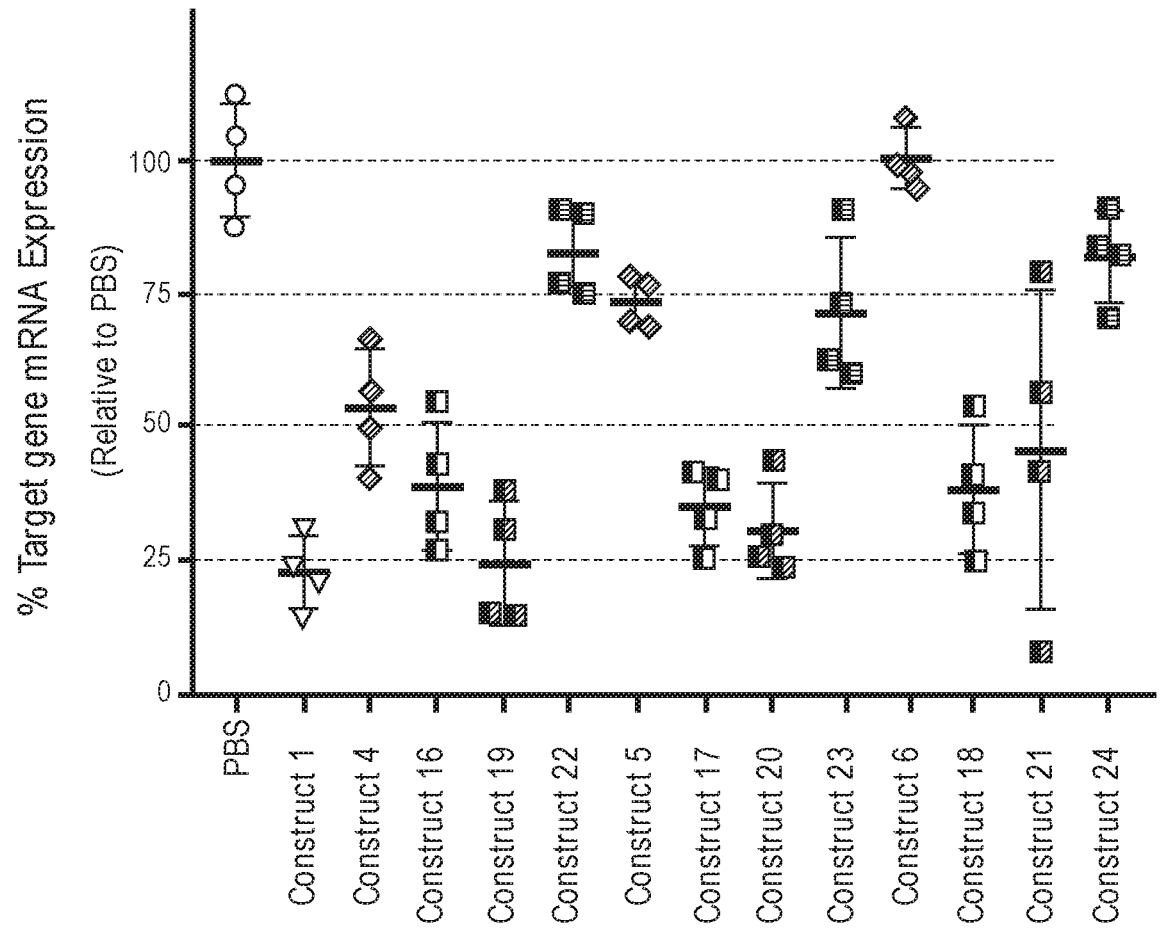

FIG. 10 shows the percent of target gene mRNA remaining 4 days after administering Construct 1 (see FIG. 2A) and Constructs 4-6 (see FIGS. 9A, 9E, and 9I) and 16-24 (see FIGS. 9B-D, 9F-H, and 9J-L) to CD-1 mice, as described in Example 4. Constructs 16-24, having at least one LNA in the first region of the sense strand, showed increased gene knockdown as compared to Constructs 4-6, which do not have any LNAs in the first region of the sense strand. Construct 19, having an LNA nucleotides 1, 9, and 10 of the sense strand, was as potent as Construct 1, having a full-length sense strand with a 2 nucleotide overhang on the 3'-end of the antisense strand. However, Constructs 22-24, having an LNA at nucleotide 1 and at four additional positions in the first region of the sense strand, including nucleotides that base pair with nucleotides 2 and 3 of the antisense strand, were not as potent as Constructs 16-21, having an LNA at nucleotide 1 and at one or two additional positions in the first region of the sense strand.

Figure 11:
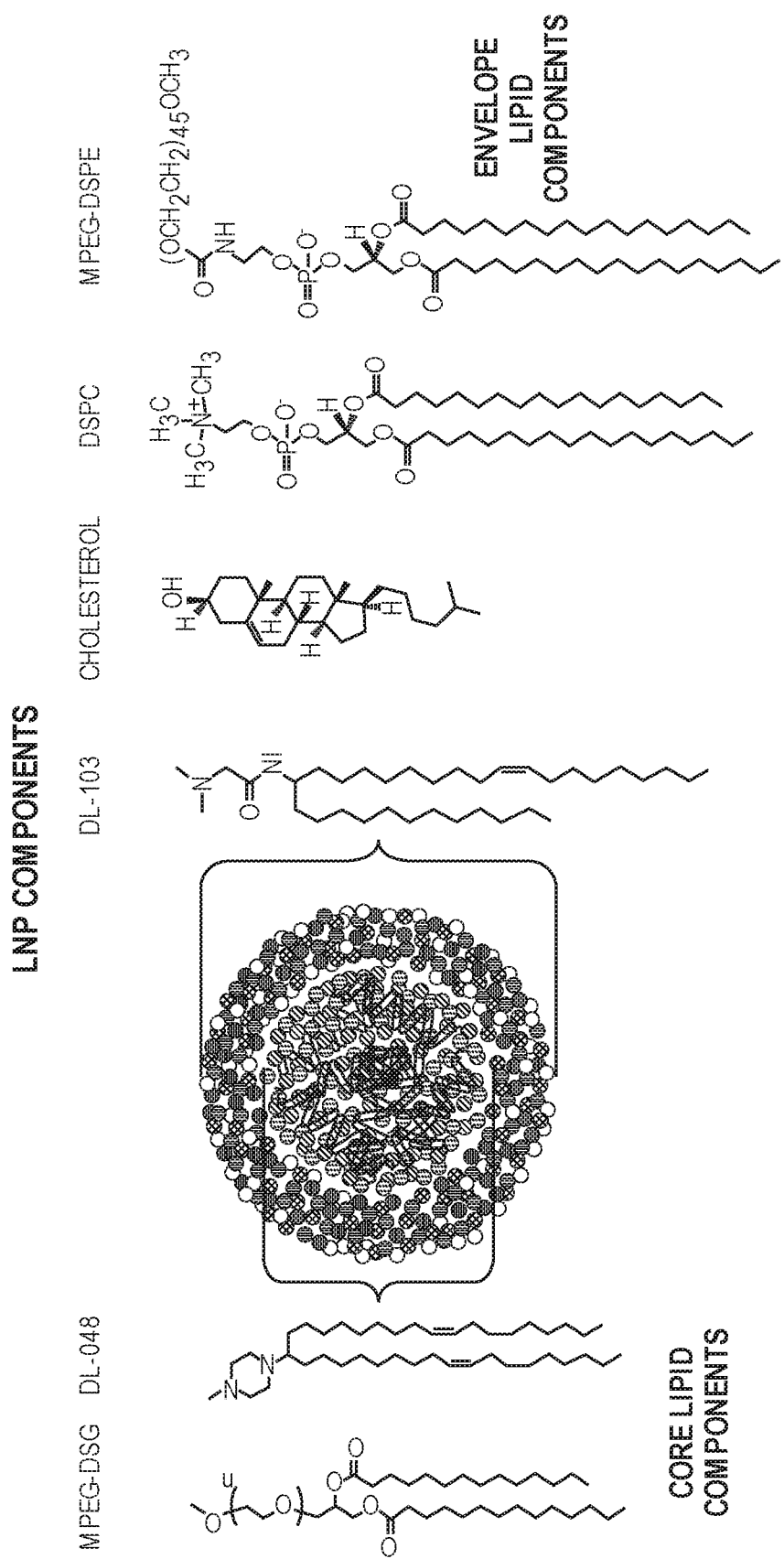

FIG. 11 shows one non-limiting embodiment of a lipid nanoparticle (LNP) that can be used to formulate the double-stranded nucleic acid inhibitor molecule. The LNP includes the following core lipids: DL-048 (cationic lipid) and DSG-mPEG (pegylated lipid), and the following envelope lipids: DL-103 (cationic lipid), DSPC, cholesterol, and DSPE-mPEG (pegylated lipid).

DEFINITIONS

In order for the present disclosure to be more readily understood, certain terms are first defined below. Additional definitions for the following terms and other terms may be set forth through the specification. If a definition of a term set forth below is inconsistent with a definition in an application or patent that is incorporated by reference, the definition set forth in this application should be used to understand the meaning of the term.

As used in this specification and the appended claims, the singular forms "a," "an," and "the" include plural references unless the context clearly dictates otherwise. Thus for example, a reference to "a method" includes one or more methods, and/or steps of the type described herein and/or which will become apparent to those persons skilled in the art upon reading this disclosure and so forth.

Administer: As used herein, "administering" a composition to a subject means to give, apply or bring the composition into contact with the subject. Administration can be accomplished by any of a number of routes, including, for example, topical, oral, subcutaneous, intramuscular, intraperitoneal, intravenous, intrathecal and intradermal.

Acyl: As used herein, the term "acyl" refers to an alkylcarbonyl, cycloalkylcarbonyl and arylcarbonyl moiety.

Alkoxy: As used herein, the term "alkoxy" refers to an alkyl group attached to a molecular moiety through an oxygen atom.

Alkenyl: As used herein, the term "alkenyl" refers to straight or branched chain hydrocarbyl groups having at least one carbon-carbon double bond, and having in the range of about 2 to about 20 carbon atoms. "Substituted alkenyl" refers to alkenyl groups further bearing one or more substituents. As used herein, "lower alkenyl" refers to alkenyl moieties having from 2 to about 6 carbon atoms.

Alkyl: As used herein, the term "alkyl" refers to straight or branched chain hydrocarbyl groups having from 1 up to about 20 carbon atoms. Whenever it appears herein, a numerical range, such as "$C_1$-$C_6$ alkyl" means that an alkyl group may comprise only 1 carbon atom, 2 carbon atoms, 3 carbon atoms, etc., up to and including 6 carbon atoms, although the term "alkyl" also includes instances where no numerical range of carbon atoms is designated. For example, the term "alkyl" can refer to a sub-range between $C_1$-$C_{10}$ (e.g. $C_1$-$C_6$). "Substituted alkyl" refers to alkyl moieties bearing substituents. As used herein, "lower alkyl" refers to alkyl moieties having from 1 to about 6 carbon atoms.

Alkynyl: As used herein, "alkynyl" refers to straight or branched chain hydrocarbyl groups having at least one carbon-carbon triple bond, and having in the range of about 2 to about 20 carbon atoms. "Substituted alkynyl" refers to alkynyl groups further bearing one or more substituents. As used herein, "lower alkynyl" refers to alkynyl moieties having from about 2 to about 6 carbon atoms.

Antisense strand: A double-stranded nucleic acid inhibitor molecule comprises two oligonucleotide strands: an antisense strand and a sense strand. The antisense strand or a region thereof is partially, substantially or fully complementary to a corresponding region of a target nucleic acid. In addition, the antisense strand of the double-stranded nucleic acid inhibitor molecule or a region thereof is partially, substantially or fully complementary to the sense strand of the double-stranded nucleic acid inhibitor molecule or a region thereof. In certain embodiments, the antisense strand may also contain nucleotides that are non-complementary to the target nucleic acid sequence. The non-complementary nucleotides may be on either side of the complementary sequence or may be on both sides of the complementary sequence. In certain embodiments, where the antisense strand or a region thereof is partially or substantially complementary to the sense strand or a region thereof, the non-complementary nucleotides may be located between one or more regions of complementarity (e.g., one or more mismatches). The antisense strand of a double-stranded nucleic acid inhibitor molecule is also referred to as the guide strand. The position of nucleotides in the antisense strand may be identified by counting the nucleotides beginning at the 5'-end of the antisense strand, such that, for example, the first nucleotide is identified as "nucleotide 1" or "G1," the second nucleotide is identified as "nucleotide 2" or "G2," the third nucleotide is identified as "nucleotide 3 or "G3," and so on for each nucleotide in the antisense strand.

Approximately: As used herein, the term "approximately" or "about," as applied to one or more values of interest, refers to a value that is similar to a stated reference value. In certain embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

Aryl: As used herein, the term "aryl" refers to an aromatic monocyclic or multicyclic groups having in the range of 5 up to 19 carbon atoms. "Substituted aryl" refers to aryl groups further bearing one or more substituents.

Bicyclic nucleotide: As used herein, the term "bicyclic nucleotide" refers to a nucleotide comprising a bicyclic sugar moiety.

Bicyclic sugar moiety: As used herein, the term "bicyclic sugar moiety" refers to a modified sugar moiety comprising a 4 to 7 membered ring (including but not limited to a furanosyl) comprising a bridge connecting two atoms of the 4 to 7 membered ring to form a second ring, resulting in a bicyclic structure. Typically, the 4 to 7 membered ring is a sugar. In some embodiments, the 4 to 7 member ring is a furanosyl. In certain embodiments, the bridge connects the 2'-carbon and the 4'-carbon of the furanosyl.

Complementary: As used herein, the term "complementary" refers to a structural relationship between two nucleotides (e.g., on two opposing nucleic acids or on opposing regions of a single nucleic acid strand) that permits the two nucleotides to form base pairs with one another. For example, a purine nucleotide of one nucleic acid that is complementary to a pyrimidine nucleotide of an opposing nucleic acid may base pair together by forming hydrogen bonds with one another. In some embodiments, complementary nucleotides can base pair in the Watson-Crick manner or in any other manner that allows for the formation of stable duplexes. "Fully complementary" or 100% complementarity refers to the situation in which each nucleotide monomer of a first oligonucleotide strand or of a segment of a first oligonucleotide strand can form a base pair with each nucleotide monomer of a second oligonucleotide strand or of a segment of a second oligonucleotide strand. Less than 100% complementarity refers to the situation in which some, but not all, nucleotide monomers of two oligonucleotide strands (or two segments of two oligonucleotide strands) can form base pairs with each other. "Substantial complementarity" refers to two oligonucleotide strands (or segments of two oligonucleotide strands) exhibiting 90% or greater complementarity to each other. "Sufficiently complementary" refers to complementarity between a target mRNA and a nucleic acid inhibitor molecule, such that there is a reduction in the amount of protein encoded by a target mRNA.

Complementary strand: As used herein, the term "complementary strand" refers to a strand of a double-stranded nucleic acid inhibitor molecule that is partially, substantially or fully complementary to the other strand.

Cycloalkyl: As used herein, the term "cycloalkyl" refers to cyclic (i.e., ring-containing) hydrocarbon groups containing 3 to 12 carbons, for example, 3 to 8 carbons and, for example, 3 to 6 carbons. "Substituted cycloalkyl" refers to cycloalkyl groups further bearing one or more substituents.

Deoxyribofuranosyl: As used herein, the term "deoxyribofuranosyl" refers to a furanosyl that is found in naturally occurring DNA and has a hydrogen group at the 2'-carbon, as illustrated below:

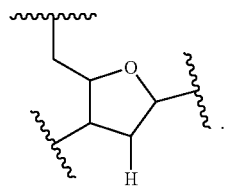 [SMILES: *CC1OC(*)CC1*]

Deoxyribonucleotide: As used herein, the term "deoxyribonucleotide" refers to a natural nucleotide (as defined herein) or modified nucleotide (as defined herein) which has a hydrogen group at the 2'-position of the sugar moiety.

dsRNAi inhibitor molecule: As used herein, the term "dsRNAi inhibitor molecule" refers to a double-stranded nucleic acid inhibitor molecule having a sense strand (passenger) and antisense strand (guide), where the antisense strand or part of the antisense strand is used by the Argonaute 2 (Ago2) endonuclease in the cleavage of a target mRNA.

Duplex: As used herein, the term "duplex," in reference to nucleic acids (e.g., oligonucleotides), refers to a structure formed through complementary base pairing of two antiparallel sequences of nucleotides.

Excipient: As used herein, the term "excipient" refers to a non-therapeutic agent that may be included in a composition, for example to provide or contribute to a desired consistency or stabilizing effect.

Furanosyl: As used herein, the term "furanosyl" refers to a structure comprising a 5-membered ring with four carbon atoms and one oxygen atom.

Halo: As used herein, the terms "halo" and "halogen" are interchangeable and refer to an atom selected from fluorine, chlorine, bromine and iodine.

Heterocycle: As used herein, the terms "heterocycle" or "heterocyclic" refer to nonaromatic cyclic (i.e., ring-containing) groups containing one or more heteroatoms (e.g., N, O, S, or the like) as part of the ring structure, and having in the range of 3 up to 14 carbon atoms. "Substituted heterocyclic" or "substituted heterocycle" refer to heterocyclic groups further bearing one or more substituents.

In certain embodiments: As used herein, the term "in certain embodiments" refers to embodiments of all aspects of the disclosure, unless the context clearly indicates otherwise.

Internucleotide linking group: As used herein, the term "internucleotide linking group" or "internucleotide linkage" refers to a chemical group capable of covalently linking two nucleoside moieties. Typically, the chemical group is a phosphorus-containing linkage group containing a phospho or phosphite group. Phospho linking groups are meant to include a phosphodiester linkage, a phosphorodithioate linkage, a phosphorothioate linkage, a phosphotriester linkage, a thionoalkylphosphonate linkage, a thionalkylphosphotriester linkage, a phosphoramidite linkage, a phosphonate linkage and/or a boranophosphate linkage. Many phosphorus-containing linkages are well known in the art, as disclosed, for example, in U.S. Pat. Nos. 3,687,808; 4,469,863; 4,476,301; 5,023,243; 5,177,196; 5,188,897; 5,264,423; 5,276,019; 5,278,302; 5,286,717; 5,321,131; 5,399,676; 5,405,939; 5,453,496; 5,455,233; 5,466,677; 5,476,925; 5,519,126; 5,536,821; 5,541,306; 5,550,111; 5,563,253; 5,571,799; 5,587,361; 5,194,599; 5,565,555; 5,527,899; 5,721,218; 5,672,697 and 5,625,050. In other embodiments, the oligonucleotide contains one or more internucleotide linking groups that do not contain a phosphorous atom, such as short chain alkyl or cycloalkyl internucleotide linkages, mixed heteroatom and alkyl or cycloalkyl internucleotide linkages, or one or more short chain heteroatomic or heterocyclic internucleotide linkages, including, but not limited to, those having siloxane backbones; sulfide, sulfoxide and sulfone backbones; formacetyl and thioformacetyl backbones; methylene formacetyl and thioformacetyl backbones; riboacetyl backbones; alkene containing backbones; sulfamate backbones; methyleneimino and methylenehydrazino backbones; sulfonate and sulfonamide backbones; and amide backbones. Non-phosphorous containing linkages are well known in the art, as disclosed, for example, in U.S. Pat. Nos. 5,034,506; 5,166,315; 5,185,444; 5,214,134; 5,216,141; 5,235,033; 5,264,562; 5,264,564; 5,405,938; 5,434,257; 5,466,677; 5,470,967; 5,489,677; 5,541,307; 5,561,225; 5,596,086; 5,602,240; 5,610,289; 5,602,240; 5,608,046; 5,610,289; 5,618,704; 5,623,070; 5,663,312; 5,633,360; 5,677,437; 5,792,608; 5,646,269 and 5,677,439.

Loop: As used herein, the term "loop" refers to a structure formed by a single strand of a nucleic acid, in which complementary regions that flank a particular single stranded nucleotide region hybridize in a way that the single stranded nucleotide region between the complementary regions is excluded from duplex formation or Watson-Crick base pairing. A loop is a single stranded nucleotide region of any length. Examples of loops include the unpaired nucleotides present in such structures as hairpins and tetraloops.

Melting Temperature: As used herein, "melting temperature" or "$T_m$" means the temperature at which the two strands of a duplex nucleic acid separate. $T_m$ is often used as a measure of duplex stability or the binding affinity of two strands of complementary nucleic acids or portions thereof. $T_m$ can be measured by using the UV spectrum to determine the formation and breakdown (melting) of hybridization. Base stacking, which occurs during hybridization, is accompanied by a reduction in UV absorption (hypochromicity). Consequently a reduction in UV absorption indicates a higher $T_m$.

Modified nucleobase: As used herein, the term "modified nucleobase" refers to any nucleobase that is not a natural nucleobase or a universal nucleobase. Suitable modified nucleobases include diaminopurine and its derivatives, alkylated purines or pyrimidines, acylated purines or pyrimidines thiolated purines or pyrimidines, and the like. Other suitable modified nucleobases include analogs of purines and pyrimidines. Suitable analogs include, but are not limited to, 1-methyladenine, 2-methyladenine, N6-methyladenine, N6-isopentyladenine, 2-methylthio-N6-isopentyladenine, N,N-dimethyladenine, 8-bromoadenine, 2-thiocytosine, 3-methylcytosine, 5-methylcytosine, 5-ethylcytosine, 4-acetylcytosine, 1-methylguanine, 2-methylguanine, 7-methylguanine, 2,2-dimethylguanine, 8-bromoguanine, 8-chloroguanine, 8-aminoguanine, 8-methylguanine, 8-thioguanine, 5-fluorouracil, 5-bromouracil, 5-chlorouracil, 5-iodouracil, 5-ethyluracil, 5-propyluracil, 5-methoxyuracil, 5-hydroxymethyluracil, 5-(carboxyhydroxymethyl)uracil, 5-(methylaminomethyl)uracil, 5-(carboxymethylaminomethyl)-uracil, 2-thiouracil, 5-methyl-2-thiouracil, 5-(2-bromovinyl)uracil, uracil-5-oxyacetic acid, uracil-5-oxyacetic acid methyl ester, pseudouracil, 1-methylpseudouracil, queosine, hypoxanthine, xanthine, 2-aminopurine, 6-hydroxyaminopurine, nitropyrrolyl, nitroindolyl and difluorotolyl, 6-thiopurine and 2,6-diaminopurine nitropyrrolyl, nitroindolyl and difluorotolyl. Typically a nucleobase contains a nitrogenous base. In certain embodiments, the nucleobase does not contain a nitrogen atom. See e.g., U.S. Published Patent Application No. 20080274462.

Modified nucleoside: As used herein, the term "modified nucleoside" refers to a heterocyclic nitrogenous base in N-glycosidic linkage with a sugar (e.g., deoxyribose or ribose or analog thereof) that is not linked to a phosphate group or a modified phosphate group (as defined herein) and that contains one or more of a modified nucleobase (as defined herein), a universal nucleobase (as defined herein) or a modified sugar moiety (as defined herein). The modified or universal nucleobases (also referred to herein as base analogs) are generally located at the 1'-position of a nucleoside sugar moiety and refer to nucleobases other than adenine, guanine, cytosine, thymine and uracil at the 1'-position. In certain embodiments, the modified or universal nucleobase is a nitrogenous base. In certain embodiments, the modified nucleobase does not contain nitrogen atom. See e.g., U.S. Published Patent Application No. 20080274462. In certain embodiments, the modified nucleotide does not contain a nucleobase (abasic). Suitable modified or universal nucleobases or modified sugars in the context of the present disclosure are described herein.

Modified nucleotide: As used herein, the term "modified nucleotide" refers to a heterocyclic nitrogenous base in N-glycosidic linkage with a sugar (e.g., ribose or deoxyribose or analog thereof) that is linked to a phosphate group or a modified phosphate group (as defined herein) and contains one or more of a modified nucleobase (as defined herein), a universal nucleobase (as defined herein), or a modified sugar moiety (as defined herein). The modified or universal nucleobases (also referred to herein as base analogs) are generally located at the 1'-position of a nucleoside sugar moiety and refer to nucleobases other than adenine, guanine, cytosine, thymine and uracil at the 1'-position. In certain embodiments, the modified or universal nucleobase is a nitrogenous base. In certain embodiments, the modified nucleobase does not contain nitrogen atom. See e.g., U.S. Published Patent Application No. 20080274462. In certain embodiments, the modified nucleotide does not contain a nucleobase (abasic). Suitable modified or universal nucleobases, modified sugar moieties, or modified phosphate groups in the context of the present disclosure are described herein.

Modified phosphate group: As used herein, the term "modified phosphate group" refers to a modification of the phosphate group that does not occur in natural nucleotides and includes non-naturally occurring phosphate mimics as described herein, including phosphate mimics that include a phosphorous atom and anionic phosphate mimics that do not include phosphate (e.g. acetate). Modified phosphate groups also include non-naturally occurring internucleotide linking groups, including both phosphorous-containing internucleotide linking groups, including, for example, phosphorothioate, and non-phosphorous containing linking groups, as described herein.

Modified sugar moiety: As used herein, a "modified sugar moiety" refers to a substituted sugar moiety (as defined herein) or a sugar analog (as defined herein).

Natural nucleobase: As used herein, the term "natural nucleobase" refers to the five primary, naturally occurring heterocyclic nucleobases of RNA and DNA, i.e., the purine bases: adenine (A) and guanine (G), and the pyrimidine bases: thymine (T), cytosine (C), and uracil (U).

Natural nucleoside: As used herein, the term "natural nucleoside" refers to a natural nucleobase (as defined herein) in N-glycosidic linkage with a natural sugar moiety (as defined herein) that is not linked to a phosphate group.

Natural nucleotide: As used herein, the term "natural nucleotide" refers to a natural nucleobase (as defined herein) in N-glycosidic linkage with a natural sugar moiety (as defined herein) that is linked to a phosphate group.

Natural sugar moiety: As used herein, the term "natural sugar moiety" refers to a ribofuranosyl (as defined herein) or a deoxyribofuranosyl (as defined herein).

Nucleic acid inhibitor molecule: As used herein, the term "nucleic acid inhibitor molecule" refers to an oligonucleotide molecule that reduces or eliminates the expression of a target gene wherein the oligonucleotide molecule contains a region that specifically targets a sequence in the target gene mRNA. Typically, the targeting region of the nucleic acid inhibitor molecule comprises a sequence that is sufficiently complementary to a sequence on the target gene mRNA to direct the effect of the nucleic acid inhibitor molecule to the specified target gene. The nucleic acid inhibitor molecule may include ribonucleotides, deoxyribonucleotides, and/or modified nucleotides. The target gene can be any gene of interest.

Nucleobase: As used herein, the term "nucleobase" refers to a natural nucleobase (as defined herein), a modified nucleobase (as defined herein), or a universal nucleobase (as defined herein).

Nucleoside: As used herein, the term "nucleoside" refers to a natural nucleoside (as defined herein) or a modified nucleoside (as defined herein).

Nucleotide: As used herein, the term "nucleotide" refers to a natural nucleotide (as defined herein) or a modified nucleotide (as defined herein).

Overhang: As used herein, the term "overhang" refers to terminal non-base pairing nucleotide(s) at either end of either strand of a double-stranded nucleic acid inhibitor molecule. In certain embodiments, the overhang results from one strand or region extending beyond the terminus of the complementary strand to which the first strand or region forms a duplex. One or both of two oligonucleotide regions that can form a duplex through hydrogen bonding of base pairs may have a 5'- and/or 3'-end that extends beyond the 3'- and/or 5'-end of complementarity shared by the two polynucleotides or regions. The single-stranded region extending beyond the 3'- and/or 5'-end of the duplex is referred to as an overhang.

Pharmaceutical composition: As used herein, the term "pharmaceutical composition" comprises a pharmacologically effective amount of a double-stranded nucleic acid inhibitor molecule and a pharmaceutically acceptable excipient (as defined herein).

Pharmaceutically acceptable excipient: As used herein, the term "pharmaceutically acceptable excipient" means that the excipient is one that is suitable for use with humans and/or animals without undue adverse side effects (such as toxicity, irritation, and allergic response) commensurate with a reasonable benefit/risk ratio.

Phosphate mimic: As used herein, the term "phosphate mimic" refers to a chemical moiety at the 5'-terminal end of an oligonucleotide that mimics the electrostatic and steric properties of a phosphate group. Many phosphate mimics have been developed that can be attached to the 5'-end of an oligonucleotide (see, e.g., U.S. Pat. No. 8,927,513; Prakash et al. *Nucleic Acids Res.,* 2015,43(6):2993-3011). Typically, these 5'-phosphate mimics contain phosphatase-resistant linkages. Suitable phosphate mimics include 5'-phosphonates, such as 5'-methylenephosphonate (5'-MP) and 5'-(E)-vinylphosphonate (5'-VP) and 4'-phosphate analogs that are bound to the 4'-carbon of the sugar moiety (e.g., a ribose or deoxyribose or analog thereof) of the 5'-terminal nucleotide of an oligonucleotide, such as 4'-oxymethylphosphonate, 4'-thiomethylphosphonate, or 4'-aminomethylphosphonate, as described in International Publication No. WO 2018/045317, which is hereby incorporated by reference in its entirety. In certain embodiments, the 4'-oxymethylphosphonate is represented by the formula —O—CH$_2$—PO(OH)$_2$ or —O—CH$_2$—PO(OR)$_2$, where R is independently selected from H, CH$_3$, an alkyl group, or a protecting group. In certain embodiments, the alkyl group is CH$_2$CH$_3$. More typically, R is independently selected from H, CH$_3$, or CH$_2$CH$_3$. Other modifications have been developed for the 5'-end of oligonucleotides (see, e.g., WO 2011/133871).

Protecting group: As used herein, the term "protecting group" is used in the conventional chemical sense as a group which reversibly renders unreactive a functional group under certain conditions of a desired reaction. After the desired reaction, protecting groups may be removed to deprotect the protected functional group. All protecting groups should be removable under conditions which do not degrade a substantial proportion of the molecules being synthesized.

Reduce(s): The term "reduce" or "reduces" as used herein refers to its meaning as is generally accepted in the art. With reference to nucleic acid inhibitor molecules, the term generally refers to the reduction in the expression of a gene, or level of RNA molecules or equivalent RNA molecules encoding one or more proteins or protein subunits, or activity of one or more proteins or protein subunits, below that observed in the absence of the nucleic acid inhibitor molecules.

Ribofuranosyl: As used herein, the term "ribofuranosyl" refers to a furanosyl that is found in naturally occurring RNA and has a hydroxyl group at the 2'-carbon, as illustrated below:

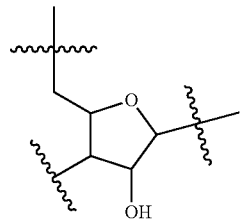

Ribonucleotide: As used herein, the term "ribonucleotide" refers to a natural nucleotide (as defined herein) or a modified nucleotide (as defined herein) which has a hydroxyl group at the 2'-position of the sugar moiety.

Sense strand: A double-stranded nucleic acid inhibitor molecule comprises two oligonucleotide strands: an antisense strand and a sense strand. The sense strand or a region thereof is partially, substantially or fully complementary to the antisense strand of the double-stranded nucleic acid inhibitor molecule or a region thereof. In certain embodiments, the sense strand may also contain nucleotides that are non-complementary to the antisense strand. The non-complementary nucleotides may be on either side of the complementary sequence or may be on both sides of the complementary sequence. In certain embodiments, where the sense strand or a region thereof is partially or substantially complementary to the antisense strand or a region thereof, the non-complementary nucleotides may be located between one or more regions of complementarity (e.g., one or more mismatches). The sense strand is also called the passenger strand. The position of nucleotides in the sense strand may be identified by counting the nucleotides beginning at the 5'-end of the sense strand, such that, for example, the first nucleotide is identified as "nucleotide 1" or "P1," the second nucleotide is identified as "nucleotide 2" or "P2," the third nucleotide is identified as "nucleotide 3 or "P3," and so on for each nucleotide in the sense strand.

Subject: As used herein, the term "subject" means any mammal, including mice, rabbits, and humans. In one embodiment, the subject is a human. The terms "individual" or "patient" are intended to be interchangeable with "subject."

Substituent or substituted: The terms "substituent" or "substituted" as used herein refer to the replacement of hydrogen radicals in a given structure with the radical of a substituent. When more than one position in any given structure may be substituted with more than one substituent, the substituent may be either the same or different at every position unless otherwise indicated. As used herein, the term "substituted" is contemplated to include all permissible substituents that are compatible with organic compounds. The permissible substituents include acyclic and cyclic, branched and unbranched, carbocyclic and heterocyclic, aromatic and nonaromatic substituents of organic compounds. This disclosure is not intended to be limited in any manner by the permissible substituents of organic compounds.

Substituted sugar moiety: As used herein, a "substituted sugar moiety" includes furanosyls comprising one or more modifications. Typically, the modifications occur at the 2'-, 3'-, 4'-, or 5'-carbon position of the sugar. In certain embodiments, the substituted sugar moiety is a bicyclic sugar moiety comprising a bridge that connects the 2'-carbon with the 4-carbon of the furanosyl.

Sugar analog: As used herein, the term "sugar analog" refers to a structure that does not comprise a furanosyl and that can replace the naturally occurring sugar moiety of a nucleotide, such that the resulting nucleotide is capable of (1) incorporation into an oligonucleotide and (2) hybridization to a complementary nucleotide. Such structures typically include relatively simple changes to the furanosyl, such as rings comprising a different number of atoms (e.g., 4, 6, or 7-membered rings); replacement of the oxygen of the furanosyl with a non-oxygen atom (e.g., carbon, sulfur, or nitrogen); or both a change in the number of atoms and a replacement of the oxygen. Such structures may also comprise substitutions corresponding with those described for substituted sugar moieties. Sugar analogs also include more complex sugar replacements (e.g., the non-ring systems of peptide nucleic acid). Sugar analogs include without limitation morpholinos, cyclohexenyls and cyclohexitols.

Sugar moiety: As used herein, the term "sugar moiety" refers to a natural sugar moiety or a modified sugar moiety of a nucleotide or nucleoside.

Target site: As used herein, the term "target site" "target sequence," "target nucleic acid", "target region," "target gene" are used interchangeably and refer to a RNA or DNA sequence that is "targeted," e.g., for cleavage mediated by an RNAi inhibitor molecule that contains a sequence within its guide/antisense region that is partially, substantially, or perfectly or sufficiently complementary to that target sequence.

Tetraloop: As used herein, the term "tetraloop" refers to a loop (a single stranded region) that forms a stable secondary structure that contributes to the stability of an adjacent Watson-Crick hybridized nucleotides. Without being limited to theory, a tetraloop may stabilize an adjacent Watson-Crick base pair by stacking interactions. In addition, interactions among the nucleotides in a tetraloop include but are not limited to non-Watson-Crick base pairing, stacking interactions, hydrogen bonding, and contact interactions (Cheong et al., Nature 1990; 346(6285):680-2; Heus and Pardi, Science 1991; 253(5016):191-4). A tetraloop confers an increase in the melting temperature (Tm) of an adjacent duplex that is higher than expected from a simple model loop sequence consisting of random bases. For example, a tetraloop can confer a melting temperature of at least 50° C., at least 55° C., at least 56° C., at least 58° C., at least 60° C., at least 65° C. or at least 75° C. in 10 mM $NaHPO_4$ to a hairpin comprising a duplex of at least 2 base pairs in length. A tetraloop may contain ribonucleotides, deoxyribonucleotides, modified nucleotides, and combinations thereof. In certain embodiments, a tetraloop consists of four nucleotides. In certain embodiments, a tetraloop consists of five nucleotides.

Examples of RNA tetraloops include the UNCG family of tetraloops (e.g., UUCG), the GNRA family of tetraloops (e.g., GAAA), and the CUYG family of tetraloops, including the CUUG tetraloop. (Woese et al., PNAS, 1990, 87(21): 8467-71; Antao et al., Nucleic Acids Res., 1991, 19(21): 5901-5). Other examples of RNA tetraloops include the GANC, A/UGNN, and UUUM tetraloop families (Thapar et al., Wiley Interdiscip Rev RNA, 2014, 5(1):1-28) and the GGUG, RNYA, and AGNN tetraloop families (Bottaro et al., Biophys J., 2017, 113:257-67). Examples of DNA tetraloops include the d(GNNA) family of tetraloops (e.g., d(GTTA), the d(GNRA)) family of tetraloops, the d(GNAB) family of tetraloops, the d(CNNG) family of tetraloops, and the d(TNCG) family of tetraloops (e.g., d(TTCG)). (Nakano et al. Biochemistry, 2002, 41(48):14281-14292. Shinji et al., Nippon Kagakkai Koen Yokoshu, 2000, 78(2):731).

Triloop: As used herein, the term "triloop" refers to a loop (a single stranded region) that forms a stable secondary structure that contributes to the stability of an adjacent Watson-Crick hybridized nucleotides and consists of three nucleotides. Without being limited to theory, a triloop may be stabilized by non-Watson-Crick base pairing of nucleotides within the triloop and base-stacking interactions. (Yoshizawa et al., Biochemistry 1997; 36, 4761-4767). A triloop can also confer an increase in the melting temperature (Tm) of an adjacent duplex that is higher than expected from a simple model loop sequence consisting of random bases. A triloop may contain ribonucleotides, deoxyribonucleotides, modified nucleotides, and combinations thereof. Examples of triloops include the GNA family of triloops (e.g., GAA, GTA, GCA, and GGA). (Yoshizawa 1997).

Therapeutically effective amount: As used herein, a "therapeutically effective amount" or "pharmacologically effective amount" refers to that amount of a double-stranded nucleic acid inhibitor molecule effective to produce the intended pharmacological, therapeutic or preventive result.

$T_m$-Increasing Nucleotide: As used herein, the term "$T_m$-increasing nucleotide" refers to a nucleotide that increases the melting temperature ($T_m$) of an oligonucleotide duplex as compared to the oligonucleotide duplex without the $T_m$-increasing nucleotide. $T_m$-increasing nucleotides include, but are not limited to, bicyclic nucleotides, tricyclic nucleotides, a G-clamp and analogues thereof, and hexitol nucleotides. Certain modified nucleotides having a modified sugar moiety or a modified nucleobase can also be used to increase the $T_m$ of an oligonucleotide duplex. As used herein, the term "$T_m$-increasing nucleotide" specifically excludes nucleotides modified at the 2'-position of the sugar moiety with 2'-OMe or 2'-F.

Universal nucleobase: As used herein, a "universal nucleobase" refers to a base that can pair with more than one of the bases typically found in naturally occurring nucleic acids and can thus substitute for such naturally occurring bases in a duplex. The base need not be capable of pairing with each of the naturally occurring bases. For example, certain bases pair only or selectively with purines, or only or selectively with pyrimidines. The universal nucleobase may base pair by forming hydrogen bonds via Watson-Crick or non-Watson-Crick interactions (e.g., Hoogsteen interactions). Representative universal nucleobases include inosine and its derivatives.

DETAILED DESCRIPTION

This application provides double-stranded nucleic acid inhibitor molecules having a sense strand with a stem loop structure and an antisense strand, where the sense strand has a reduced length at its 5'-end, resulting in a longer single-stranded overhang at the 3'-end of the antisense strand. As shown in the examples, double-stranded nucleic acid inhibitor molecules with a shortened sense strand can be used to reduce target gene mRNA expression in vivo. Introducing $T_m$-increasing nucleotides at certain positions in region 1 (R1) of the sense strand and/or modified internucleotide linkages in the antisense strand can help to stabilize the double-stranded nucleic acid inhibitor molecules having shortened sense strands. In this way, the sense strand can be shortened without reducing potency. The use of shorter sense strands confers advantages in the manufacturing process, reducing both time and cost. Reducing the length of the sense strand also confers advantages in dosing because it is possible to administer more of double-stranded nucleic acid inhibitor molecule on a molar basis due to its reduced molecular weight.

Also provided are methods of using the double-stranded nucleic acid inhibitor molecules having a shortened sense strand and compositions comprising the same to reduce the level or expression of a target gene in vitro or in vivo, including methods and compositions for treating diseases.

Double-Stranded Nucleic Acid Inhibitor Molecules

This application discloses double-stranded nucleic acid inhibitor molecules having a shortened sense strand with a stem loop structure and an antisense strand, wherein the sense strand and antisense strands are separate strands that each have a 5'- and 3'-end and, therefore, do not form a contiguous oligonucleotide. A typical stem/loop-containing double-stranded nucleic acid inhibitor molecule is shown in FIG. 1A with the sense strand ("S") and antisense strand ("AS") highlighted.

Figure 1C:
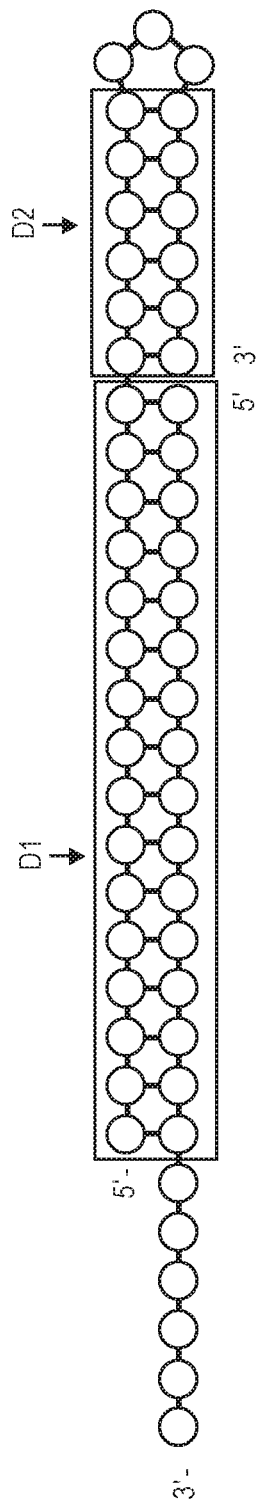
FIG. 1C schematically shows the same exemplary schematic as in FIGS. 1A and 1B. The schematic of FIG. 1C depicts a first duplex (D1) and a second duplex (D2) in the nucleic acid inhibitor molecule. The first duplex (D1) forms between the first region of the sense strand (R1) and the antisense strand (AS). The second duplex (D2) or "stem" forms between a first subregion (S1) and a second subregion (S2) of the second region (R2) of the sense strand.
Figure 1D:
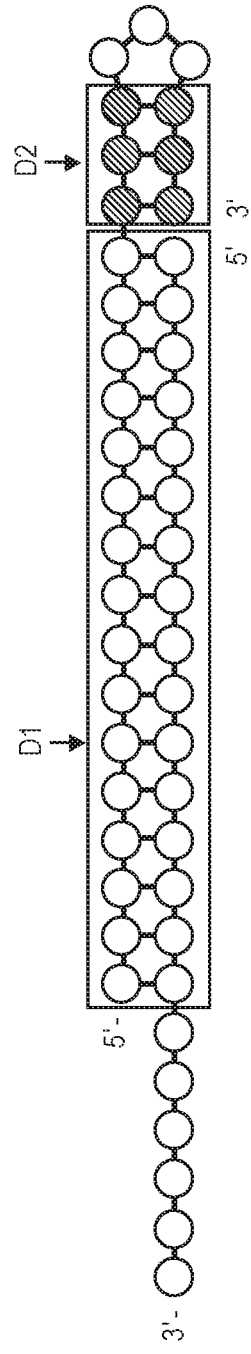
FIG. 1D schematically shows an exemplary double-stranded nucleic acid inhibitor molecule where the second duplex (D2) is shorter than the second duplex depicted in FIG. 1C and contains six $T_m$-increasing nucleotides (hatched circles).

The sense strand can be further divided into a first region (R1) that forms a first duplex (D1) with the antisense strand (AS) and a second region (R2) that includes a loop (L) that joins a first subregion (S1) with a second subregion (S2), as shown in FIGS. 1B and 1C. S1 and S2 are sufficiently complementary to each other to form a second duplex (D2), also referred to as the stem or stem duplex. See e.g. FIGS. 1C and 1D. In certain embodiments, the loop is a tetraloop, and in certain embodiments, the loop is a triloop. In certain embodiments, the double-stranded nucleic acid molecule is a dsRNAi inhibitor molecule. In certain embodiments, the double-stranded nucleic acid molecule contains one or more $T_m$-increasing nucleotides in R1 of the sense strand or D2. Typically, the $T_m$-increasing nucleotide is a bicyclic nucleotide. However, in all of the double-stranded nucleic acid inhibitor molecules described herein any $T_m$-increasing nucleotide, as defined herein, can be substituted for the bicyclic nucleotide.

In certain embodiments of the double-stranded nucleic acid inhibitor molecule, the sense strand contains a stem duplex (D2) containing a loop and is 15-43 nucleotides in length. In certain embodiments, the stem duplex is 1-6 base pairs in length. In certain embodiments, the stem duplex is 1-3 base pairs in length and contains at least one $T_m$-increasing nucleotide. In certain embodiments, the stem duplex is 3-6 base pairs in length. In certain embodiments, the antisense strand is 18-33 nucleotides in length and has a single-stranded overhang of 6-10 nucleotides at the 3'-end. In certain embodiments, the loop is 3-20 nucleotides in length. In certain embodiments, the loop is 3-8 nucleotides in length. Typically, the loop is a tetraloop or a triloop. In certain embodiments, the extended part of the sense strand that contains the stem duplex (D2) and the loop is on 3'-end of the strand. In certain other embodiments, the extended part of the sense strand that contains the stem (D2) and the loop is on 5'-end of the strand.

In certain embodiments, the sense strand contains a stem duplex (D2) and tetraloop or a triloop and is 15-43 nucleotides in length, and the antisense strand is 18-33 nucleotides in length and has a single-stranded overhang of 6-10 nucleotides at the 3'-end. In certain embodiments, the antisense strand is 18-25 nucleotides in length and has a single-stranded overhang of 6-10 nucleotides at the 3'-end. In certain embodiments, the sense strand is 15-30 nucleotides in length. In certain embodiments, the sense strand is 16-31 nucleotides in length. In certain embodiments, the sense strand is 17-32 nucleotides in length. In certain embodiments, the sense strand is 18-33 nucleotides in length. In certain embodiments, the sense strand is 19-34 nucleotides in length. In certain embodiments, the sense strand is 20-35 nucleotides in length. In certain embodiments, the sense strand is 21-36 nucleotides in length. In certain embodiments, the sense strand is 22-37 nucleotides in length. In certain embodiments, the sense strand is 23-38 nucleotides in length. In certain embodiments, the sense strand is 24-39 nucleotides in length. In certain embodiments, the sense strand is 25-40 nucleotides in length. In certain embodiments, the sense strand is 26-41 nucleotides in length. In certain embodiments, the sense strand is 27-42 nucleotides in length. In certain embodiments, the sense strand is 28-43 nucleotides in length.

In certain embodiments, the double-stranded nucleic acid inhibitor molecule comprises a sense strand and an antisense strand, wherein the sense and antisense strands are separate strands and form a first duplex (D1) of 8-29 base pairs, wherein the sense strand comprises a second duplex (D2) and tetraloop or a triloop and is 15-43 nucleotides in length, and wherein the antisense strand is 18-35 nucleotides in length and has a single-stranded overhang of 6-10 nucleotides at the 3'-end. In certain embodiments, the sense strand is 15-26, 19-26, 15-24, or 19-24 nucleotides in length. In certain embodiments, the sense strand is 15-25 nucleotides in length. In certain embodiments, the sense strand is 19-25 nucleotides in length. In certain embodiments, the sense strand is 15-23 nucleotides in length. In certain embodiments, the sense strand is 21-23 nucleotides in length. In certain embodiments, the sense strand is 15 nucleotides in length. In certain embodiments, the sense strand is 16 nucleotides in length. In certain embodiments, the sense strand is 17 nucleotides in length. In certain embodiments, the sense strand is 18 nucleotides in length. In certain embodiments, the sense strand is 19 nucleotides in length. In certain embodiments, the sense strand is 20 nucleotides in length. In certain embodiments, the sense strand is 21 nucleotides in length. In certain embodiments, the sense strand is 22 nucleotides in length. In certain embodiments, the sense strand is 23 nucleotides in length. In certain embodiments, the sense strand is 24 nucleotides in length. In certain embodiments, the sense strand is 24 nucleotides in length. In certain embodiments, the sense strand is 25 nucleotides in length. In certain embodiments, the sense strand is 26 nucleotides in length.

In certain embodiments, the first duplex has a length of 8-29 base pairs. In certain embodiments, the first duplex has a length of 10-25 base pairs. In certain embodiments, the first duplex has a length of 8-12 base pairs. In certain embodiments, the first duplex has a length of 9-13 base pairs. In certain embodiments, the first duplex has a length of 10-14 base pairs. In certain embodiments, the first duplex has a length of 11-15 base pairs. In certain embodiments, the first duplex has a length of 12-16 base pairs. In certain embodiments, the first duplex has a length of 13-17 base pairs. In certain embodiments, the first duplex has a length of 14-18 base pairs. In certain embodiments, the first duplex has a length of 15-19 base pairs. In certain embodiments, the first duplex has a length of 16-20 base pairs. In certain embodiments, the first duplex has a length of 17-21 base pairs. In certain embodiments, the first duplex has a length of 18-22 base pairs. In certain embodiments, the first duplex has a length of 19-23 base pairs. In certain embodiments, the first duplex has a length of 20-24 base pairs. In certain embodiments, the first duplex has a length of 21-25 base pairs. In certain embodiments, the first duplex has a length of 22-26 base pairs. In certain embodiments, the first duplex has a length of 23-27 base pairs. In certain embodiments, the first duplex has a length of 24-28 base pairs. In certain embodiments, the first duplex has a length of 25-29 base pairs.

In certain embodiments, the first duplex has a length of 8 base pairs. In certain embodiments, the first duplex has a length of 9 base pairs. In certain embodiments, the first duplex has a length of 10 base pairs. In certain embodiments, the first duplex has a length of 11 base pairs. In certain embodiments, the first duplex has a length of 12 base pairs. In certain embodiments, the first duplex has a length of 13 base pairs. In certain embodiments, the first duplex has a length of 14 base pairs. In certain embodiments, the first duplex has a length of 15 base pairs. In certain embodiments, the first duplex has a length of 16 base pairs. In certain embodiments, the first duplex has a length of 17 base pairs. In certain embodiments, the first duplex has a length of 18 base pairs. In certain embodiments, the first duplex has a length of 19 base pairs. In certain embodiments, the first duplex has a length of 20 base pairs. The first duplex can also have a range of base pair lengths determined by selecting any two numbers within the range of 8-18 base pairs (e.g., 8-12, 12-14, 12-15, 13-14, 13-15, etc.).

In certain embodiments, the second duplex (D2) has a length of 1-6 base pairs. In certain embodiments, the second duplex is 1-3 base pairs in length and contains at least one $T_m$-increasing nucleotide. In certain embodiments, D2 has a length of 1 base pair and contains at least one $T_m$-increasing nucleotide. In certain embodiments, D2 has a length of 2 base pairs and contains at least one $T_m$-increasing nucleotide. In certain embodiments, D2 has a length of 3 base pairs and contains at least one $T_m$-increasing nucleotide. In certain embodiments, D2 has a length of 4 base pairs. In certain embodiments, D2 has a length of 5 base pairs. In certain embodiments, D2 has a length of 6 base pairs.

The 3'-end of the antisense strand has a single-stranded overhang of at least 3 nucleotides. In certain embodiments, the 3'-end of the antisense strand has a single-stranded overhang of at least 6 nucleotides. In certain embodiments, the antisense strand has a single-stranded overhang of 6-10 nucleotides at its 3'-end. In certain embodiments, the antisense strand has a single-stranded overhang of 6-10 nucleotides at its 3'-end. In certain embodiments, the single-stranded overhang at the 3'-end of the antisense strand consists of 6 nucleotides. In certain embodiments, the single-stranded overhang at the 3'-end of the antisense strand consists of 7 nucleotides. In certain embodiments, the single-stranded overhang at the 3'-end of the antisense strand consists of 8 nucleotides. In certain embodiments, the single-stranded overhang at the 3'-end of the antisense strand consists of 9 nucleotides. In certain embodiments, the single-stranded overhang at the 3'-end of the antisense strand consists of 10 nucleotides.

In certain embodiments, the double-stranded nucleic acid inhibitor molecule comprises a sense strand and an antisense strand, wherein the sense and antisense strands are separate strands and form a first duplex (D1) of 12-16 base pairs, wherein the sense strand comprises a second duplex (D2) and a tetraloop or a triloop and is 17-32 nucleotides in length, and wherein the antisense strand is 18-25 nucleotides in length and has a single-stranded overhang of 6-10 nucleotides at the 3'-end. In certain embodiments, the sense strand is 28-32 nucleotides in length and the second duplex (D2) has a length of 6 base pairs and does not contain a $T_m$-increasing nucleotide. In certain embodiments, the sense strand is 18-25 nucleotides in length and the second duple (D2) has a length of 1-5 base pairs and comprises at least one $T_m$-increasing nucleotide. In certain embodiments, D2 has a length of 1 base pair. In certain embodiments, D2 has a length of 2 base pairs. In certain embodiments, D2 has a length of 3 base pairs. In certain embodiments, D2 has a length of 4 base pairs. In certain embodiments, D2 has a length of 5 base pairs. In certain embodiments, D2 has a length of 6 base pairs.

In certain embodiments, the double-stranded nucleic acid inhibitor molecule comprises a sense strand and an antisense strand, wherein the sense and antisense strands are separate strands and form a first duplex (D1) of 12-16 base pairs, wherein the sense strand has a first region (R1) of 12-16 nucleotides and a second region (R2) of 5-16 nucleotides that comprises a tetraloop or a triloop that joins a first subregion (S1) to a second subregion (S2), wherein each of S1 and S2 is 1-6 nucleotides in length and are sufficiently complementary to each other to form a second duplex (D2), and wherein the antisense strand is 20-23 nucleotides in length and has a single-stranded overhang of 6-10 nucleotides at its 3'-end. In certain embodiments, R2 is 5-16 nucleotides in length. In certain embodiments, R2 is 6-16 nucleotides in length. In certain embodiments, R2 is 5 nucleotides in length. In certain embodiments, R2 is 6 nucleotides in length. In certain embodiments, R2 is 7 nucleotides in length. In certain embodiments, R2 is 8 nucleotides in length. In certain embodiments, R2 is 9 nucleotides in length. In certain embodiments, R2 is 10 nucleotides in length. In certain embodiments, R2 is 11 nucleotides in length. In certain embodiments, R2 is 12 nucleotides in length. In certain embodiments, R2 is 13 nucleotides in length. In certain embodiments, R2 is 14 nucleotides in length. In certain embodiments, R2 is 15 nucleotides in length. In certain embodiments, R2 is 16 nucleotides in length. In certain embodiments, each of S1 and S2 is 1-6 nucleotides in length. In certain embodiments, each of S1 and S2 is 1-3 nucleotides in length. In certain embodiments, each of S1 and S2 is 3-6 nucleotides in length. In certain embodiments, each of S1 and S2 is 3-5 nucleotides in length. In certain embodiments, each of S1 and S2 is 1 nucleotide in length. In certain embodiments, each of S1 and S2 is 2 nucleotides in length. In certain embodiments, each of S1 and S2 is 3 nucleotides in length. In certain embodiments, each of S1 and S2 is 4 nucleotides in length. In certain embodiments, each of S1 and S2 is 5 nucleotides in length. In certain embodiments, each of S1 and S2 is 6 nucleotides in length.

In certain embodiments, the double-stranded nucleic acid inhibitor molecule comprises a sense strand and an antisense strand, wherein the sense and antisense strands are separate strands and form a first duplex (D1) of 12-16 base pairs, wherein the sense strand is between 16-33 nucleotides in length and has a first region (R1) of 12-16 nucleotides and a second region (R2) of 5-10 nucleotides that comprises a tetraloop or a triloop that joins a first subregion (S1) to a second subregion (S2), wherein each of S1 and S2 is 1-3 nucleotides in length and form a second duplex (D2) of 1-3 base pairs, and wherein the antisense strand is 21-23 nucleotides in length and has a single-stranded overhang of 6-10 nucleotides at its 3'-end. In certain embodiments, the antisense strand is 22 nucleotides in length. In certain embodiments, at least one nucleotide in the second duplex (D2) is a $T_m$-increasing nucleotide. In certain embodiments, each nucleotide in the second duplex (D2) is a $T_m$-increasing nucleotide.

In certain embodiments, the double-stranded nucleic acid inhibitor molecule comprises a sense strand and an antisense strand, wherein the sense and antisense strands are separate strands and form a first duplex (D1) of 12-16 base pairs, wherein the sense strand has a first region (R1) of 12-16 nucleotides and a second region (R2) of 6-10 nucleotides that comprises a tetraloop that joins a first subregion (S1) to a second subregion (S2), wherein each of S1 and S2 is 1-3 nucleotides in length and form a second duplex (D2) of 1-3 base pairs, and wherein the antisense strand is 22 nucleotides in length, including a single-stranded overhang of 6-10 nucleotides at its 3'-end. In certain embodiments, at least one nucleotide in the second duplex (D2) is a $T_m$-increasing nucleotide. In certain embodiments, each nucleotide in the second duplex (D2) is a $T_m$-increasing nucleotide. In certain embodiments, the first duplex has 12 base pairs. In certain embodiments, the first duplex has 14 base pairs. In certain embodiments, the first duplex has 16 base pairs.

In certain embodiments, the double-stranded nucleic acid inhibitor molecule comprises a sense strand and an antisense strand, wherein the sense and antisense strands are separate strands and form a first duplex (D1) of 12-16 base pairs, wherein the sense strand has a first region (R1) of 12-16 nucleotides and a second region (R2) of 5-9 nucleotides that comprises a triloop that joins a first subregion (S1) to a second subregion (S2), wherein each of S1 and S2 is 1-3 nucleotides in length and form a second duplex (D2) of 1-3 base pairs, and wherein the antisense strand is 22 nucleotides in length and has a single-stranded overhang of 6-10 nucleotides at its 3'-end. In certain embodiments, at least one nucleotide in the second duplex (D2) is a $T_m$-increasing nucleotide. In certain embodiments, each nucleotide in the second duplex (D2) is a $T_m$-increasing nucleotide. In certain embodiments, the first duplex has 12 base pairs. In certain embodiments, the first duplex has 14 base pairs. In certain embodiments, the first duplex has 16 base pairs.

In certain embodiments of the double-stranded nucleic acid inhibitor molecule, the sense strand has 21-25 nucleotides; the antisense strand has 22 nucleotides, including a single-stranded overhang of 6-10 nucleotides at the 3'-end and the 5'-terminal nucleotide optionally contains a phosphate mimic; the first duplex has a length of 12-16 base pairs; the second region of the sense strand comprises a triloop and the second duplex has a length of 3 base pairs and comprises at least one $T_m$-increasing nucleotide. In certain embodiments, every nucleotide in the second duplex is a $T_m$-increasing nucleotide, such as LNA.

In certain embodiments of the double-stranded nucleic acid inhibitor molecule, the sense strand has 22-26 nucleotides; the antisense strand has 22 nucleotides, including a single-stranded overhang of 6-10 nucleotides at the 3'-end and the 5'-terminal nucleotide of the antisense strand optionally contains a phosphate mimic; the first duplex has a length of 12-16 base pairs; the second region of the sense strand comprises a tetraloop and the second duplex has a length of 3 base pairs and comprises at least one $T_m$-increasing nucleotide. In certain embodiments, every nucleotide in the second duplex is a $T_m$-increasing nucleotide, such as LNA.

In certain embodiments of the double-stranded nucleic acid inhibitor molecule, the sense strand has 21-31 nucleotides; the antisense strand has 22 nucleotides, including a single-stranded overhang of 6-10 nucleotides at the 3'-end and the 5'-terminal nucleotide of the antisense strand optionally contains a phosphate mimic; the first duplex has a length of 12-16 base pairs; the second region of the sense strand comprises a triloop and the second duplex has a length of 3-5 base pairs and comprises at least one $T_m$-increasing nucleotide or has a length of 6 base pairs and does not contain a $T_m$-increasing nucleotide. In certain embodiments, the second duplex has a length of 3 base pairs and every nucleotide in the second duplex is a $T_m$-increasing nucleotide, such as LNA.

In certain embodiments of the double-stranded nucleic acid inhibitor molecule, the sense strand has 22-32 nucleotides; the antisense strand has 22 nucleotides, including a single-stranded overhang of 6-10 nucleotides at the 3'-end and the 5'-terminal nucleotide of the antisense strand optionally contains a phosphate mimic; the first duplex has a length of 12-16 base pairs; the second region of the sense strand comprises a tetraloop and the second duplex has a length of 3-5 base pairs and comprises at least one $T_m$-increasing nucleotide or has a length of 6 base pairs and does not contain a $T_m$-increasing nucleotide. In certain embodiments, the second duplex has a length of 3 base pairs and every nucleotide in the second duplex is a $T_m$-increasing nucleotide, such as LNA.

In certain embodiments, the tetraloop has one of the following sequences: UNCG (e.g., UUCG, UCCG, UACG, or UGCG), GNRA (e.g., GAAA, GGAA, GAGA, GCAA, or GUAA), CUYG (e.g., CUUG), GANC, A/UGNN (e.g., UGAA), and UUUM, GGUG, RNYA (e.g., AACA), and AGNN (e.g., AGUA, AGAA, or AGGG), GGAG, UUUG, CAAC, CUUGU, GACAA, or GAAGA, where N is any nucleobase, R is a purine, Y is a pyrimidine, and M is A or C. In certain embodiments, the tetraloop is an RNA tetraloop selected from UNCG, GNRA, or CUUG. In certain embodiments, the tetraloop has the sequence GNRA. In certain embodiments, the tetraloop has the sequence GAAA. In certain embodiments, the triloop has the sequence GNA. In certain embodiments, the triloop has the sequence GAA.

In certain embodiments of the double-stranded nucleic acid inhibitor molecule described herein, the second duplex (D2) does not contain any $T_m$-increasing nucleotides. In certain embodiments, the second duplex contains 2-12 $T_m$-increasing nucleotides and has a length of 1-6 base pairs. In certain embodiments, D2 contains 2-6 $T_m$-increasing nucleotides and has a length of 1-3 base pairs. In certain embodiments, D2 contains 2-10 $T_m$-increasing nucleotides and has a length of 3-5 base pairs. In certain embodiments, D2 contains 2-8 $T_m$-increasing nucleotides and has a length of 3-4 base pairs. In certain embodiments, D2 contains 6 $T_m$-increasing nucleotides and has a length of 3 base pairs. In certain embodiments, D2 contains 4 $T_m$-increasing nucleotides and has a length of 2 base pairs. In certain embodiments, D2 contains 2 $T_m$-increasing nucleotides and has a length of 1 base pair. In certain embodiments, each nucleotide in D2 is a $T_m$-increasing nucleotide. In certain embodiments, D2 contains 3 unpaired $T_m$-increasing nucleotides. In certain embodiments, D2 contains 2 unpaired $T_m$-increasing nucleotides. In certain embodiments, D2 contains 1 unpaired $T_m$-increasing nucleotide.

In certain embodiments, the double-stranded nucleic acid inhibitor molecule does not contain any $T_m$-increasing nucleotides in the first region of the sense strand (R1) or the antisense strand. In certain embodiments, the double-stranded nucleic acid inhibitor molecule does not contain any $T_m$-increasing nucleotides outside of the second duplex (D2). In certain embodiments, the double-stranded nucleic acid inhibitor molecule comprises at least one $T_m$-increasing nucleotide in the first region of the sense strand (R1). In certain embodiments, nucleotide 1 (P1) of the sense strand is a $T_m$-increasing nucleotide. In certain embodiments, the sense strand of the double-stranded nucleic acid inhibitor molecule comprises a $T_m$-increasing nucleotide at nucleotide 1 and two additional $T_m$-increasing nucleotides in the first region of the sense strand (R1). In certain embodiments, the sense strand of the double-stranded nucleic acid inhibitor molecule comprises a $T_m$-increasing nucleotide at nucleotide 1 and three additional $T_m$-increasing nucleotides in the first region of the sense strand (R1). In certain embodiments, the sense strand of the double-stranded nucleic acid inhibitor molecule comprises a $T_m$-increasing nucleotide at nucleotide 1 and four additional $T_m$-increasing nucleotides in the first region of the sense strand (R1). In certain embodiments of the double-stranded nucleic acid inhibitor molecule, a nucleotide in the first region of the sense strand (R1) that base pairs with nucleotide 6 (G6) of the antisense strand is a $T_m$-increasing nucleotide. In certain embodiments, a nucleotide in the first region of the sense strand (R1) that base pairs with nucleotide 5 (G5) of the antisense strand is a $T_m$-increasing nucleotide. In certain embodiments, two nucleotides in the first region of the sense strand (R1) that base pair with nucleotide 6 and nucleotide 5 of the antisense strand are $T_m$-increasing nucleotides. In certain embodiments, none of the nucleotides in the first region of the sense strand (R1) that base pair with nucleotides 1~4 (G1-4) of the antisense strand are $T_m$-increasing nucleotides.

In the double-stranded nucleic acid inhibitor molecules described herein, the $T_m$-increasing nucleotide can be any of the bicyclic nucleotides described herein or otherwise available in the art. In certain embodiments, the double-stranded nucleic acid molecule contains at least two bicyclic nucleotides and each bicyclic nucleotide is the same. In certain embodiments, the double-stranded nucleic acid molecule contains at least two different bicyclic nucleotides.

In certain embodiments of the double-stranded nucleic acid inhibitor molecule described herein, the at least one bicyclic nucleotide comprises a bicyclic sugar moiety, wherein the bicyclic sugar moiety is a substituted furanosyl comprising a bridge that connects the 2'-carbon and the 4'-carbon of the furanosyl.

In certain embodiments of the double-stranded nucleic acid inhibitor molecule described herein, the at least one bicyclic nucleotide has the structure of Formula I, II, III, IV, Va, or Vb, as described herein. In certain embodiments, the at least one bicyclic nucleotide has the structure of Formula I. In certain embodiments, the at least one bicyclic nucleotide has the structure of Formula II. In certain embodiments, the at least one bicyclic nucleotide has the structure of Formula III. In certain embodiments, the at least one bicyclic nucleotide has the structure of Formula IV. In certain embodiments, the at least one bicyclic nucleotide has the structure of Formula Va. In certain embodiments, the at least one bicyclic nucleotide has the structure of Formula Vb.

In certain embodiments, the at least one bicyclic nucleotide has the structure of one or more of Formula Ia, Ib, Ic, Id, Ie, or If, as described herein. In certain embodiments, the at least one bicyclic nucleotide has the structure of one or more of Formula IIa, IIb, IIc, or IId, as described herein. In certain embodiments, the at least one bicyclic nucleotide has the structure of Formula Ma and/or Mb, as described herein. In certain embodiments, the at least one bicyclic nucleotide has the structure of Formula IVa and/or IVb, as described herein.

In certain embodiments, the at least one bicyclic nucleotide (BN) in the second duplex (D2) and/or in the first region of the sense strand (R1) is one or more of the following: (a) methyleneoxy BN, (b) ethyleneoxy BN, (c) aminooxy BN; (d) oxyamino BN, (e) methyl(methyleneoxy) BN (also known as constrained ethyl or cET), (f) methylene-thio BN, (g) methylene amino BN, (h) methyl carbocyclic BN, and (i) propylene carbocyclic BN. In one embodiment, the at least one BN is (a) methyleneoxy BN or (d) oxyamino BN), wherein $R_2$ is $CH_3$. In one embodiment, the at least one BN is the oxyamino BN (d), wherein $R_2$ is $CH_3$.

In certain embodiments of the double-stranded nucleic acid inhibitor molecule disclosed herein, at least one nucleotide in the antisense strand is modified with a 2'-F. In certain embodiments, at least one nucleotide in the antisense strand is modified with a 2'-F and the 2'-F modified nucleotide is flanked by 2 phosphorous-containing internucleotide linkages other than a phosphodiester linkage. In certain embodiments, at least two nucleotides in the antisense strand are modified with a 2'-F, and the at least two 2'-F-modified nucleotides are each flanked by 2 phosphorous-containing internucleotide linkages other than a phosphodiester linkage. In certain embodiments, at least three nucleotides in the antisense strand are modified with a 2'-F, and the at least three 2'-F-modified nucleotides are each flanked by 2 phosphorous-containing internucleotide linkages other than a phosphodiester linkage. In certain embodiments, at least four nucleotides in the antisense strand are modified with a 2'-F, and the at least four 2'-F-modified nucleotides are each flanked by 2 phosphorous-containing internucleotide linkages other than a phosphodiester linkage. In certain embodiments, any nucleotide in the antisense strand that is modified with a 2'-F is flanked by 2 phosphorous-containing internucleotide linkages other than a phosphodiester linkage, such as a phosphorothioate linkage.

In certain embodiments, nucleotide 2 (G2) of the antisense strand is modified with a 2'-F and is linked to nucleotide 1 (G1) and nucleotide 3 (G3) of the antisense strand by a phosphorous-containing internucleotide linkage other than a phosphodiester linkage. In certain embodiments, nucleotide 7 (G7) of the antisense strand is modified with a 2'-F and is linked to nucleotide 6 (G6) and nucleotide 8 (G8) of the antisense strand by a phosphorous-containing internucleotide linkage other than a phosphodiester linkage. In certain embodiments, nucleotide 10 (G10) of the antisense strand is modified with a 2'-F and is linked to nucleotide 9 (G9) and nucleotide 11 (G11) of the antisense strand by a phosphorous-containing internucleotide linkage other than a phosphodiester linkage. In certain embodiments, nucleotide 14 (G14) of the antisense strand is modified with a 2'-F and is linked to nucleotide 13 (G13) and nucleotide 15 (G15) of the antisense strand by a phosphorous-containing internucleotide linkage other than a phosphodiester linkage. In certain embodiments, one or more of G2, G7, G10, and G14 are modified with a 2'-F and flanked by a phosphorous-containing internucleotide linkage other than a phosphodiester linkage. In certain embodiments, G2 and G14 are modified with a 2'-F and flanked by a phosphorous-containing internucleotide linkage other than a phosphodiester linkage. In certain embodiments, the phosphorous-containing internucleotide linkage is a phosphorothioate linkage.

In certain embodiments, at least one nucleotide in the sense strand is flanked by a phosphorous-containing internucleotide linkage other than a phosphodiester linkage. In certain embodiments, nucleotides 1 and 2 of the sense strand are connected with an internucleotide linkage other than a phosphodiester linkage. In certain embodiments, the phosphorous-containing internucleotide linkage is a phosphorothioate linkage.

$T_m$-Increasing Nucleotides

The double-stranded nucleic acid inhibitor molecules disclosed herein can contain one or more $T_m$-increasing nucleotide in the first region (R1) of the sense strand and/or the stem portion (D2) of a stem loop structure that is present in the sense strand.

$T_m$-increasing nucleotides include, but are not limited to, bicyclic nucleotides, tricyclic nucleotides, a G-clamp and analogues thereof, hexitol nucleotides, or a modified nucleotide.

Bicyclic Nucleotides

Bicyclic nucleotides typically have a sugar moiety with a 4 to 7 membered ring (including but not limited to a furanosyl) comprising a bridge connecting two atoms of the 4 to 7 membered ring to form a second ring, resulting in a bicyclic structure. Such bicyclic nucleotides have various names including BNA's and LNA's for bicyclic nucleic acids and locked nucleic acids, respectively. The synthesis of bicyclic nucleotides and their incorporation into nucleic acid compounds has also been reported in the literature, including, for example, Singh et al., Chem. Commun., 1998, 4, 455-456; Koshkin et al., Tetrahedron, 1998, 54, 3607-3630; Wahlestedt et al., Proc. Natl. Acad. Sci. U.S.A., 2000, 97, 5633-5638; Kumar et al., Bioorg. Med. Chem. Lett., 1998, 8, 2219-2222; Singh et al., J. Org. Chem., 1998, 63, 10035-10039; U.S. Pat. Nos. 7,427,672, 7,053,207, 6,794, 499, 6,770,748, 6,268,490 and 6,794,499; and published U.S. applications 20040219565, 20040014959, 20030207841, 20040192918, 20030224377, 20040143114 and 20030082807; each of which is incorporated by reference herein, in its entirety.

The $T_m$-increasing nucleotide can be a bicyclic nucleotide that comprises a bicyclic sugar moiety. In certain embodiments, the bicyclic sugar moiety comprises a first ring of 4 to 7 members and a bridge forming a North-type sugar confirmation that connects any two atoms of the first ring of the sugar moiety to form a second ring. In certain embodiments, the bridge connects the 2'-carbon and the 4'-carbon of the first ring to form a second ring.

Typically, the bridge contains 2 to 8 atoms. In certain embodiments, the bridge contains 3 atoms. In certain embodiments, the bridge contains 4 atoms. In certain embodiments, the bridge contains 5 atoms. In certain embodiments, the bridge contains 6 atoms. In certain embodiments, the bridge contains 7 atoms. In certain embodiments, the bridge contains 8 atoms. In certain embodiments, the bridge contains more than 8 atoms.

In certain embodiments, the bicyclic sugar moiety is a substituted furanosyl comprising a bridge that connects the 2'-carbon and the 4'-carbon of the furanosyl to form the second ring. In certain embodiments, the bicyclic nucleotide has the structure of Formula I:

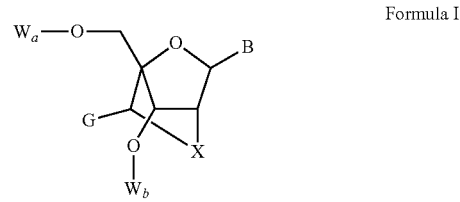

Formula I wherein B is a nucleobase;
wherein G is H, OH, NH$_2$, C$_1$-C$_6$ alkyl, C$_2$-C$_6$ alkenyl, C$_2$-C$_6$ alkynyl, substituted C$_1$-C$_6$ alkyl, substituted C$_2$-C$_6$ alkenyl, substituted C$_2$-C$_6$ alkynyl, acyl, substituted acyl, substituted amide, thiol, or substituted thio;
wherein X is O, S, or NR$_1$, wherein R$_1$ is H, C$_1$-C$_6$ alkyl, C$_1$-C$_6$ alkoxy, benzene or pyrene; and
wherein W$_a$ and W$_b$ are each independently, H, OH, a hydroxyl protecting group, a phosphorous moiety, or an internucleotide linking group attaching the nucleotide represented by Formula I to another nucleotide or to an oligonucleotide and wherein at least one of W$_a$ or W$_b$ is an internucleotide linking group attaching the nucleotide represented by Formula I to an oligonucleotide.

In certain embodiments of Formula I, G is H and X is NR$_1$, wherein R$_1$ is benzene or pyrene. In certain embodiments, of Formula I, G is H and X is S.

In certain embodiments of Formula I, G is H and X is O:

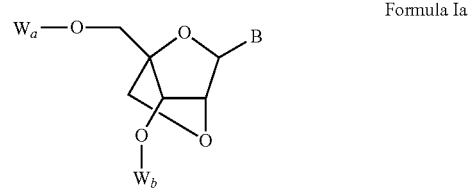

Formula Ia

In certain embodiments of Formula I, G is H and X is $NR_1$, wherein $R_1$ is H, $CH_3$, or $OCH_3$:

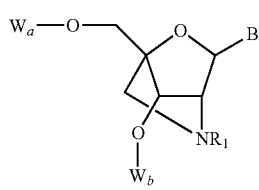

Formula Ib

In certain embodiments of Formula I, G is OH or $NH_2$ and X is O.

In certain embodiments of Formula I, G is OH and X is O:

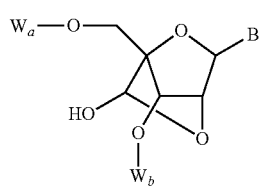

Formula Ic

In certain embodiments of Formula I, G is $NH_2$ and X is O:

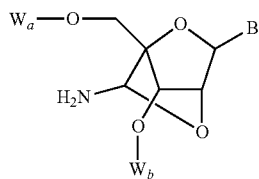

Formula Id

In certain embodiments, of Formula I, G is $CH_3$ or $CH_2OCH_3$ and X is O. In certain embodiments, of Formula I, G is $CH_3$ and X is O:

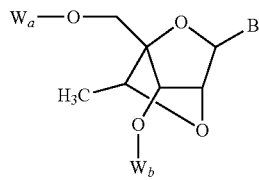

Formula Ie

In certain embodiments, of Formula I, G is $CH_2OCH_3$ and X is O:

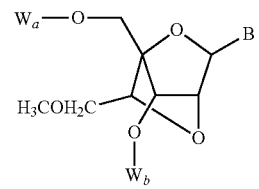

Formula If

In certain embodiments, the bicyclic nucleotide has the structure of Formula II:

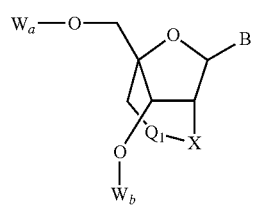

Formula II wherein B is a nucleobase;

wherein $Q_1$ is $CH_2$ or O;

wherein X is $CH_2$, O, S, or $NR_1$, wherein $R_1$ is H, $C_1$-$C_6$ alkyl, $C_1$-$C_6$ alkoxy, benzene or pyrene;

wherein if $Q_1$ is O, X is $CH_2$;

wherein if $Q_1$ is $CH_2$, X is $CH_2$, O, S, or $NR_1$, wherein $R_1$ is H, $C_1$-$C_6$ alkyl, $C_1$-$C_6$ alkoxy, benzene or pyrene;

wherein $W_a$ and $W_b$ are each independently, H, OH, a hydroxyl protecting group, a phosphorous moiety, or an internucleotide linking group attaching the nucleotide represented by Formula II to another nucleotide or to an oligonucleotide and wherein at least one of $W_a$ or $W_b$ is an internucleotide linking group attaching the nucleotide represented by Formula II to an oligonucleotide.

In certain embodiments of Formula II, $Q_1$ is O and X is $CH_2$:

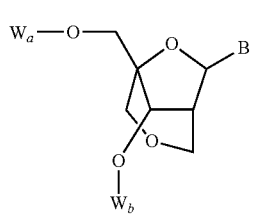

Formula IIa

In certain embodiments of Formula II, $Q_1$ is $CH_2$ and X is O:

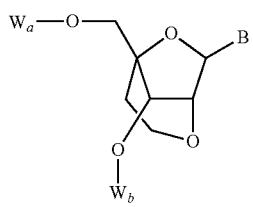

Formula IIb

In certain embodiments of Formula II, $Q_1$ is $CH_2$ and X is $NR_1$, wherein $R_1$ is H, $CH_3$ or $OCH_3$:

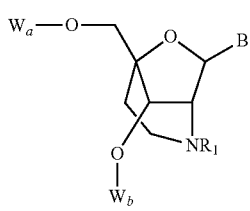

Formula IIc

In certain embodiments of Formula II, $Q_1$ is $CH_2$ and X is NH:

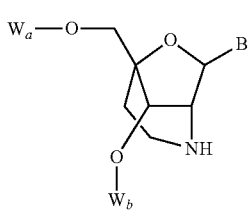

Formula IId

In certain embodiments, the bicyclic nucleotide has the structure of Formula III:

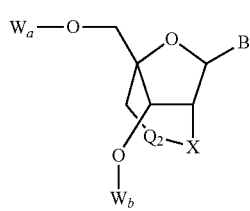

Formula III wherein B is a nucleobase;
wherein $Q_2$ is O or $NR_1$, wherein $R_1$ is H, $C_1$-$C_6$ alkyl, $C_1$-$C_6$ alkoxy, benzene or pyrene;
wherein X is $CH_2$, O, S, or $NR_1$, wherein $R_1$ is H, $C_1$-$C_6$ alkyl, $C_1$-$C_6$ alkoxy, benzene or pyrene;
wherein if $Q_2$ is O, X is $NR_1$;
wherein if $Q_2$ is $NR_1$, X is O or S;
wherein $W_a$ and $W_b$ are each independently, H, OH, a hydroxyl protecting group, a phosphorous moiety, or an internucleotide linking group attaching the nucleotide represented by Formula III to another nucleotide or to an oligonucleotide and wherein at least one of $W_a$ or $W_b$ is an internucleotide linking group attaching the nucleotide represented by Formula III to an oligonucleotide.

In certain embodiments of Formula III, $Q_2$ is O and X is $NR_1$. In certain embodiments of Formula III, $Q_2$ is O and X is $NR_1$, wherein $R_1$ is $C_1$-$C_6$ alkyl. In certain embodiments of Formula III, $Q_2$ is O and X is $NR_1$ and $R_1$ is H or $CH_3$.

In certain embodiments of Formula III, $Q_2$ is O and X is $NR_1$ and $R_1$ is $CH_3$:

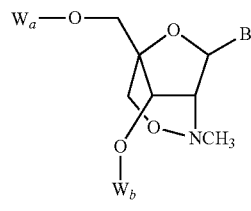

Formula IIIa

In certain embodiments of Formula III, $Q_2$ is $NR_1$ and X is O. In certain embodiments of Formula III, $Q_2$ is $NR_1$, wherein $R_1$ is $C_1$-$C_6$ alkyl and X is O.

In certain embodiments of Formula III, $Q_2$ is $NCH_3$ and X is O:

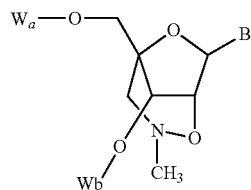

Formula IIIb

In certain embodiments, the bicyclic nucleotide has the structure of Formula IV:

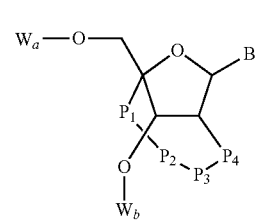

Formula IV wherein B is a nucleobase;
wherein $P_1$ and $P_3$ are $CH_2$, $P_2$ is $CH_2$ or O and $P_4$ is O; and
wherein $W_a$ and $W_b$ are each independently, H, OH, a hydroxyl protecting group, a phosphorous moiety, or an internucleotide linking group attaching the nucleotide represented by Formula IV to another nucleotide or to an oligonucleotide and wherein at least one of $W_a$ or $W_b$ is an internucleotide linking group attaching the nucleotide represented by Formula IV to an oligonucleotide.

In certain embodiments of Formula IV, $P_1$, $P_2$, and $P_3$ are $CH_2$, and $P_4$ is O:

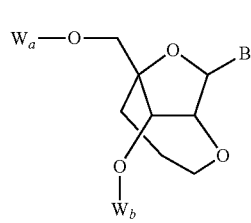

Formula IVa

In certain embodiments of Formula IV, $P_1$ and $P_3$ are $CH_2$, $P_2$ is O and $P_4$ is O:

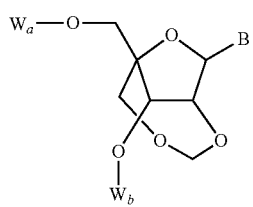

Formula IVb

In certain embodiments, the bicyclic nucleotide has the structure of Formula Va or Vb:

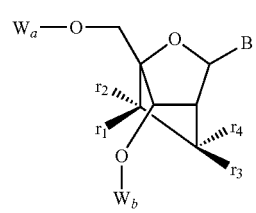

Formula Va

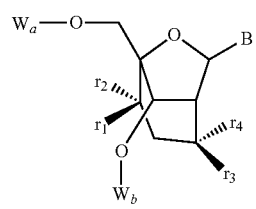

Formula Vb wherein B is a nucleobase;
wherein r1, r2, r3, and r4 are each independently H, halogen, $C_1$-$C_{12}$ alkyl, substituted $C_1$-$C_{12}$ alkyl, $C_2$-$C_{12}$ alkenyl, substituted $C_2$-$C_{12}$ alkenyl, $C_2$-$C_{12}$ alkynyl; substituted $C_2$-$C_{12}$ alkynyl; $C_1$-$C_{12}$ alkoxy; substituted $C_1$-$C_{12}$ alkoxy, $OT_1$, $ST_1$, $SOT_1$, $SO_2T_1$, $NT_1T_2$, N3, CN, C(=O)$OT_1$, C(=O)$NT_1T_2$, C(=O)$T_1$, O—C(=O)$NT_1T2$, N(H)C(=NH)$NT_1T_2$, N(H)C(=O)$NT_1T_2$ or N(H)C(=S)$NT_1T_2$, wherein each of T1 and T2 is independently H, $C_1$-$C_6$ alkyl, or substituted $C_1$-$C_{16}$ alkyl; or
r1 and r2 or r3 and r4 together are =C(r5)(r6), wherein r5 and r6 are each independently H, halogen, $C_1$-$C_{12}$ alkyl, or substituted $C_1$-$C_{12}$ alkyl; and
wherein $W_a$ and $W_b$ are each independently, H, OH, a hydroxyl protecting group, a phosphorous moiety, or an internucleotide linking group attaching the nucleotide represented by Formula V to another nucleotide or to an oligonucleotide and wherein at least one of $W_a$ or $W_b$ is an internucleotide linking group attaching the nucleotide represented by Formula V to an oligonucleotide.

In certain embodiments, the bicyclic sugar moiety is a substituted furanosyl comprising a bridge that connects the 2'-carbon and the 4'-carbon of the furanosyl to form the second ring, wherein the bridge that connects the 2'-carbon and the 4'-carbon of the furanosyl includes, but is not limited to:

a) 4'-CH$_2$—O—N(R)-2' and 4'-CH$_2$—N(R)—O-2', wherein R is H, $C_1$-$C_{12}$ alkyl, or a protecting group, including, for example, 4'-CH$_2$—NH—O-2' (also known as BNA$^{NC}$), 4'-CH$_2$—N(CH$_3$)—O-2' (also known as BNA$^{NC}$[NMe]), (as described in U.S. Pat. No. 7,427,672, which is hereby incorporated by reference in its entirety);

b) 4'-CH$_2$-2; 4'-(CH$_2$)$_2$-2; 4'-(CH$_2$)$_3$-2; 4'-(CH$_2$)—O-2' (also known as LNA); 4'-(CH$_2$)—S-2; 4'-(CH$_2$)$_2$—O-2' (also known as ENA); 4'-CH(CH$_3$)—O-2' (also known as cEt); and 4'-CH(CH$_2$OCH$_3$)—O-2' (also known as cMOE), and analogs thereof (as described in U.S. Pat. No. 7,399,845, which is hereby incorporated by reference in its entirety);

c) 4'-C(CH$_3$)(CH$_3$)—O-2' and analogs thereof (as described in U.S. Pat. No. 8,278,283, which is hereby incorporated by reference in its entirety);

d) 4'-CH$_2$—N(OCH$_3$)-2' and analogs thereof (as described in U.S. Pat. No. 8,278,425, which is hereby incorporated by reference in its entirety);

e) 4'-CH$_2$—O—N(CH$_3$)-2' and analogs thereof (as described in U.S. Patent Publication No. 2004/0171570, which is hereby incorporated by reference in its entirety);

f) 4'-CH$_2$—C(H)(CH$_3$)-2' and analogs thereof (as described in Chattopadhyaya et al., J. Org. Chem., 2009, 74, 118-34, which is hereby incorporated by reference in its entirety); and g) 4'-CH$_2$—C(=CH$_2$)-2' and analogs thereof as described in U.S. Pat. No. 8,278,426, which is hereby incorporated by reference in its entirety).

In certain embodiments, the bicyclic nucleotide (BN) is one or more of the following: (a) methyleneoxy BN, (b) ethyleneoxy BN, (c) aminooxy BN; (d) oxyamino BN, (e) methyl(methyleneoxy) BN (also known as constrained ethyl or cET), (f) methylene-thio BN, (g) methylene amino BN, (h) methyl carbocyclic BN, and (i) propylene carbocyclic BN, as shown below.

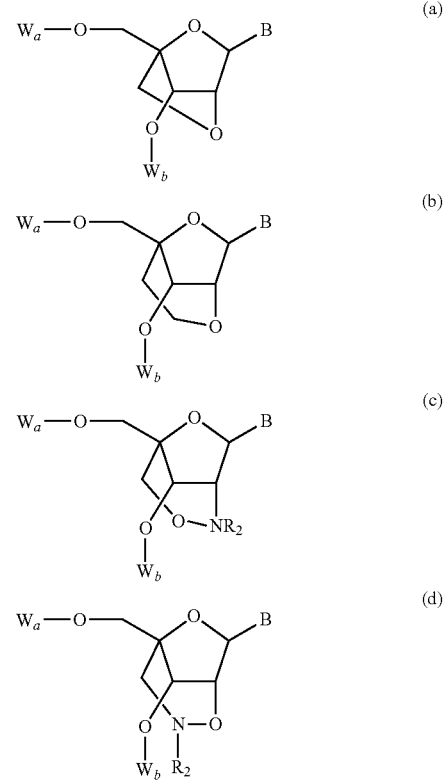

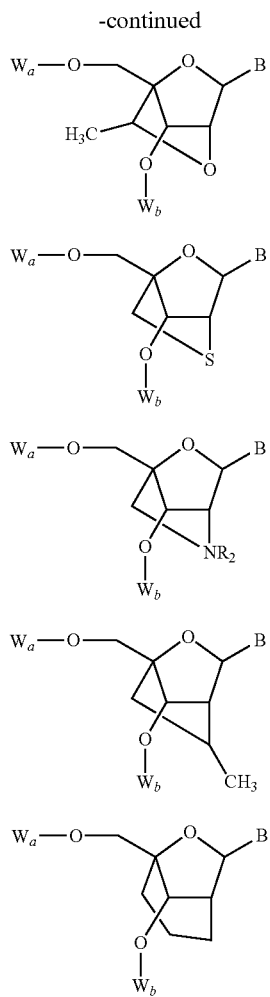

In the bicyclic nucleotides of (a) to (i) above, B is a nucleobase, R2 is H or CH$_3$ and W$_a$ and W$_b$ are each independently, H, OH, a hydroxyl protecting group, a phosphorous moiety, or an internucleotide linking group attaching the bicyclic nucleotide to another nucleotide or to an oligonucleotide and wherein at least one of W$_a$ or W$_b$ is an internucleotide linking group attaching the bicyclic nucleotide to an oligonucleotide.

In one embodiment of the oxyamino BN (d), R$_2$ is CH$_3$, as follows (also known as BNA$^{NC}$[NMe]):

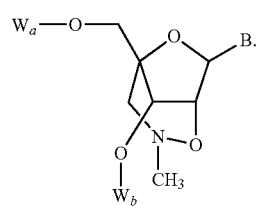

In certain embodiments, bicyclic sugar moieties and bicyclic nucleotides incorporating such bicyclic sugar moieties are further defined by isomeric configuration. In certain embodiments, the bicyclic sugar moiety or nucleotide is in the α-L configuration. In certain embodiments, the bicyclic sugar moiety or nucleotide is in the β-D configuration. For example, in certain embodiments, the bicyclic sugar moiety or nucleotide comprises a 2'O,4'-C-methylene bridge (2'-O—CH$_2$-4') in the α-L configuration (α-L LNA). In certain embodiments, the bicyclic sugar moiety or nucleotide is in the R configuration. In certain embodiments, the bicyclic sugar moiety or nucleotide is in the S configuration. For example, in certain embodiments, the bicyclic sugar moiety or nucleotide comprises a 4'-CH(CH$_3$)—O-2' bridge (i.e., cEt) in the S-configuration.

Tricyclic Nucleotides

In certain embodiments, the T$_m$-increasing nucleotide can be a tricyclic nucleotide. The synthesis of tricyclic nucleotides and their incorporation into nucleic acid compounds has also been reported in the literature, including, for example, Steffens et al., *J. Am. Chem. Soc.* 1997; 119:11548-11549; Steffens et al., *J. Org. Chem.* 1999; 121(14):3249-3255; Renneberg et al., *J. Am. Chem. Soc.* 2002; 124:5993-6002; Ittig et al., *Nucleic Acids Res.* 2004; 32(1):346-353; Scheidegger et al., *Chemistry* 2006; 12:8014-8023; Ivanova et al., *Oligonucleotides* 2007; 17:54-65; each of which is each hereby incorporated by reference in its entirety.

In certain embodiments, the tricyclic nucleotide is a tricyclo nucleotide (also called tricyclo DNA) in which the 3'-carbon and 5'-carbon centers are connected by an ethylene that is fused to a cyclopropane ring, as discussed for example in Leumann CJ, *Bioorg. Med. Chem.* 2002; 10:841-854 and published U.S. Applications 2015/0259681 and 2018/0162897, which are each hereby incorporated by reference. In certain embodiments, the tricyclic nucleotide comprises a substituted furanosyl ring comprising a bridge that connects the 2'-carbon and the 4'-carbon of the furanosyl to form a second ring, and a third fused ring resulting from a group connecting the 5'-carbon to the methylene group of the bridge that connects the 2'-carbon and the 4'-carbon of the furanosyl, as discussed, for example, in published U.S. Application 2015/0112055, which is hereby incorporated by reference.

Other T$_m$-Increasing Nucleotides

In addition to bicyclic and tricyclic nucleotides, other T$_m$-increasing nucleotides can be used in the nucleic acid inhibitor molecules described herein. For example, in certain embodiments, the T$_m$-increasing nucleotide is a G-clamp, guanidine G-clamp or analogue thereof (Wilds et al., *Chem,* 2002; 114:123 and Wilds et al., *Chim Acta* 2003; 114:123), a hexitol nucleotide (Herdewijn, *Chem. Biodiversity* 2010; 7:1-59), or a modified nucleotide. The modified nucleotide can have a modified nucleobase, as described herein, including for example, 5-bromo-uracil, 5-iodo-uracil, 5-propynyl-modified pyrimidines, or 2-amino adenine (also called 2,6-diaminopurine) (Deleavey et al., *Chem. & Biol.* 2012; 19:937-54) or 2-thio uridine, 5 Me-thio uridine, and pseudo uridine. The modified nucleotide can also have a modified sugar moiety, as described for example, in U.S. Pat. No. 8,975,389, which is hereby incorporated by reference, or as described herein, except that the T$_m$-increasing nucleotide is not modified at the 2'-carbon of the sugar moiety with a 2'-F or a 2'-OMe.

In certain embodiments, the T$_m$-increasing nucleotide is a bicyclic nucleotide. In certain embodiments, the T$_m$-increasing nucleotide is a tricyclic nucleotide. In certain embodiments, the T$_m$-increasing nucleotide a G-clamp, guanidine G-clamp or analogue thereof. In certain embodiments, the T$_m$-increasing nucleotide is a hexitol nucleotide. In certain embodiments, the T$_m$-increasing nucleotide is a bicyclic or tricyclic nucleotide. In certain embodiments, the T$_m$-increasing nucleotide is a bicyclic nucleotide, a tricyclic nucleotide, or a G-clamp, guanidine G-clamp or analogue thereof. In certain embodiments, the $T_m$-increasing nucleotide is a bicyclic nucleotide, a tricyclic nucleotide, a G-clamp, guanidine G-clamp or analogue thereof, or a hexitol nucleotide.

In certain embodiments, the $T_m$-increasing nucleotide increases the $T_m$ of the nucleic acid inhibitor molecule by at least 2° C. per incorporation. In certain embodiments, the $T_m$-increasing nucleotide increases the $T_m$ of nucleic acid inhibitor molecule by at least 3° C. per incorporation. In certain embodiments, the $T_m$-increasing nucleotide increases the $T_m$ of nucleic acid inhibitor molecule by at least 4° C. per incorporation. In certain embodiments, the $T_m$-increasing nucleotide increases the $T_m$ of nucleic acid inhibitor molecule by at least 5° C. per incorporation.

Other Modifications

The double-stranded nucleic acid inhibitor molecules described herein can contain other nucleotide modifications in addition to the at least one $T_m$-increasing nucleotide in the second duplex (D2) and/or in the first region of the sense strand (R1). Typically, multiple nucleotides of the double-stranded nucleic acid inhibitor molecule are modified to improve various characteristics of the molecule such as resistance to nucleases or lowered immunogenicity. See, e.g., Bramsen et al. (2009), Nucleic Acids Res., 37, 2867-2881. Many nucleotide modifications have been used in the oligonucleotide field, particularly for nucleic acid inhibitor molecules. Such modifications can be made on any part of the nucleotide, including the sugar moiety, the phosphodiester linkage, and the nucleobase. Typical examples of nucleotide modification include, but are not limited to, 2'-F, 2'-O-methyl ("2'-OMe" or "2'-OCH$_3$"), and 2'-O-methoxy-ethyl ("2'-MOE" or "2'-OCH$_2$CH$_2$OCH$_3$"). Modifications can also occur at other parts of the sugar moiety of the nucleotide, such as the 5'-carbon, as described herein.

In certain embodiments, the double-stranded nucleic acid inhibitor molecule can also include one or more modified nucleobases other than adenine, guanine, cytosine, thymine and uracil at the 1'-position, as known in the art and as described herein. In certain embodiments, the modified or universal nucleobase is a nitrogenous base. In certain embodiments, the modified nucleobase does not contain nitrogen atom. See e.g., U.S. Published Patent Application No. 20080274462. In certain embodiments, the modified nucleotide does not contain a nucleobase (abasic). A typical example of a modified nucleobase is 5'-methylcytosine.

The natural occurring internucleotide linkage of RNA and DNA is a 3'- to 5'-phosphodiester linkage. Modified phosphodiester linkages include non-naturally occurring internucleotide linking groups, including internucleotide linkages that contain a phosphorous atom and internucleotide linkages that do not contain a phosphorous atom, as known in the art and as described herein. Typically, the double-stranded nucleic acid inhibitor molecule contains one or more phosphorous-containing internucleotide linking groups, as described herein. In other embodiments, one or more of the internucleotide linking groups of the double-stranded nucleic acid inhibitor molecule is a non-phosphorus containing linkage, as described herein. In certain embodiments, the double-stranded nucleic acid inhibitor molecule contains one or more phosphorous-containing internucleotide linking groups and one or more non-phosphorous containing internucleotide linking groups.

In certain embodiments, the double-stranded nucleic acid inhibitor molecule contains at least one phosphorothioate internucleotide linking group. In certain embodiments, the double-stranded nucleic acid inhibitor molecule contains less than 12, such as less than 10 phosphorothioate internucleotide linking groups. In certain embodiments, the double-stranded nucleic acid inhibitor molecule contains 5-11 phosphorothioate internucleotide linking groups ("PS"). In certain embodiments, the double-stranded nucleic acid inhibitor molecule contains 5 PS. In certain embodiments, the double-stranded nucleic acid inhibitor molecule contains 7 PS. In certain embodiments, the double-stranded nucleic acid inhibitor molecule contains 9 PS. In certain embodiments, the double-stranded nucleic acid inhibitor molecule contains 11 PS. In certain embodiments, the double-stranded nucleic acid inhibitor molecule contains 1 PS in the sense strand. In certain embodiments, each nucleotide that is modified with a 2'-F is flanked by 2 PS. In certain embodiments, the double-stranded nucleic acid inhibitor molecule contains 2 PS in the antisense strand. In certain embodiments, the antisense strand contains 4 PS. In certain embodiments, the antisense strand contains 6 PS. In certain embodiments, the antisense strand contains 8 PS. In certain embodiments, the antisense strand contains 10 PS.

A 5'-end of the sense and/or antisense strand of the double-stranded nucleic acid inhibitor molecule can include a natural substituent, such as a hydroxyl or a phosphate group. In certain embodiments, a hydroxyl group is attached to the 5'-terminal end of the sense and/or antisense strand of the double-stranded nucleic acid inhibitor molecule. In certain embodiments, a phosphate group is attached to the 5'-terminal end of the sense and/or antisense strand of the double-stranded nucleic acid inhibitor molecule. Typically, the phosphate is added to a monomer prior to oligonucleotide synthesis. In other embodiments, 5'-phosphorylation is accomplished naturally after a nucleic acid inhibitor molecule is introduced into the cytosol, for example, by a cytosolic Clp1 kinase. In some embodiments, the 5'-terminal phosphate is a phosphate group, such as 5'-monophosphate [(HO)$_2$(O)P—O-5'], 5'-diphosphate [(HO)$_2$(O)P—O—P(HO)(O)—O-5'] or a 5'-triphosphate[(HO)$_2$(O)P—O—(HO)(O)P—O—P(HO)(O)-0-5'].

The 5'-end of the sense and/or antisense strand of the double-stranded nucleic acid inhibitor molecule can also be modified. For example, in some embodiments, the 5'-end of the sense and/or antisense strand of the double-stranded nucleic acid inhibitor molecule is attached to a phosphoramidate [(HO)$_2$(O)P—NH-5', (HO)(NH$_2$)(O)P—O-5']. In certain embodiments, the 5'-terminal end of the sense and/or antisense strand of the double-stranded nucleic acid inhibitor molecule is attached to a phosphate mimic. Suitable phosphate mimics include 5'-phosphonates, such as 5'-methylenephosphonate (5'-MP), 5'-(E)-vinylphosphonate (5'-VP). Lima et al., Cell, 2012, 150-883-94; WO 2014/130607. Other suitable phosphate mimics include 4-phosphate analogs that are bound to the 4'-carbon of the sugar moiety (e.g., a ribose or deoxyribose or analog thereof) of the 5'-terminal nucleotide of an oligonucleotide as described in International Publication No. WO 2018/045317, which is hereby incorporated by reference in its entirety. For example, in some embodiments, the 5'-end of the sense and/or antisense strand of the double-stranded nucleic acid inhibitor molecule is attached to an oxymethylphosphonate, where the oxygen atom of the oxymethyl group is bound to the 4'-carbon of the sugar moiety or analog thereof. In other embodiments, the phosphate analog is a thiomethylphosphonate or an aminomethylphosphonate, where the sulfur atom of the thiomethyl group or the nitrogen atom of the aminomethyl group is bound to the 4'-carbon of the sugar moiety or analog thereof.

In certain embodiments, the double-stranded nucleic acid inhibitor molecule includes one or more deoxyribonucleotides. Typically, the double-stranded nucleic acid inhibitor molecules contain fewer than 5 deoxyribonucleotides. In certain embodiments, the double-stranded nucleic acid inhibitor molecules include one or more ribonucleotides. In certain embodiments, all of the nucleotides of the double-stranded nucleic acid inhibitor molecule are ribonucleotides.

In certain embodiments, one or more nucleotides outside of the stem (second duplex or D2) of the double-stranded nucleic acid inhibitor molecule contain a sugar moiety have a modified ring structure, including but not limited to, the modified ring structure present in bicyclic or tricyclic nucleotides, as described herein, and Unlocked Nucleic Acids ("UNA") (see, e.g., Snead et al. (2013), *Molecular Therapy—Nucleic Acids,* 2,e103 (doi: 10.1038/mtna.2013.36)).

In certain embodiments one or two nucleotides of the double-stranded nucleic acid inhibitor molecule are reversibly modified with a glutathione-sensitive moiety. Typically, the glutathione-sensitive moiety is located at the 2'-carbon of the sugar moiety and comprises a sulfonyl group. In certain embodiment, the glutathione-sensitive moiety is compatible with phosphoramidite oligonucleotide synthesis methods, as described, for example, in International Publication No. WO 2018/045317, which is hereby incorporated by reference in its entirety. In certain embodiments, more than two nucleotides of the double-stranded nucleic acid inhibitor molecule are reversibly modified with a glutathione-sensitive moiety. In certain embodiments, most of the nucleotides are reversibly modified with a glutathione-sensitive moiety. In certain embodiments, all or substantially all the nucleotides of the double-stranded nucleic acid inhibitor molecule are reversibly modified with a glutathione-sensitive moiety.

The at least one glutathione-sensitive moiety is typically located at the 5'- or 3'-terminal nucleotide of the sense strand or the antisense strand of the double-stranded nucleic acid inhibitor molecule. However, the at least one glutathione-sensitive moiety may be located at any nucleotide of interest in the double-stranded nucleic acid inhibitor molecule.

In certain embodiments, the double-stranded nucleic acid inhibitor molecule is fully modified, wherein every nucleotide of the sense strand and antisense strand is modified; typically every nucleotide is modified at the 2'-position of the sugar moiety. In certain embodiments, the fully modified nucleic acid inhibitor molecule does not contain a reversible modification. In some embodiments, at least one, such as at least two, three, four, five, six, seven, eight, nine, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, or 43 nucleotides of the sense strand of the double-stranded nucleic acid inhibitor molecule are modified. In some embodiments, at least one, such as at least two, three, four, five, six, seven, eight, nine, 10, 11, 12, 13, 14, 15, 16, 17, 18, 19, 20, 21, 22, 23, 24, 25, 26, 27, 28, 29, 30, 31, 32, or 33 nucleotides of the antisense strand of the double-stranded nucleic acid inhibitor molecule are modified.

In certain embodiments, the fully modified nucleic acid inhibitor molecule is modified with one or more reversible, glutathione-sensitive moieties. In certain embodiments, substantially all of the nucleotides of the double-stranded nucleic acid inhibitor molecule are modified. In certain embodiments, more than half of the nucleotides of the double-stranded nucleic acid inhibitor molecule are modified with a chemical modification other than a reversible modification. In certain embodiments, less than half of the nucleotides of the double-stranded nucleic acid inhibitor molecule are modified with a chemical modification other than a reversible modification. Modifications can occur in groups on the nucleic acid inhibitor molecule or different modified nucleotides can be interspersed.

In certain embodiments of the double-stranded nucleic acid inhibitor molecule, from one to every nucleotide is modified at the 2'-carbon. In certain embodiments, the double-stranded nucleic acid inhibitor molecule is partially or fully modified with 2'-F, 2'-OMe, and/or 2'-MOE. In certain embodiments of the double-stranded nucleic acid inhibitor molecule, from one to every phosphorous atom is modified and from one to every nucleotide is modified at the 2'-carbon of the sugar moiety.

In certain embodiments of the double-stranded nucleic acid inhibitor molecule, every nucleotide on the sense and antisense strands is modified at the 2'-carbon of the sugar moiety. In certain embodiments of the double-stranded nucleic acid inhibitor molecule, every nucleotide on the sense and antisense strands is modified at the 2'-carbon of the sugar moiety with a 2'-F or a 2'-OMe, except for the nucleotides in the second region of the sense strand (R2). In certain embodiments of the double-stranded nucleic acid inhibitor molecule, every nucleotide on the sense and antisense strands is modified at the 2'-carbon of the sugar moiety with a 2'-F or a 2'-OMe, except for the $T_m$-increasing nucleotides. In certain embodiments of the double-stranded nucleic acid inhibitor molecule, every nucleotide on the sense and antisense strands is modified at the 2'-carbon of the sugar moiety with a 2'-F or a 2'-OMe, except for the $T_m$-increasing nucleotides and the nucleotides in the loop region that are conjugated to a sugar ligand moiety, such as GalNAc.

Methods of Reducing Target Gene Expression

The double-stranded nucleic acid inhibitor molecule, as described herein, can be used in methods of reducing target mRNA expression of any target gene of interest. Typically, the method of reducing mRNA expression comprises administering the double-stranded nucleic acid inhibitor molecule, as described herein, to a sample or to a subject in need thereof in an amount sufficient to reduce mRNA expression of the target gene. The methods may be carried out in vitro or in vivo.

The level or activity of a target RNA can be determined by a suitable method now known in the art or that is later developed. It can be appreciated that the method used to measure a target RNA and/or the "expression" of a target gene can depend upon the nature of the target gene and its encoded RNA. For example, where the target RNA sequence encodes a protein, the term "expression" can refer to a protein or the target RNA/transcript derived from the target gene (either genomic or of exogenous origin). In such instances the expression of the target RNA can be determined by measuring the amount of target RNA/transcript directly or by measuring the amount of protein encoded by the target RNA/transcript. Protein can be measured in protein assays such as by staining or immunoblotting or, if the protein catalyzes a reaction that can be measured, by measuring reaction rates. All such methods are known in the art and can be used. Where target RNA levels are to be measured, art-recognized methods for detecting RNA levels can be used (e.g., RT-PCR, Northern Blotting, etc.). The above measurements can be made on cells, cell extracts, tissues, tissue extracts or other suitable source material.

The target gene may be a target gene from any mammal, such as a human target gene. Any target gene may be silenced according to the instant methods. In certain embodiments, the target gene is associated with chronic liver disease or chronic kidney disease, including, for example, AGXT, GRHPR, HOGA1, HAO1, SERPINA1, or LDHA.

In certain embodiments, the target gene is associated with a viral infectious disease, including, for example, an HBV gene or an HCV gene. In certain embodiments, the target gene is associated with cardiovascular disease, including, for example, APOC3 or PCSK9. In certain embodiments, the target gene is associated with alcohol metabolism and liver function, including, for example, ALDH2.

Other exemplary target genes include, but are not limited to, KRAS, Factor VII, Eg5, PCSK9, TPX2, apoB, SAA1, TTR, PDGF beta gene, Erb-B gene, Src gene, CRK gene, GRB2 gene, RAS gene, MEKK gene, JNK gene, RAF gene, Erk1/2 gene, PCNA (p21) gene, MYB gene, JUN gene, FOS gene, BCL-2 gene, Cyclin D gene, VEGF gene, EGFR gene, Cyclin A gene, Cyclin E gene, WNT-1 gene, beta-catenin gene, c-MET gene, PKC gene, NFKB gene, STAT3 gene, survivin gene, Her2/Neu gene, topoisomerase I gene, topoisomerase II alpha gene, p73 gene, p21 (WAF1/CIP1) gene, p27 (KIP1) gene, PPM1D gene, RAS gene, caveolin I gene, MIB I gene, MTAI gene, M68 gene, mutations in tumor suppressor genes, p53 tumor suppressor gene, and combinations thereof Pharmaceutical Compositions The present disclosure provides pharmaceutical compositions comprising a therapeutically effective amount of the double-stranded nucleic acid inhibitor molecule, as described herein, and a pharmaceutically acceptable excipient.

These pharmaceutical compositions may be sterilized by conventional sterilization techniques, or may be sterile filtered. The resulting aqueous solutions may be packaged for use as is, or lyophilized, the lyophilized preparation being combined with a sterile aqueous excipient prior to administration. The pH of the preparations typically will be between 3 and 11, more preferably between 5 and 9 or between 6 and 8, and most preferably between 7 and 8, such as 7 to 7.5.

The pharmaceutical compositions of the present disclosure are applied for therapeutic use. Thus, one aspect of the disclosure provides a pharmaceutical composition, which may be used to treat a subject including, but not limited to, a human suffering from a disease or a condition by administering to said subject a therapeutically effective amount of a pharmaceutical composition of the present disclosure. In certain embodiments, the disease or condition is cancer, as described herein.

In certain embodiments, the present disclosure features the use of a therapeutically effective amount of a pharmaceutical composition as described herein for the manufacture of a medicament for treatment of a subject in need thereof. In certain embodiments, the subject has cancer, as described herein.

Pharmaceutically-Acceptable Excipients

The pharmaceutically-acceptable excipients useful in this disclosure are typically conventional. Remington's Pharmaceutical Sciences, by E. W. Martin, Mack Publishing Co., Easton, PA, 15$^{th}$ Edition (1975), describes compositions and formulations suitable for pharmaceutical delivery of one or more therapeutic compositions. Some examples of materials which can serve as pharmaceutically-acceptable excipients include: sugars, such as lactose, glucose and sucrose; starches, such as corn starch and potato starch; cellulose and its derivatives, such as sodium carboxymethyl cellulose, ethyl cellulose and cellulose acetate; malt; gelatin; excipients, such as cocoa butter and suppository waxes; oils, such as peanut oil, cottonseed oil, safflower oil, sesame oil, olive oil, corn oil and soybean oil; buffering agents, such as magnesium hydroxide and aluminum hydroxide; (isotonic saline; Ringer's solution); ethyl alcohol; pH buffered solutions; polyols, such as glycerol, propylene glycol, polyethylene glycol, and the like; and other non-toxic compatible substances employed in pharmaceutical formulations.

Dosage Forms

The pharmaceutical compositions may be formulated with conventional excipients for any intended route of administration, which may be selected according to ordinary practice.

In one embodiment, the pharmaceutical composition contains the double-stranded nucleic acid inhibitor molecule, as described herein, and is suitable for parenteral administration, for example, by subcutaneous, intramuscular, intravenous or epidural injection. Typically, the pharmaceutical compositions of the present disclosure are formulated in liquid form for parenteral administration.

Dosage forms suitable for parenteral administration typically include one or more suitable vehicles for parenteral administration including, by way of example, sterile aqueous solutions, saline, low molecular weight alcohols such as propylene glycol, polyethylene glycol, vegetable oils, gelatin, fatty acid esters such as ethyl oleate, and the like. The parenteral formulations may contain sugars, alcohols, antioxidants, buffers, bacteriostats, solutes which render the formulation isotonic with the blood of the intended recipient or suspending or thickening agents. Proper fluidity can be maintained, for example, by the use of surfactants. Liquid formulations containing the double-stranded nucleic acid inhibitor can be lyophilized and stored for later use upon reconstitution with a sterile injectable solution.

The pharmaceutical compositions may also be formulated for other routes of administration including topical or transdermal administration, rectal or vaginal administration, ocular administration, nasal administration, buccal administration, or sublingual administration using well known techniques.

Delivery Agents

The double-stranded nucleic acid inhibitor molecule, as described herein, may be admixed, encapsulated, conjugated or otherwise associated with other molecules, molecule structures or mixtures of compounds, including, for example, liposomes and lipids such as those disclosed in U.S. Pat. Nos. 6,815,432, 6,586,410, 6,858,225, 7,811,602, 7,244,448 and 8,158,601; polymeric materials such as those disclosed in U.S. Pat. Nos. 6,835,393, 7,374,778, 7,737,108, 7,718,193, 8,137,695 and U.S. Published Patent Application Nos. 2011/0143434, 2011/0129921, 2011/0123636, 2011/0143435, 2011/0142951, 2012/0021514, 2011/0281934, 2011/0286957 and 2008/0152661; capsids, capsoids, or receptor targeted molecules for assisting in uptake, distribution or absorption.

In certain embodiments, the double-stranded nucleic acid inhibitor molecule is formulated in a lipid nanoparticle (LNP). Lipid-nucleic acid nanoparticles typically form spontaneously upon mixing lipids with nucleic acid to form a complex. Depending on the desired particle size distribution, the resultant nanoparticle mixture can be optionally extruded through a polycarbonate membrane (e.g., 100 nm cut-off) using, for example, a thermobarrel extruder, such as LIPEX® Extruder (Northern Lipids, Inc). To prepare a lipid nanoparticle for therapeutic use, it may desirable to remove solvent (e.g., ethanol) used to form the nanoparticle and/or exchange buffer, which can be accomplished by, for example, dialysis or tangential flow filtration. Methods of making lipid nanoparticles containing nucleic acid interference molecules are known in the art, as disclosed, for example in U.S. Published Patent Application Nos. 2015/0374842 and 2014/0107178.

In certain embodiments, the LNP comprises a core lipid component comprising a cationic liposome and a pegylated lipid. The LNP can further comprise one or more envelope lipids, such as a cationic lipid, a structural or neutral lipid, a sterol, a pegylated lipid, or mixtures thereof.

Cationic lipids for use in LNPs are known in the art, as discussed for example in U.S. Published Patent Application Nos. 2015/0374842 and 2014/0107178. Typically, the cationic lipid is a lipid having a net positive charge at physiological pH. In certain embodiments, the cationic liposome is DODMA, DOTMA, DL-048, or DL-103. In certain embodiments the structural or neutral lipid is DSPC, DPPC or DOPC. In certain embodiments, the sterol is cholesterol. In certain embodiments, the pegylated lipid is DMPE-PEG, DSPE-PEG, DSG-PEG, DMPE-PEG2K, DSPE-PEG2K, DSG-PEG2K, or DSG-mPEG. In one embodiment, the cationic lipid is DL-048, the pegylated lipid is DSG-mPEG and the one or more envelope lipids are DL-103, DSPC, cholesterol, and DSPE-mPEG. See e.g., FIG. 11, showing one non-limiting embodiment of a LNP that can used to formulate the double-stranded nucleic acid inhibitor molecule.

In certain embodiments, the double-stranded nucleic acid inhibitor molecule is covalently conjugated to a ligand that directs delivery of the oligonucleotide to a tissue of interest. Many such ligands have been explored. See, e.g., Winkler, Ther. Deliv. 4(7): 791-809 (2013). For example, the double-stranded nucleic acid inhibitor molecule can be conjugated to one or more sugar ligand moieties (e.g., N-acetylgalactosamine (GalNAc)) to direct uptake of the oligonucleotide into the liver. See, e.g., U.S. Pat. Nos. 5,994,517; 5,574,142; WO 2016/100401. In certain embodiments, the one or more ligands are conjugated to one or more nucleotides in the tetraloop or the triloop of the double-stranded nucleic acid inhibitor molecule.

In certain embodiments, the double-stranded nucleic acid inhibitor molecule is conjugated to 2-4 sugar ligand moieties in the tetraloop or 2 or 3 sugar ligand moieties in the triloop. In one embodiment, two of the nucleotides in the tetraloop are conjugated to a sugar ligand moiety. In one embodiment, three of the nucleotides in the tetraloop are conjugated to a sugar ligand moiety. In another embodiment, four of the nucleotides in the tetraloop are conjugated to a sugar ligand moiety. In one embodiment, 2 of the nucleotides in the triloop are conjugated to a sugar moiety. In one embodiment, 3 of the nucleotides in the triloop are conjugated to a sugar moiety. In certain embodiments, the sugar ligand moiety is GalNAc. Other ligands that can be used include, but are not limited to, mannose-6-phosphate, cholesterol, folate, transferrin, and galactose (for other specific exemplary ligands see, e.g., WO 2012/089352).

The ligand can be conjugated to any part of the nucleotide as long as it is capable of directing delivery of the oligonucleotide to the tissue of interest. In certain embodiments, the ligand (e.g., GalNAc) is conjugated to the nucleotide at the 2'-position of the sugar moiety.

Methods of Administration/Treatment

One embodiment is directed to a method of treating a disorder, comprising administering to a subject a pharmaceutical composition comprising a therapeutically effective amount of the double-stranded nucleic acid inhibitor molecule, as described herein.

In certain embodiments the pharmaceutical compositions disclosed herein may be useful for treatment or prevention of symptoms related to proliferative, inflammatory, autoimmune, neurologic, ocular, respiratory, metabolic, dermatological, auditory, liver, kidney, or infectious diseases. One embodiment is directed to a method of treating a proliferative, inflammatory, autoimmune, neurologic, ocular, respiratory, metabolic, dermatological, auditory, liver, kidney, or infectious disease, comprising administering to a subject a pharmaceutical composition comprising a therapeutically effective amount of a double-stranded nucleic acid inhibitor molecule, as described herein.

In certain embodiments, the disorder is a rare disease, a chronic liver disease, a chronic kidney disease, cardiovascular disease or a viral infectious disease. In certain embodiments, the disorder is hyperoxaluria, including primary hyperoxaluria (PH1, PH2, or PH3) or idiopathic hyperoxaluria. In certain embodiments, the disorder is chronic kidney disorder (CKD). In certain embodiments, the disorder is pyruvate dehydrogenase deficiency. In certain embodiments, the disorder is alpha-1 antitrypsin (A1AT) deficiency.

In certain embodiments, the disorder is a cancer. Non-limiting examples of such cancers include biliary tract cancer, bladder cancer, transitional cell carcinoma, urothelial carcinoma, brain cancer, gliomas, astrocytomas, breast carcinoma, metaplastic carcinoma, cervical cancer, cervical squamous cell carcinoma, rectal cancer, colorectal carcinoma, colon cancer, hereditary nonpolyposis colorectal cancer, colorectal adenocarcinomas, gastrointestinal stromal tumors (GISTs), endometrial carcinoma, endometrial stromal sarcomas, esophageal cancer, esophageal squamous cell carcinoma, esophageal adenocarcinoma, ocular melanoma, uveal melanoma, gallbladder carcinomas, gallbladder adenocarcinoma, renal cell carcinoma, clear cell renal cell carcinoma, transitional cell carcinoma, urothelial carcinomas, wilms tumor, leukemia, acute lymocytic leukemia (ALL), acute myeloid leukemia (AML), chronic lymphocytic (CLL), chronic myeloid (CML), chronic myelomonocytic (CMML), liver cancer, liver carcinoma, hepatoma, hepatocellular carcinoma, cholangiocarcinoma, hepatoblastoma, Lung cancer, non-small cell lung cancer (NSCLC), mesothelioma, B-cell lymphomas, non-Hodgkin lymphoma, diffuse large B-cell lymphoma, Mantle cell lymphoma, T-cell lymphomas, non-Hodgkin lymphoma, precursor T-lymphoblastic lymphoma/leukemia, peripheral T-cell lymphomas, multiple myeloma, nasopharyngeal carcinoma (NPC), neuroblastoma, oropharyngeal cancer, oral cavity squamous cell carcinomas, osteosarcoma, ovarian carcinoma, pancreatic cancer, pancreatic ductal adenocarcinoma, pseudopapillary neoplasms, acinar cell carcinomas. Prostate cancer, prostate adenocarcinoma, skin cancer, melanoma, malignant melanoma, cutaneous melanoma, small intestine carcinomas, stomach cancer, gastric carcinoma, gastrointestinal stromal tumor (GIST), uterine cancer, or uterine sarcoma. Typically, the present disclosure features methods of treating liver cancer, liver carcinoma, hepatoma, hepatocellular carcinoma, cholangiocarcinoma and hepatoblastoma by administering a therapeutically effective amount of a pharmaceutical composition as described herein.

In some embodiments, the present disclosure provides a method for reducing expression of a target gene in a subject comprising administering a pharmaceutical composition to a subject in need thereof in an amount sufficient to reduce expression of the target gene, wherein the pharmaceutical composition comprises a double-stranded nucleic acid inhibitor molecule as described herein and a pharmaceutically acceptable excipient as also described herein.

Dosing and Schedule

Typically, the double-stranded nucleic acid inhibitor molecule is administered parenterally (such as via intravenous, intramuscular, or subcutaneous administration). In other embodiments, the pharmaceutical composition is delivered via local administration or systemic administration. However, the pharmaceutical compositions disclosed herein may also be administered by any method known in the art, including, for example, buccal, sublingual, rectal, vaginal, intraurethral, topical, intraocular, intranasal, and/or intrarticular, which administration may include tablets, capsules, granules, aqueous suspensions, gels, sprays, suppositories, salves, ointments, or the like.

In certain embodiments, the double-stranded nucleic acid inhibitor molecule is administered at a dosage of 20 micrograms to 10 milligrams per kilogram body weight of the recipient per day, 100 micrograms to 5 milligrams per kilogram, 0.25 milligrams to 5.0 milligrams per kilogram, or 0.5 to 3.0 milligrams per kilogram. Typically, the double-stranded nucleic acid inhibitor molecule is administered at a dosage of about 0.25 to 2.0 milligrams per kilogram body weight of the recipient per day.

A pharmaceutical composition of the instant disclosure may be administered every day, or intermittently. For example, intermittent administration of the double-stranded nucleic acid inhibitor molecule may be administration one to six days per week, one to six days per month, once weekly, once every other week, once monthly, once every other month, once every three months, or once or twice per year or divided into multiple yearly, monthly, weekly, or daily doses. In some embodiments, intermittent dosing may mean administration in cycles with the initial double-stranded nucleic acid inhibitor molecule administration followed by a rest period with no administration for up to one week, up to one month, up to two months, up to three months or up to six months or more) or it may mean administration on alternate days, weeks, months or years.

The therapeutically effective amount of the double-stranded nucleic acid inhibitor molecule may depend on the route of administration and the physical characteristics of the patient, such as the size and weight of the subject, the extent of the disease progression or penetration, the age, health, and sex of the subject and can be adjusted as necessary depending on these and other factors.

EXAMPLES

Example 1: In Vivo Potency of Double-Stranded Nucleic Acid Inhibitor Molecules Containing Shortened Sense Strands Double-stranded nucleic acid inhibitor molecules containing sense strands of varying lengths were evaluated for potency in reducing target gene mRNA expression. The eight test nucleic acid inhibitor molecules used in Example 1 (Constructs 1-8) are shown in FIGS. 2A-H. With the exception of the nucleotides in the loop that are conjugated to GalNAc and the bicyclic nucleotides, every other nucleotide in the test nucleic acid inhibitor molecules is modified at the 2'-position of the sugar moiety with either 2'-F or 2'-OMe. Construct 1 represents a control molecule that does not contain a shortened sense strand. In Construct 1, the sense strand has a length of 29 nucleotides and the 3'-end of the antisense strand contains a single-stranded overhang of two nucleotides. Constructs 2-8 differed from Construct 1 in the length of the sense strand and the resulting single-stranded overhang at the 3'-end of the antisense strand. In addition, Constructs 2-8 contained an additional two PS-linkages flanking nucleotide 14 (G14), a 2'-F-modified nucleotide, on the antisense strand. The nucleic acid inhibitor molecules in FIGS. 2A-H are summarized in the following table:

TABLE 1

Test nucleic acid inhibitors in FIG. 1

| FIG. | Name | Sense Strand Length | PS linkages in Antisense Strand | Length of 3' Antisense Overhang |
|---|---|---|---|---|
| 2A | Construct 1 | 29 | 4 | 2 |
| 2B | Construct 2 | 25 | 6 | 6 |
| 2C | Construct 3 | 24 | 6 | 7 |
| 2D | Construct 4 | 23 | 6 | 8 |
| 2E | Construct 5 | 22 | 6 | 9 |
| 2F | Construct 6 | 21 | 6 | 10 |
| 2G | Construct 7 | 20 | 6 | 11 |
| 2H | Construct 8 | 19 | 6 | 12 |

Other than the two additional PS-linkages flanking G14 on the antisense strand and the shortened sense strand lengths, Constructs 2-8 are identical to Construct 1. Likewise, other than differing sense strand lengths, Constructs 2-8 are identical to each other.

CD-1 female mice were divided into study groups of four mice each and dosed with 0.5 mg/kg of the test nucleic acid inhibitor molecule assigned to that group. Additionally, four control CD-1 mice were dosed with a placebo (PBS). Dosing was subcutaneous and single dose, and the mice were sacrificed 4 days post-dose. A pharmacodynamics study was conducted, and liver tissue was collected by taking two 4 mm punch biopsies which were stored in Invitrogen™ RNAlater™ solution (Thermo Fisher Scientific, Waltham, MA) for later mRNA analysis. Tissue samples were homogenized in QIAzol® Lysis Reagent using TissueLyser II (Qiagen, Valencia, CA). RNA was then purified using MagMAX Technology according to manufacturer instructions (ThermoFisher Scientific, Waltham, MA). High capacity cDNA reverse transcription kit (ThermoFisher Scientific, Waltham, MA) was used to prepare cDNA. Primers for the target sequence were used for PCR on a CFX384 Real-Time PCR Detection System (Bio-Rad Laboratories, Inc., Hercules, CA).

Figure 3:
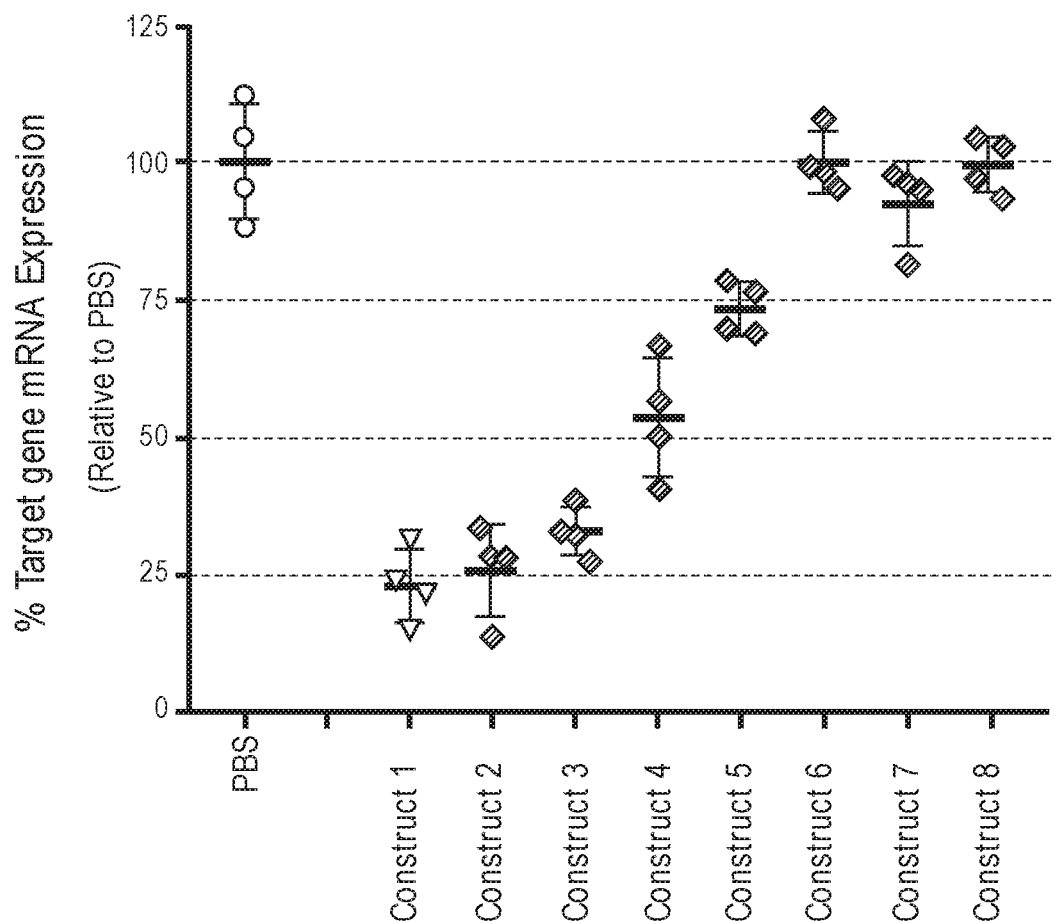
FIG. 3 shows the percent of target gene mRNA remaining 4 days after administering Construct 1 (see FIG. 2A) and Constructs 2-8 (see FIGS. 2B-H) to CD-1 mice, as described in Example 1. Constructs 2 and 3, having a 3'-end overhang in the antisense strand of 6 and 7 nucleotides respectively, maintained potency of gene knockdown as compared to Construct 1, having a 3'-end overhang in the antisense strand of 2 nucleotides. Constructs 4 and 5, having a 3'-end overhang in the antisense strand of 8 and 9 nucleotides, respectively, reduced target mRNA expression as compared to the control PBS. Constructs 6-8, containing a 3'-end overhang in the antisense strand of 10, 11, and 12 nucleotides, respectively, did not significantly reduce target mRNA expression.

The test nucleic acid inhibitor molecules having a shortened sense strand (Constructs 2-8) were compared to the control nucleic acid inhibitor molecule (Construct 1), as well as to the PBS control. As shown in FIG. 3, the test nucleic acid inhibitor molecules containing shortened sense strands showed a relatively smooth decrease in mRNA expression as the length of the sense strand decreased. Constructs 2, 3, and 4, containing sense strand lengths of 25, 24, and 23 nucleotides in length, respectively, with a 3'-antisense overhang of 6, 7, and 8 nucleotides, respectively, retained at least about an $ED_{50}$ at 0.5 mg/kg relative to PBS. With Constructs 2-6, potency was inversely proportional to the length of the single-strand 3'-overhang of the antisense strand. Constructs 2 and 3, having a 3'-antisense overhang of 6 and 7 nucleotides, respectively, showed more potent target gene mRNA knockdown than Constructs 4 and 5, having a 3'-antisense overhang of 8 and 9 nucleotides, respectively.

Example 2: In Vivo Potency of Double-Stranded Nucleic Acid Inhibitor Molecules Containing Shortened Passenger Strand and 5'-Terminal Bicyclic Nucleotide Double-stranded nucleic acid inhibitor molecules containing sense strands of varying lengths and a bicyclic nucleotide at the 5'-terminus of the sense strand (i.e., nucleotide 1 of the sense strand) were evaluated for potency in reducing target gene mRNA expression. The eight test nucleic acid inhibitor molecules used in Example 2 (Constructs 1 and 9-15) are shown in FIGS. 4A-H. With the exception of the nucleotides in the loop that are conjugated to GalNAc and the bicyclic nucleotides, every other nucleotide in the test nucleic acid inhibitor molecules is modified at the 2'-position of the sugar moiety with either 2'-F or 2'-OMe. The test nucleic acid inhibitor molecules differed from the control nucleic acid inhibitor molecule in the following respects: (1) the length of the sense strand; (2) the presence of two PS-linkages flanking a 2'-F-modified nucleotide 14 (G14) on the antisense strand; and (3) presence of a bicyclic nucleotide (LNA) at nucleotide 1 ($P_1$) at the 5'-end of the sense strand. The nucleic acid inhibitor molecules in FIGS. 4A-H are summarized in the following table:

TABLE 2

Test nucleic acid inhibitors in FIG. 4

| FIG. | Name | Sense Strand Length | PS linkages in Antisense Strand | Length of 3' Antisense Overhang | 5'-LNA in Sense Strand |
|---|---|---|---|---|---|
| 4A | Const. 1 | 29 | 4 | 2 | No |
| 4B | Const. 9 | 25 | 6 | 6 | Yes |
| 4C | Const. 10 | 24 | 6 | 7 | Yes |
| 4D | Const. 11 | 23 | 6 | 8 | Yes |
| 4E | Const. 12 | 22 | 6 | 9 | Yes |
| 4F | Const. 13 | 21 | 6 | 10 | Yes |
| 4G | Const. 14 | 20 | 6 | 11 | Yes |
| 4H | Const. 15 | 19 | 6 | 12 | Yes |

Other than the bicyclic nucleotide at $P_1$ of the sense strand, Constructs 9-15 were identical to Constructs 2-8, respectively. Likewise, other than differing sense strand lengths, Constructs 9-15 are identical to each other.

CD-1 female mice were divided into study groups of four mice each and the procedure described above in Example 1 was followed, wherein each mouse was dosed with 0.5 mg/kg of the test nucleic acid inhibitor molecule assigned to that group and liver tissue samples were analyzed.

The test nucleic acid inhibitor molecules having a shortened sense strand and bicyclic nucleotide at $P_1$ of the sense strand (Constructs 9-15) were compared to the control nucleic acid molecule (Construct 1) having a 29-nucleotide sense strand and single-stranded overhang of 2 nucleotides at the 3'-end of the antisense strand, as well as to the PBS control. As shown in FIG. 5, the test nucleic acid inhibitor molecules containing shortened sense strands and a bicyclic nucleotide at the 5'-end of the sense strand maintained potent target gene mRNA knockdown, even when the length of the sense strand was shortened to 21 nucleotides (overhang of 10 nucleotides at 3'-end of antisense strand). See FIG. 5. Constructs 14 and 15, having sense strands of 20 and 19 nucleotides, respectively (overhangs of 11 and 12, respectively, at the 3'-end of the antisense strand) had little to no activity. FIG. 5. Notably, construct 13 retained at least an $ED_{50}$ at 0.5 mg/kg relative to PBS, whereas Construct 6, which is identical to Construct 13 with the exception of the bicyclic nucleotide at the 5'-end of the sense strand, had no activity. See FIGS. 3 and 5.

Example 3: In Vivo Potency of Double-Stranded Nucleic Acid Inhibitor Molecules Containing Shortened Sense Strand with Two Bicyclic Nucleotides in R1 of Sense Strand Double-stranded nucleic acid inhibitor molecules containing shortened sense strands and two bicyclic nucleotides in the first region (R1) of the sense strand were evaluated for potency in reducing target gene mRNA expression. The seven test nucleic acid inhibitor molecules used in Example 3 (Constructs 1, 4-6, and 16-18) are shown in FIGS. 6A-G. With the exception of the nucleotides in the loop that are conjugated to GalNAc and the bicyclic nucleotides, every other nucleotide in the test nucleic acid inhibitor molecules is modified at the 2'-position of the sugar moiety with either 2'-F or 2'-OMe. The test nucleic acid inhibitor molecules differed from the control nucleic acid inhibitor molecule in the following respects: (1) the length of the sense strand; (2) the presence of two PS-linkages flanking nucleotide 14 (G14), a 2'-F-modified nucleotide, on the antisense strand; and (3) a first bicyclic nucleotide (LNA) at the 5'-end of the sense strand and a second bicyclic nucleotide at the original nucleotide 15 (P15) of the sense strand (position P9, P8, and P7 for Constructs 16, 17, and 18, respectively). In all of Constructs 16-18, the second bicyclic nucleotide in the sense strand base pairs with nucleotide 6 (G6) of the antisense strand. The nucleic acid inhibitor molecules in FIGS. 6A-G are summarized in the following table:

TABLE 3

Test nucleic acid inhibitors in FIG. 6

| FIG. | Name | Sense Strand Length | PS linkages in Antisense Strand | Length of 3' Antisense Overhang | 5'-LNA in Sense Strand | Position of additional LNAs in Sense Strand |
|---|---|---|---|---|---|---|
| 6A | Const. 1 | 29 | 4 | 2 | No | None |
| 6B | Const. 4 | 23 | 6 | 8 | No | None |
| 6C | Const. 16 | 23 | 6 | 8 | Yes | P9 |
| 6D | Const. 5 | 22 | 6 | 9 | No | None |
| 6E | Const. 17 | 22 | 6 | 9 | Yes | P8 |
| 6F | Const. 6 | 21 | 6 | 10 | No | None |
| 6G | Const. 18 | 21 | 6 | 10 | Yes | P7 |

Other than the bicyclic nucleotides at nucleotide 1 of the sense strand and at nucleotides 9, 8, and 7 of the sense strand, Constructs 16, 17, and 18 are identical to Constructs 4, 5, and 6, respectively. Likewise, other than differing sense strand lengths, Constructs 16, 17, and 18 are identical to each other.

CD-1 female mice were divided into study groups of four mice each and the procedure described above in Example 1 was followed, wherein each mouse was dosed with 0.5 mg/kg of the test nucleic acid inhibitor molecule assigned to that group and the liver tissue analyzed.

The test nucleic acid inhibitor molecules having a shortened sense strand and a bicyclic nucleotide at P1 and one of P9, P8, or P7 of the sense strand (Constructs 16-18) were compared to the corresponding test nucleic acid molecules that did not have any bicyclic nucleotides in region 1 (R1) of the sense strand (Construct 4-6), as well as to the PBS control. As shown in FIG. 7, the test nucleic acid inhibitor molecules containing shortened sense strands with a bicyclic nucleotide at P1 and one of P9, P8, or P7 of the sense strand showed enhanced mRNA knockdown activity compared to each of the comparable test nucleic acid inhibitor molecules that did not have any bicyclic nucleotides in region 1 (R1) of the sense strand. For example, Construct 18, having an overhang of 10 nucleotides at the 3'-end of the antisense strand and bicyclic nucleotides at P1 and P7 of the sense strand showed potent mRNA knockdown activity, whereas Construct 6, which also had a 3' antisense overhang of 10 nucleotides but no bicyclic nucleotides in region 1 (R1) of the sense strand had no activity. FIG. 7 (see also Constructs 16 and 17 compared to Constructs 4 and 5, respectively).

The test nucleic acid inhibitor molecules from Example 2 were compared to the test nucleic acid inhibitor molecules from Example 3. Constructs 11-13, each of which contained a single bicyclic nucleotide at P1 of the sense strand, were compared to the corresponding Constructs 16-18, which were identical to Constructs 11-13 with the exception of an additional bicyclic nucleotide in the first region (R1) of the sense strand at P9, P8, and P7, as discussed above. As shown in FIG. 8, all six of Constructs 11-13 and 16-18 showed significant mRNA knockdown activity as compared to the PBS control. Although the addition of a bicyclic nucleotide at P9 and P8 of Construct 16 and Construct 17, respectively, appeared to reduce potency as compared to the counterpart Constructs 11 and 12, the potency of Construct 18 (overhang of 10 nucleotides at the 3'-end of antisense strand) was increased as compared to the counterpart Construct 13. See FIG. 8.

Example 4: In Vivo Potency of Double-Stranded Nucleic Acid Inhibitor Molecules Containing Shortened Passenger Strands and Multiple Bicyclic Nucleotides in R1 of Sense Strand Double-stranded nucleic acid inhibitor molecules containing shortened sense strand lengths and multiple bicyclic nucleic acids in the first region (R1) of the sense strand were evaluated for potency in reducing target gene mRNA expression. The twelve test nucleic acid inhibitor molecules used in Example 4 (Constructs 4-6 and 16-24) are shown in FIGS. 9A-L. With the exception of the nucleotides in the loop that are conjugated to GalNAc and the bicyclic nucleotides, every other nucleotide in the test nucleic acid inhibitor molecules is modified at the 2'-position of the sugar moiety with either 2'-F or 2'-OMe. The test nucleic acid inhibitor molecules differed from each other in the following respects: (1) the length of the sense strand; (2) the presence of a bicyclic nucleotide (LNA) at the 5'-end of the sense strand as well as at the original (P15) of the sense strand (position P9, P8, and P7 for Constructs 16, 17, and 18, respectively); and (3) the presence of 1 or 3 additional bicyclic nucleotides in the first region (R1) of the sense strand. The nucleic acid inhibitor molecules in FIGS. 9A-L are summarized in the following table:

TABLE 4

Test nucleic acid inhibitors in FIG. 9

| FIG. | Name | Sense Strand Length | Length of 3' Antisense Overhang | 5'-LNA in Sense Strand | Position of additional LNAs in Sense Strand |
|---|---|---|---|---|---|
| 9A | Construct 4 | 23 | 8 | No | None |
| 9B | Construct 16 | 23 | 8 | Yes | P9 |
| 9C | Construct 19 | 23 | 8 | Yes | P9, P10 |
| 9D | Construct 22 | 23 | 8 | Yes | P9, P10, P12, P13 |
| 9E | Construct 5 | 22 | 9 | No | None |
| 9F | Construct 17 | 22 | 9 | Yes | P8 |
| 9G | Construct 20 | 22 | 9 | Yes | P8, P9 |
| 9H | Construct 23 | 22 | 9 | Yes | P8, P9, P11, P12 |
| 9I | Construct 6 | 21 | 10 | No | None |
| 9J | Construct 18 | 21 | 10 | Yes | P7 |
| 9K | Construct 21 | 21 | 10 | Yes | P7, P8 |
| 9L | Construct 24 | 21 | 10 | Yes | P7, P8, P10, P11 |

Other than the presence of the bicyclic nucleotide at the 5'-end and at various positions in the first region (R1) of the sense strand, Constructs 4, 16, 19, and 22 are identical (all having overhangs of 8 nucleotides at the 3'-end of the antisense strand), as are Constructs 5, 17, 20, and 23 (all having overhangs of 9 nucleotides at the 3'-end of the antisense strand), and Constructs 6, 18, 21, and 24 (all having overhangs of 10 nucleotides at the 3'-end of the antisense strand).

CD-1 female mice were divided into study groups of four mice each and the procedure described above in Example 1 was followed, wherein each mouse was dosed with 0.5 mg/kg of the test nucleic acid inhibitor molecule assigned to that group and the liver tissue analyzed.

As shown in FIG. 10, the presence of a bicyclic nucleotide at P1 of the sense strand and a single bicyclic nucleotide at the original nucleotide 15 (P15) (i.e., P9, P8, and P7 in Constructs 16-18, respectively) in test nucleic acid inhibitor molecules having a shortened sense strand improved target gene mRNA knockdown activity over comparable test nucleic acid inhibitor molecules without any bicyclic nucleotides in the first region (R1) of the sense strand (Constructs 16-18 versus Constructs 4-6). In addition, the presence of an additional bicyclic nucleotide adjacent to the original P15 position, for a total of 3 bicyclic nucleotides in the first region (R1) of the sense strand, also improved target gene mRNA knockdown over comparable test nucleic acid inhibitor molecules without any bicyclic nucleotides in the first region of the sense strand (Constructs 19-21 versus Constructs 4-6). See FIG. 10. However, the addition of two additional bicyclic nucleotides at original P18 and P19 (P12 and P13 for Construct 22; P11 and P12 for Construct 23; and P10 and P11 for Construct 24) substantially reduced target gene mRNA expression as compared to test nucleic acid inhibitor molecules having either two bicyclic nucleotides in the first region (R1) of the sense strand (Constructs 16-18) or three bicyclic nucleotides in the first region (R1) of the sense strand (Constructs 19-21). Although not wishing to be bound by theory, it is hypothesized that $T_m$-increasing nucleotides in close proximity to the 5'-end of the antisense strand may negatively affect target gene mRNA knockdown activity.

What is claimed is:
1. A double-stranded nucleic acid inhibitor molecule, comprising:
   a sense strand comprising 15-43 nucleotides and having a first region (R1) and a second region (R2);
   an antisense strand comprising 18-35 nucleotides and a 5'- and 3'-end, wherein the sense strand and antisense strand are separate strands;
   a first duplex (D1) formed by the first region of the sense strand and the antisense strand, wherein the first duplex has a length of 8-29 base pairs;
   wherein the second region of the sense strand comprises a first subregion (S1), a second subregion (S2) and a single stranded loop that joins the first and second subregions, wherein the first and second subregions form a second duplex (D2); and
   wherein:
   i) the antisense strand has a single stranded overhang of 7-9 nucleotides at the 3'-end and the second duplex has a length of 3-5 base pairs and comprises at least one bicyclic nucleotide; or
   ii) the antisense strand has a single stranded overhang of 7-9 nucleotides at the 3'-end, nucleotide 1 of the sense strand is a bicyclic nucleotide, and the second duplex has a length of 3-5 base pairs and comprises at least one bicyclic nucleotide.

2. The double-stranded nucleic acid inhibitor molecule of claim 1, wherein:
a) the sense strand has 15-30 nucleotides; the antisense strand has 20 nucleotides; and the first duplex has a length of 10-14 base pairs;
b) the sense strand has 16-31 nucleotides; the antisense strand has 21 nucleotides; and the first duplex has a length of 11-15 base pairs;
c) the sense strand has 17-32 nucleotides; the antisense strand has 22 nucleotides; and the first duplex has a length of 12-16 base pairs;
d) the sense strand has 18-33 nucleotides; the antisense strand has 23 nucleotides; and the first duplex has a length of 13-17 base pairs;
e) the sense strand has 19-34 nucleotides; the antisense strand has 24 nucleotides; and the first duplex has a length of 14-18 base pairs;
f) the sense strand has 20-35 nucleotides; the antisense strand has 25 nucleotides; and the first duplex has a length of 15-19 base pairs;
g) the sense strand has 21-36 nucleotides; the antisense strand has 26 nucleotides; and the first duplex has a length of 16-20 base pairs;
h) the sense strand has 22-37 nucleotides; the antisense strand has 27 nucleotides; and the first duplex has a length of 17-21 base pairs;
the sense strand has 23-38 nucleotides; the antisense strand has 28 nucleotides; and the first duplex has a length of 18-22 base pairs;
j) the sense strand has 24-39 nucleotides; the antisense strand has 29 nucleotides; and the first duplex has a length of 19-23 base pairs;
k) the sense strand has 25-40 nucleotides; the antisense strand has 30 nucleotides; and the first duplex has a length of 20-24 base pairs;
l) The sense strand has 26-41 nucleotides; the antisense strand has 31 nucleotides; and the first duplex has a length of 21-25 base pairs;
m) the sense strand has 27-42 nucleotides; the antisense strand has 32 nucleotides; and the first duplex has a length of 22-26 base pairs; or
n) the sense strand has 28-43 nucleotides; the antisense strand has 33 nucleotides; and the first duplex has a length of 23-27 base pairs.

3. The double-stranded nucleic acid inhibitor molecule of claim 1, wherein the antisense strand has 20-24, 21-23, or 22 nucleotides, wherein the 3'-end of the antisense strand has a single-stranded overhang of 7-9 nucleotides, wherein the first duplex has a length of 12-16 base pairs, and wherein the loop is a tetraloop or a triloop.

4. The double-stranded nucleic acid inhibitor molecule of claim 1, wherein at least one nucleotide in the antisense strand is modified with a 2'-F and wherein the at least one nucleotide in the antisense strand that is modified with the 2'-F is flanked by a phosphorous-containing internucleotide linkage other than a phosphodiester linkage.

5. The double-stranded nucleic acid inhibitor molecule of claim 1, wherein nucleotide 14 of the antisense strand is modified with a 2'-F and is linked to nucleotides 13 and 15 of the antisense strand by the phosphorous-containing internucleotide linkage other than the phosphodiester linkage and/or wherein nucleotide 2 of the antisense strand is modified with a 2'-F and is linked to nucleotides 1 and 3 of the antisense strand by the phosphorous-containing internucleotide linkage other than the phosphodiester linkage.

6. The double-stranded nucleic acid inhibitor molecule of claim 1, wherein the antisense strand contains at least two nucleotides modified with a 2'-F that are flanked by the phosphorous-containing internucleotide linkage other than the phosphodiester linkage, wherein the phosphorous-containing internucleotide linkage is a phosphorothioate linkage.

7. The double-stranded nucleic acid inhibitor molecule of claim 1, wherein the nucleotide in the first region of the sense strand that base pairs with nucleotide 6 of the antisense strand is a bicyclic nucleotide and/or the nucleotide in region 1 of the sense strand that base pairs with nucleotide 5 of the antisense strand is a bicyclic nucleotide.

8. The double-stranded nucleic acid inhibitor molecule of claim 1, wherein none of the nucleotides in the first region of the sense strand that base pair with nucleotides 1-4 of the antisense strand is a bicyclic nucleotide.

9. The double-stranded nucleic acid inhibitor molecule of claim 1, wherein the second duplex has a length of 3 base pairs and contains at least one bicyclic nucleotide or wherein the second duplex contains 6-10 bicyclic nucleotides and has a length of 3-5 base pairs.

10. The double-stranded nucleic acid inhibitor molecule of claim 1, wherein the sense strand is between 16-33 nucleotides in length, the antisense strand is between 21-23 nucleotides in length, the first duplex has a length of 12-17 base pairs, and the second duplex has a length of 3 base pairs and contains at least one bicyclic nucleotide.

11. The double-stranded nucleic acid inhibitor molecule of claim 1, wherein the first region of the sense strand is 12-16 nucleotides in length and the single stranded loop in the second region of the sense strand is a tetraloop and the second region of the sense strand is 10 nucleotides in length;
wherein the first duplex formed by the first region of the sense strand and the antisense strand has a length of 12-16 base pairs;
wherein the second duplex formed by the first and second nucleic acids of the second region of the sense strand has a length of 3 base pairs and contains at least one bicyclic nucleotide; and
wherein the antisense strand is 22 nucleotides in length and has the single-stranded overhang of 7-9 nucleotides at its 3'-end.

12. The double-stranded nucleic acid inhibitor molecule of claim 1, wherein the second duplex contains 6 bicyclic nucleotides and has a length of 3 base pairs.

13. The double-stranded nucleic acid inhibitor molecule of claim 3, wherein the tetraloop is an RNA tetraloop selected from UNCG, GNRA, CUUG, A/UGNN, GGUG, RNYA, or AGNN or a DNA tetraloop selected from d (GNAB), d (CNNG), or d (TNCG).

14. The double-stranded nucleic acid inhibitor molecule of claim 3, wherein the tetraloop has the sequence GAAA or wherein the triloop has the sequence GAA.

15. The double-stranded nucleic acid inhibitor molecule of claim 9, wherein the bicyclic nucleotide comprises a first ring, wherein the first ring is a furanosyl and a bridge that connects the 2'-carbon and the 4'-carbon of the furanosyl to form a second ring, and wherein the bridge that connects the 2'-carbon and the 4'-carbon of the furanosyl is selected from the group consisting of:
a) 4'-$CH_2$—O—N(R)-2' and 4'-$CH_2$—N(R)—O-2', wherein R is H, $C_1$-$C_{12}$ alkyl, or a protecting group, including, for example, 4'-$CH_2$—NH—O-2' (also known as BNA$^{NC}$) or 4'-$CH_2$—N($CH_3$)—O-2' (also known as BNA$^{NC}$ [NMe]);
b) 4'-$CH_2$-2'; 4'-$(CH_2)_2$-2'; 4'-$(CH_2)_3$-2'; 4'-$(CH_2)$—O-2' (also known as LNA); 4'-$(CH_2)$—S-2'; 4'-$(CH_2)_2$—O-2' (also known as ENA); 4'-CH($CH_3$)—O-2' (also known as cEt); and 4'-CH(CH$_2$OCH$_3$)—O-2' (also known as cMOE), and analogs thereof;
c) 4'-C(CH$_3$)(CH$_3$)—O-2' and analogs thereof;
d) 4'-CH$_2$—N(OCH$_3$)-2' and analogs thereof;
e) 4'-CH$_2$—O—N(CH$_3$)-2' and analogs thereof;
f) 4'-CH$_2$—C(H)(CH$_3$)-2' and analogs thereof; and
g) 4'-CH$_2$—C(=CH$_2$)-2' and analogs thereof.

16. The double-stranded nucleic acid inhibitor molecule of claim 3, wherein the tetraloop comprises one, two, three, or four ligand conjugated nucleotides or the triloop comprises one, two, or three conjugated nucleotides, wherein the ligand is a GalNAc and wherein the GalNAc is conjugated to the nucleotide at the 2'-position of the sugar moiety.

17. The double-stranded nucleic acid inhibitor molecule of claim 1, further comprising a 5'-phosphate mimic at the 5'-terminus of the sense strand and/or the antisense strand.

18. The double-stranded nucleic acid inhibitor molecule of claim 1, wherein the double-stranded the nucleic acid inhibitor molecule is formulated with a lipid nanoparticle, wherein the lipid nanoparticle comprises core lipids and envelope lipids, wherein the core lipids comprise a first cationic lipid and a first pegylated lipid and wherein the envelope lipids comprise a second cationic lipid, a neutral lipid, a sterol, and a second pegylated lipid and wherein the first cationic lipid is DL-048, the first pegylated lipid is DSG-MPEG, the second cationic lipid is DL-103, the neutral lipid is DSPC, the sterol is cholesterol, and the second pegylated lipid is DSPE-MPEG.

19. A pharmaceutical composition comprising a therapeutically effective amount of the double-stranded nucleic acid inhibitor molecule of claim 1 and a pharmaceutically acceptable excipient.

20. A method for reducing expression of a target gene in a subject comprising administering the double-stranded nucleic acid inhibitor molecule or composition of claim 1 to a subject in need thereof in an amount sufficient to reduce expression of the target gene, wherein the target gene is a structural gene, a housekeeping gene, a gene that encodes a transcription factor, a gene that encodes a motility factor, a gene that encodes a cell cycle factor, a gene that encodes a cell cycle inhibitor, a gene that encodes an enzyme, a gene that encodes a growth factor, a gene that encodes a cytokine, or a gene that encodes a tumor suppressor.

* * * * *